US006421451B2

(12) United States Patent
Shiratsuchi et al.

(10) Patent No.: US 6,421,451 B2
(45) Date of Patent: *Jul. 16, 2002

(54) STEP DIFFERENCE DETECTION APPARATUS AND PROCESSING APPARATUS USING THE SAME

(75) Inventors: Masataka Shiratsuchi, Kawasaki; Tutomu Saito, Yokohama; Kei Shimura, Yokohama; Yoshinori Honguh, Yokohama, all of (JP)

(73) Assignee: Kabushiki Kaisha Toshiba, Kawasaki-shi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/152,061

(22) Filed: Sep. 11, 1998

(30) Foreign Application Priority Data

Sep. 16, 1997 (JP) .............................................. 9-250909
Sep. 17, 1997 (JP) .............................................. 9-252165

(51) Int. Cl.⁷ ................................................. G06K 9/00
(52) U.S. Cl. ........................ 382/101; 382/100; 356/613
(58) Field of Search ................................. 382/101, 100, 382/112, 154; 209/584, 900; 705/401; 356/613; 250/559.44

(56) References Cited

U.S. PATENT DOCUMENTS 4,565,130 A * 1/1986 Leu ............................ 101/240
4,803,634 A * 2/1989 Ohno et al. .................. 364/478
4,845,761 A * 7/1989 Cate et al. ...................... 382/1
5,101,442 A * 3/1992 Amir .......................... 382/154
5,719,948 A * 2/1998 Liang .......................... 382/112
5,747,823 A * 5/1998 Ishitsuka et al. ............. 250/559
5,835,458 A * 11/1998 Bischel et al. ........... 369/44.12
6,034,379 A * 3/2000 Bunte et al. ................. 250/566

FOREIGN PATENT DOCUMENTS

| JP | 58-45305 | 10/1983 |
| JP | 2-62161 | 12/1990 |
| JP | 3-208087 | 9/1991 |
| JP | 5-7750 | 1/1993 |
| JP | 8-147405 | 6/1996 |

OTHER PUBLICATIONS

Shokosha, "Measuring of Mechanical Quantity", Applied Electronics Handbook, 9.3, 1989 pp. 735–747.

* cited by examiner

Primary Examiner—Leo Boudreau
Assistant Examiner—M B Choobin
(74) Attorney, Agent, or Firm—Oblon, Spivak, McClelland, Maier & Neustadt, P.C.

(57) ABSTRACT

The present invention provides a step difference detection apparatus including an illumination section for emitting illumination light, an incident section for making the illumination light emitted by the illumination section be incident on a plurality of small illumination regions on an object carried in a predetermined carrier direction from different directions, an image sensing section for inputting an image of the regions on the object illuminated with the illumination light which is made to be incident by the incident section, and a detection section for detecting a step difference on the object on the basis of the image sensed by the image sensing section.

24 Claims, 31 Drawing Sheets

STEP DIFFERENCE DETECTION APPARATUS AND PROCESSING APPARATUS USING THE SAME

BACKGROUND OF THE INVENTION

The present invention relates to a step difference detection apparatus used as, e.g., an apparatus for detecting the position and area of the address label or address indication cellophane window (address window) of mail, and a processing apparatus using the same.

Conventionally, to detect the region of an address label on the upper surface of a letter of, e.g., a mail envelope, the image on the upper surface of the mail item is simply sensed, and a rectangular region having an appropriate size and position, which appears to be an address label, is detected.

This method is effective to some degree but is influenced when letters have address labels and upper surfaces in the same color, or letters have label-like pictures on the upper surfaces.

Conventionally, to detect an address window (a window portion covered with a transparent sheet optically having a high reflection ratio, e.g., a cellophane or paraffine sheet), the positive reflected light component of illumination light is detected.

An example is disclosed in Jpn. Pat. Appln. KOKOKU Publication No. 58-45305 (Japanese Patent No. 1377041). This method is exclusively used to detect an address window. Address label detection must be performed using another method.

In addition, several step difference/unevenness detection methods applicable to detect an address label or an address window are conventionally known. As the first method, a shadow or scattered light due to a stepped edge is read by oblique illumination.

FIG. 1 shows an arrangement for reading the step difference on the upper surface of a letter by simple oblique illumination. This arrangement is incorporated in a culler facer canceller for automatically facing and canceling a lot of letters including mail envelopes and aims to detect the flap of a letter (folded seal portion of mail) for discrimination between the upper and lower surfaces of the letter. A similar arrangement is disclosed in Jpn. Pat. Appln. KOKOKU Publication No. 5-7750.

As shown in FIG. 1, a light beam emitted from a halogen lamp 1 is collimated by a collimator lens 2 to obliquely irradiate a letter 3 at a large incident angle (the incident angle means the angle formed by the normal and the incident light beam).

An image sensing means constituted by an image sensing lens (camera lens) 4 and a CCD sensor 5 senses the image of the letter from the vertical direction to detect a shadow 6 generated at the step portion, thereby detecting the position of the step difference of the flap.

However, the method of detecting the shadow or scattered light by simple oblique illumination may be influenced by the printed contents on the upper surface of the letter. For example, when a black straight line is printed on the upper surface of the letter, the output obtained upon reading this line can hardly be discriminated from that obtained by reading the edge of the address label on the upper surface of the letter or that obtained by reading the flap on the lower surface of the letter.

Another representative step difference detection apparatus using oblique illumination is SERRATION READER BML3D, shown in FIG. 2, available from SCHRACK in Australia. This is an edge detection apparatus exclusively used for stamps.

As shown in FIG. 2, in this apparatus, illumination light containing parallel light components obliquely illuminates a linear region on a surface with a stamp at a large incident angle. This region is read by a line image sensor. The read region (CCD AREA in FIG. 2) of the line image sensor is almost parallel to the longitudinal side of the stamp.

A portion corresponding to each punch hole of the perforation generates a shadow on the upper side of the hole due to the oblique illumination effect while the lower side of the hole scatters the illumination light and becomes bright. By reading this region, a signal having a period corresponding to the interval of the perforations of the stamp is obtained.

When this signal is collated with a predetermined reference pattern, the perforated edge of the stamp is detected. This method utilizes, at maximum, the fact that a stamp has notches of perforations, thereby improving the detection reliability. For this reason, this method cannot be applied to an address label having straight sides.

As still another surface unevenness detection method, triangulation shown in FIG. 3 is known. FIG. 3 is quoted from "Handbook of Applied Opto-electronics", Shoko-sha (1989). In FIG. 3, the point to be measured is irradiated with a laser beam emitted from a semiconductor laser light source 7 to obliquely observe the spot.

The spot forms an image on a position sensor 9 through an imaging lens 8. The position of the spot image on the position sensor changes depending on the height of the point to be measured. Therefore, when the change in spot image position is detected, the height of the point to be measured can be detected. Visible laser displacement sensors of LB-1000 series (LB-1000/LB-040) available from KEYENCE use this technique.

In this technique, only one point is measured in one measurement operation. To measure the unevenness of a region with a two-dimensional extent, like an address label, detection devices need be arrayed, and the letter must be carried under the array of detection devices. Since limitations are imposed on size reduction of individual sensors, this technique is disadvantageous in resolution power or cost.

As described above, in the conventional address label and address window detection apparatus or step difference detection apparatus using oblique illumination, a change in reflection ratio distribution due to printed contents on the upper surface of a letter or a background design influences the step difference reading result, so the step position cannot be properly detected.

In addition, the stamp edge detection method or unevenness detection based on triangulation cannot be directly applied to detect unevenness of a region having a two-dimensional extent and straight edges as in an address label.

BRIEF SUMMARY OF THE INVENTION

The present invention has been made in consideration of the above situation, and has as its object to provide a step difference detection apparatus capable of minimizing the influence of the reflection ratio distribution on a measuring surface due to printed contents on the upper surface of a letter and highly precisely detecting the position of an address label or an address window on the upper surface of the letter, and a processing apparatus using the same.

In order to achieve the above object, according to the first aspect of the present invention, there is provided a step difference detection apparatus comprising:

illumination means for emitting illumination light;

incident means for making the illumination light emitted by the illumination means be incident on a plurality of small illumination regions on an object carried in a predetermined carrier direction from different directions;

image sensing means for inputting an image of the regions on the object illuminated with the illumination light which is made to be incident by the incident means; and detection means for detecting a step difference on the object on the basis of the image sensed by the image sensing means.

In the step difference detection apparatus of the present invention, the object surface is divided into a plurality of small illumination regions each comprising a two-dimensional region, and adjacent small illumination regions are illuminated with illumination light from different directions, respectively.

By obtaining the image of the object comprising the small illumination regions using an image sensor or the like, the position of the step difference can be detected while almost eliminating the influence of the background design of the letter such as mail as the object.

For example, when a letter with an address label is illuminated obliquely with a collimated beam, a dark line or a bright line is formed at a stepped portion of the address label in accordance with the direction of the stepped portion due to the effect of oblique illumination.

In oblique illumination from the higher side of the step, a shadow is formed at the stepped portion. In oblique illumination from the lower side of the step, a bright line is formed at the stepped portion. At a portion having no step difference, the illuminance remains the same independently of the illumination direction.

As is apparent from the above description, an image obtained by oblique illumination from the right side is the same as that obtained by oblique illumination from the left side except that the bright and dark portions are inverted at the stepped portion. The image is sensed by illuminating adjacent small illumination regions from different directions, and a portion where the illuminance characteristically changes at the boundary between the small illumination regions is detected from the sensed image by image processing or the like. With this processing, the stepped portion corresponding to an edge of the address label can be detected.

More specifically, when a dark line in a small illumination region changes to a bright line in an adjacent small illumination region, the straight line is likely to be an edge of the address label.

Conversely, when a dark line in a small illumination region still remains dark in the adjacent small illumination region, and no discontinuous change in illuminance is observed at the boundary portions between the small illumination regions, the line is likely to be a simple black line printed on the upper surface of the letter.

Therefore, the position of an address label or an address window on the upper surface of the letter can be accurately detected without being influenced by the reflection ratio distribution due to the printed contents on the upper surface of the letter.

According to the second aspect of the present invention, there is provided a step difference detection apparatus comprising:

illumination means for illuminating an object with a plurality of types of illumination light beams having different characteristics from different directions;

beam splitting means for splitting a reflected light beam from the object into a plurality of light components in units of types of the illumination light beams using a difference in characteristics of the plurality of types of illumination light beams;

image sensing means for receiving the plurality of light components split by the beam splitting means and inputting a plurality of images corresponding to the plurality of types of illumination light beams, respectively; and image processing means for processing the plurality of images input by the image sensing means to detect a step difference on the object.

The step difference detection apparatus of the present invention simultaneously illuminates the read region on the object, which is to be read by an image sensor or the like, with a plurality of types (preferably two types) of light beams having different characteristics from different directions.

The reflected light beam is resplit into the respective types of light components using the difference in characteristics of the light beams, thereby simultaneously sensing a plurality of images. By calculating the difference between the images, the step difference in the read plane is properly detected while eliminating the influence of the background design of the letter as the object.

When a letter with an address label is illuminated obliquely with a collimated beam, a shadow or a bright line is formed at a stepped portion of the address label in accordance with the direction of the stepped portion due to the effect of oblique illumination.

In oblique illumination from the higher side of the step, a shadow is formed at the stepped portion. In oblique illumination from the lower side of the step, a bright line is formed at the stepped portion. At a portion having no step difference, the illuminance remains the same independently of the illumination direction.

As is apparent from the above description, an image obtained by oblique illumination from the right side is the same as that obtained by oblique illumination from the left side except that the bright and dark portions are inverted at the stepped portion. When the difference between the two images is calculated in units of pixels, pieces of information of portions other than the stepped portion are offset, so the position information of the stepped portion can be obtained.

To calculate the difference, two images sensed under the same conditions except the illumination direction are required. In the present invention, this is realized by simultaneously illuminating the read region from the left and right sides and simultaneously sensing the two images.

However, to resplit the light beam from the two directions upon image sensing, light beams having a difference in some characteristics such as the wavelength or polarization direction are used as the left and right illumination light beams. Illumination is performed using these light beams, and the light beam is split into two light components using a beam splitting means such as a dichroic mirror before the light beam to be read is incident on the CCD line image sensor.

Depending on the printed contents on the upper surface of the letter, the transmission ratio may largely change due to the characteristics of light beams. However, in many cases, the reflection ratio difference can be sufficiently minimized by appropriately selecting the characteristics of the two light beams.

For example, to perform illumination using two light beams having different wavelengths, two light beams having wavelength relatively close to each other are used. When a light beam in a wavelength band where the reflection ratio for ink colors normally used for printing on the upper surface of the letter rarely changes, e.g., a light beam having a long wavelength such as infrared light is used, the reflection ratio difference can be sufficiently minimized even when the wavelengths of the two illumination light beams are not so close.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described below with reference to the accompanying drawing.

First Embodiment

Figure 1:
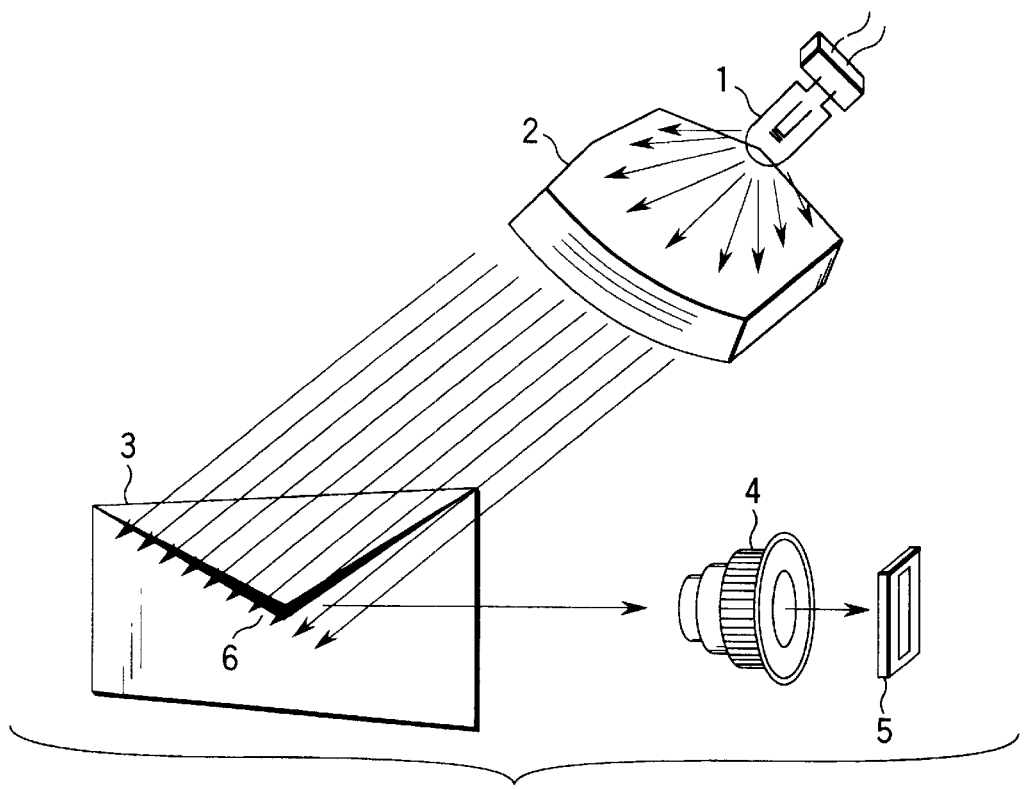
FIG. 1 is a view for explaining the principle of the conventional step difference detection by oblique illumination.
Figure 2:
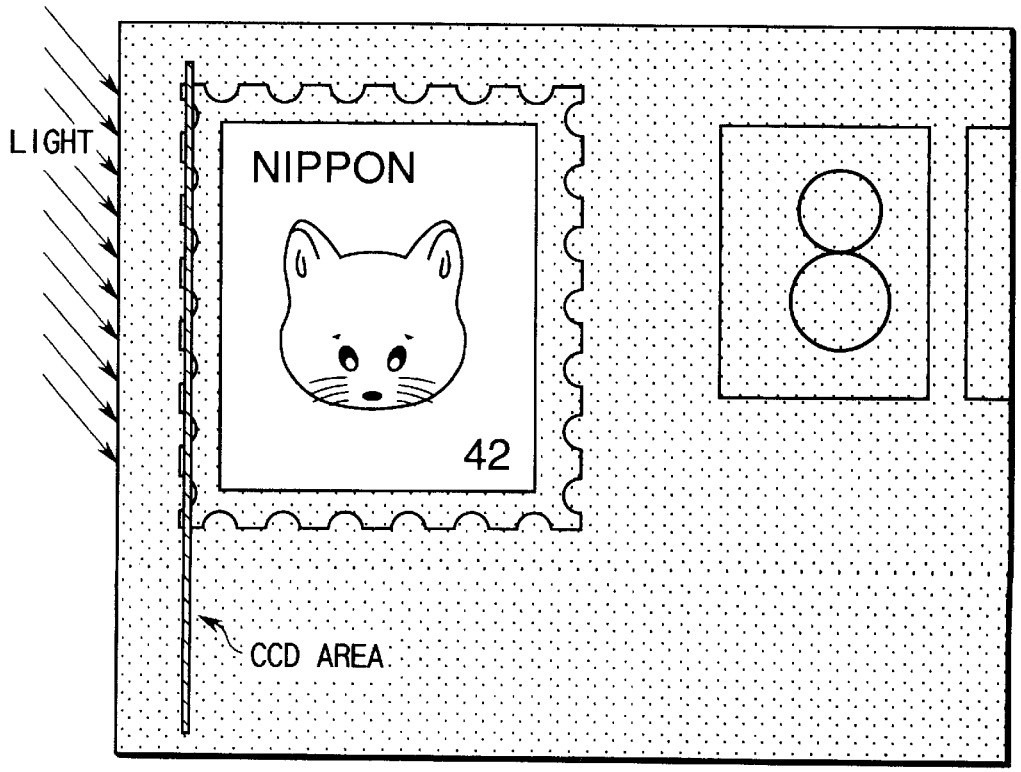
FIG. 2 is a view for explaining the principle of the conventional stamp perforation detection.
Figure 3:
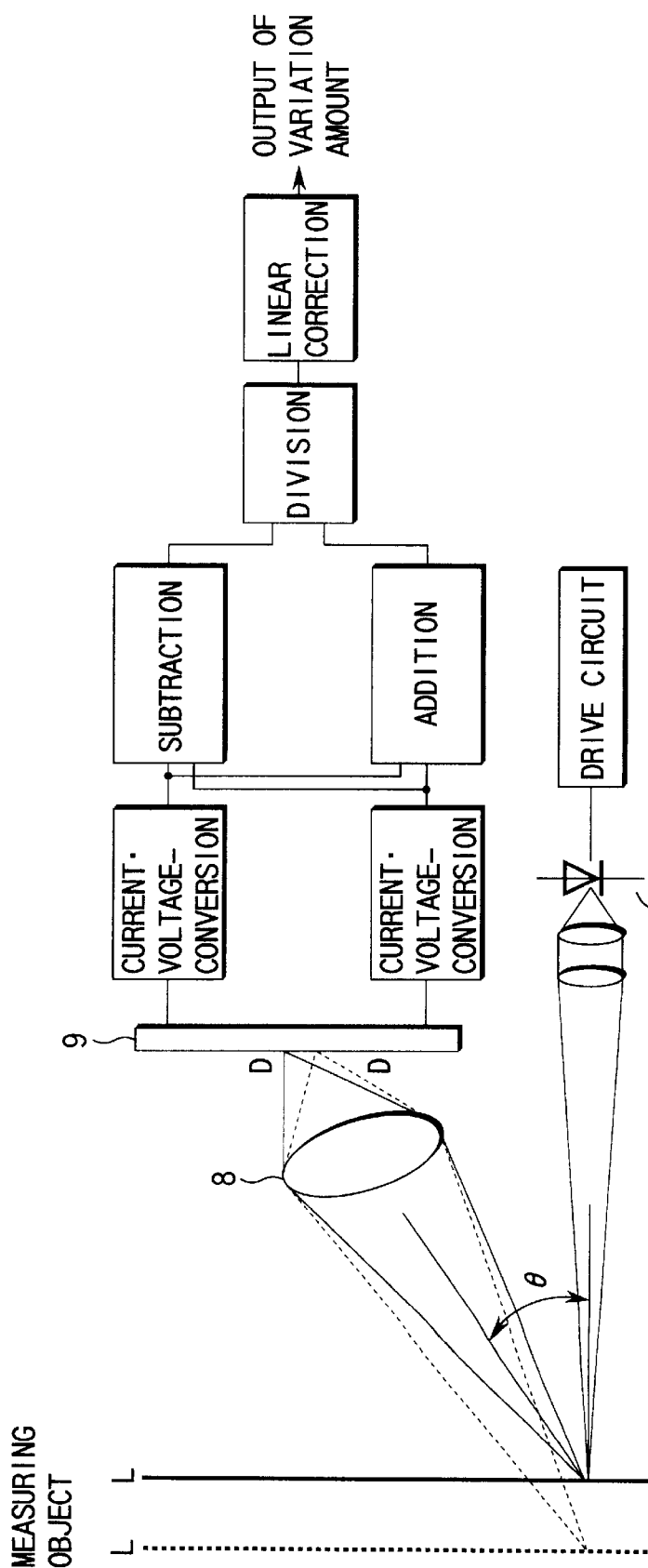
FIG. 3 is a view for explaining the conventional triangulation.
Figure 4:
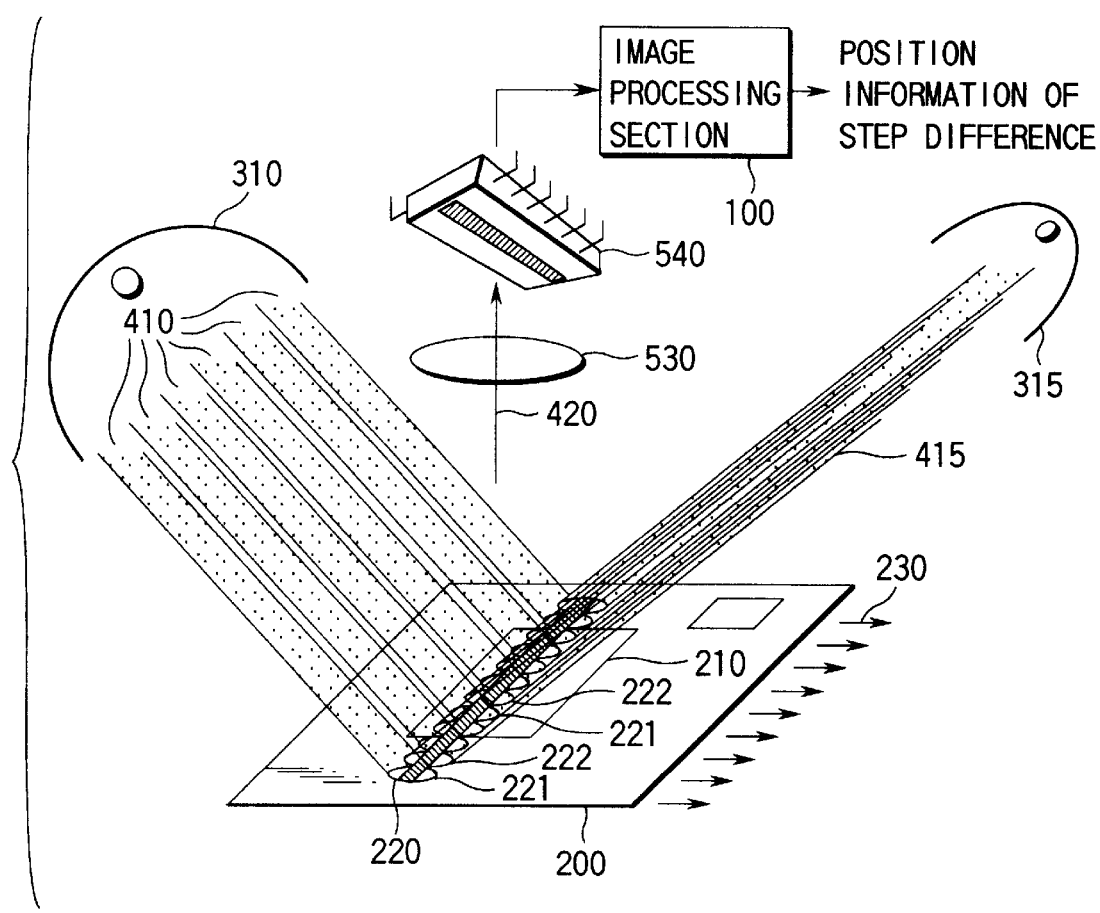
FIG. 4 is a perspective view showing the overall arrangement of a step difference detection apparatus according to the first embodiment of the present invention.
Figure 5:
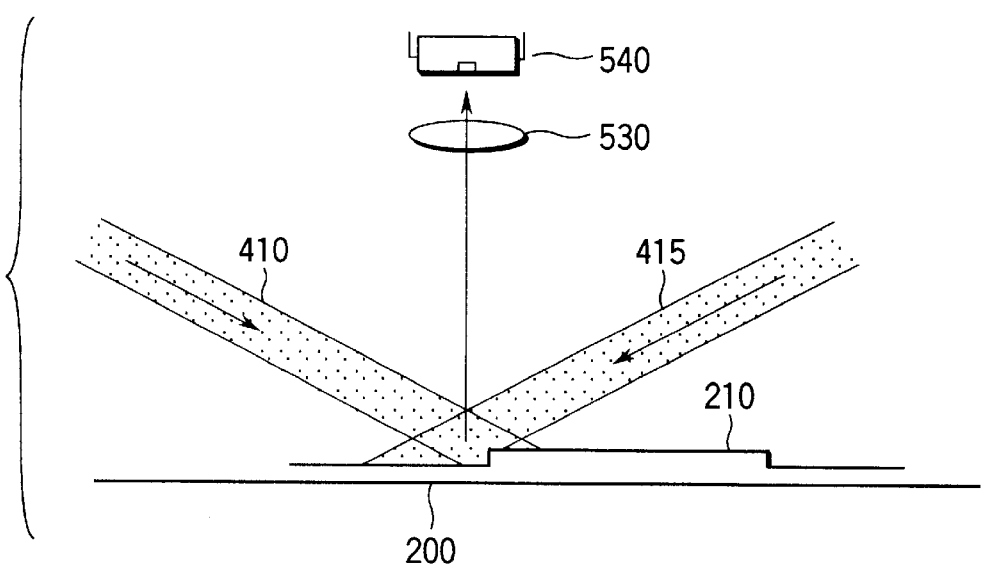
FIG. 5 is a front view showing the step difference detection apparatus in FIG. 4 when viewed from the front side.

FIG. 4 shows the overall arrangement of a step difference detection apparatus according to the first embodiment of the present invention. FIG. 5 is a front view of the step difference detection apparatus shown in FIG. 4 when viewed from the front side. The step difference detection apparatus of the first embodiment is used as, e.g., a detection apparatus for detecting the position and region of an address label or address indication cellophane window (address window) of mail, and comprises three sections: an illumination section, an image sensing section, and an image processing section.

The illumination section for illuminating a letter such as mail with illumination light from the left and right sides at large incident angles is constituted by two illumination units 310 and 315 for emitting a number of parallel light beams at equal intervals.

A linear read region 220 on the surface of a letter 200 carried by a carrying unit (not shown) in a subscanning direction 230 is illuminated with illumination light 410 emitted from the illumination unit 310 obliquely from the left upper side and illumination light 415 emitted from the illumination unit 315 obliquely from the right upper side.

The illumination light 410 and 415 have equal angles with respect to the normal of the letter 200, i.e., equal incident angles of about 70°. The illumination units 310 and 315 have equal illumination capabilities. When this system is viewed from the upper side, the illumination units 310 and 315 are symmetrical with respect to the read region 220. The read region 220 is a linear region whose longitudinal direction is set to be perpendicular to the subscanning direction 230, i.e., parallel to the main scanning direction. The image of this linear region is read by a CCD line image sensor 540 constituting the image sensing section.

Each of the illumination light 410 and the illumination light 415 illuminating the read region 220 comprises a lot of parallel illumination beams at equal intervals, as described above. The illumination beams of the illumination light 410 illuminate a number of illumination spots 221 while the illumination beams of the illumination light 415 illuminate a number of illumination spots 222. When the read region 220 has a flat surface, the linear read region 220 is illuminated with both the illumination light 410 and the illumination light 415 at a uniform illuminance.

Figure 6:
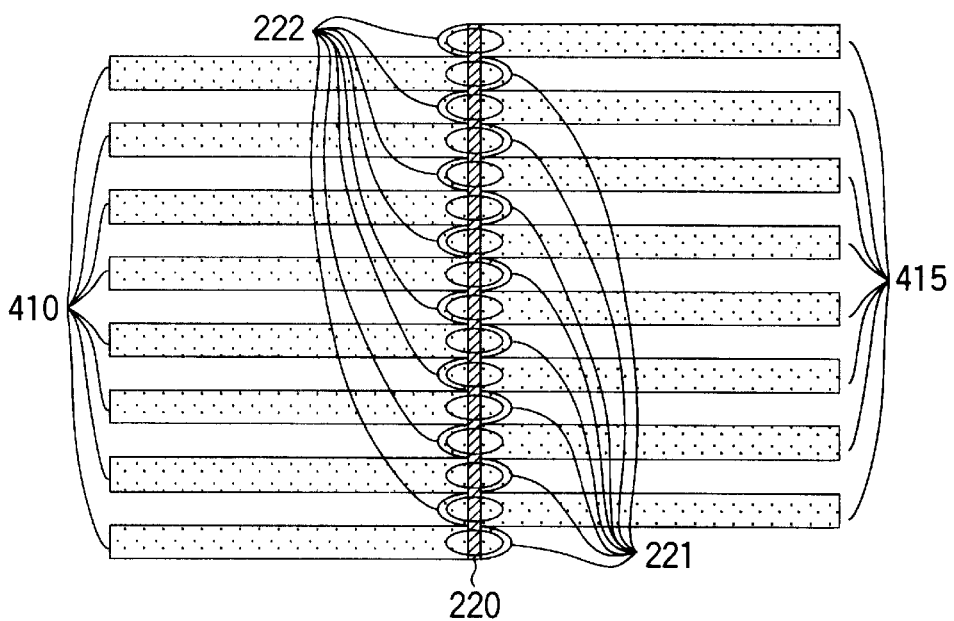
FIG. 6 is a view showing an arrangement of small illumination regions used in the step difference detection apparatus of the first embodiment.

A number of illumination spots 221 illuminated with the illumination light 410 and a number of illumination spots 222 illuminated with the illumination light 415 alternate (221, 222, 221, 222, . . . ) at equal intervals on the linear read region 220, as shown in FIG. 6.

Since the letter 200 is carried in the subscanning direction 230 perpendicular to the longitudinal direction of the linear read region 220, the entire surface of the letter 200 is scanned by the read region 220 from the right to the left.

A number of illumination spots 221 and 222 are also scanned across the entire letter 200 from the right to the left. With this operation, the entire surface of the letter 200 is divided into a number of small illumination regions extending in parallel to the subscanning direction 230 along the loci of the illumination spots 221 and 222.

Figure 8:
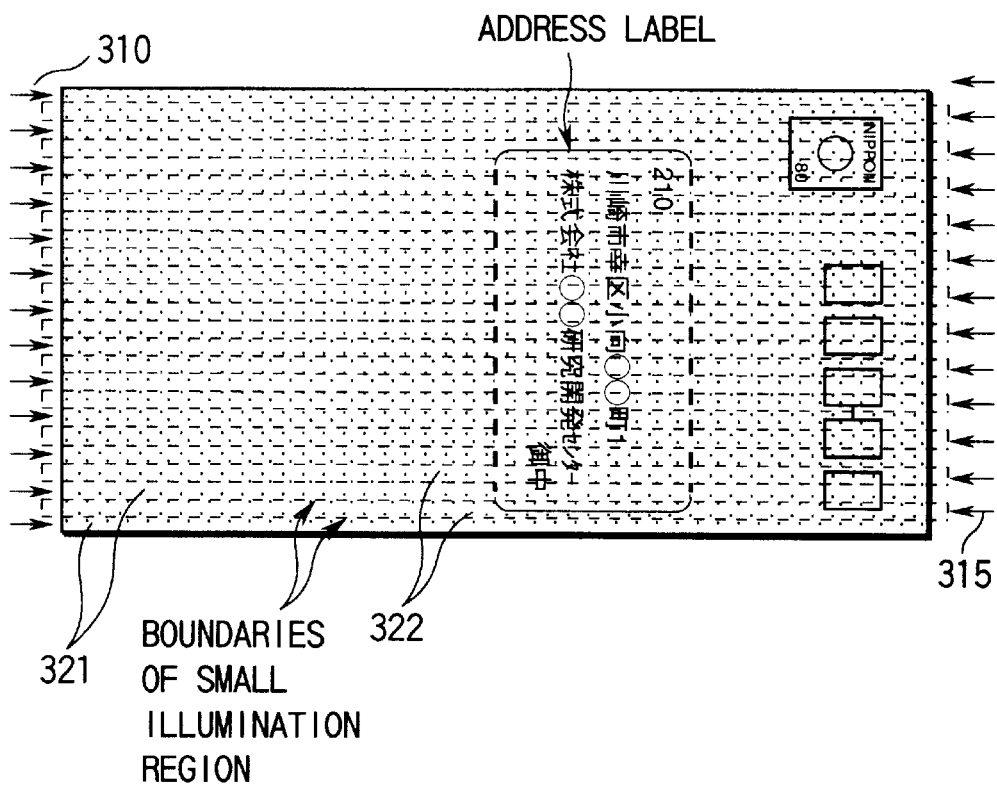
FIG. 8 is a view showing an image output from the image sensing section of the step difference detection apparatus of the first embodiment.

FIG. 8 shows this state. The sensed image of the letter 200 is constituted by a number of small illumination regions 321 formed by the illumination unit 310 from the left and a number of small illumination regions 322 formed by the illumination unit 315 from the right. The small illumination regions 321 and 322 alternate.

As shown in FIG. 4, an imaging lens 530 is positioned above the linear read region 220 such that the image of the read region 220 is formed on the CCD line image sensor 540 arranged above the imaging lens 530, and sensed. When the letter 200 is carried in the subscanning direction 230, the CCD line image sensor 540 senses the entire image of the letter 200 and outputs the image. The resultant image data is sent to an image processing section 100 to extract position information of a step difference.

Figure 7:
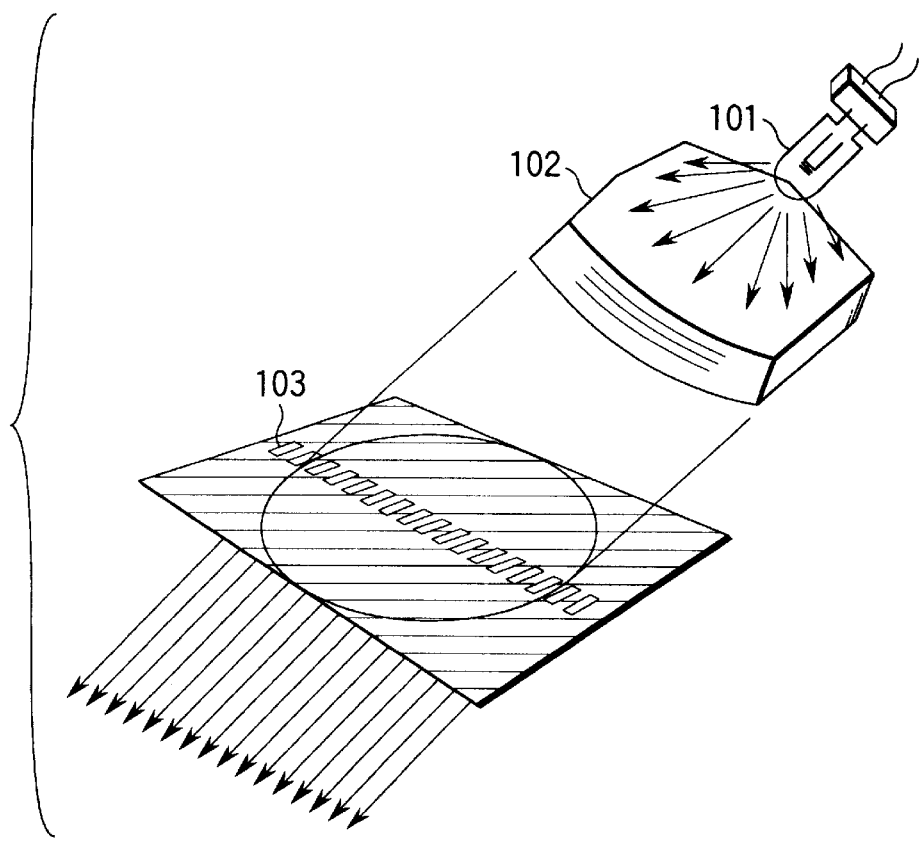
FIG. 7 is a view for explaining a method of forming interdigital illumination used by the step difference detection apparatus of the first embodiment.

To realize the interdigital illumination, each of the illumination units 310 and 315 has an arrangement shown in FIG. 7. In FIG. 7, light emitted from a halogen lamp 101 is collimated through a collimator lens 102.

The collimated light forms a number of parallel light beams through a number of slits 103 formed at equal intervals to interdigitally illuminate the plurality of illumination spots 221 or 222 from the right or left. Since the illumination beams are arranged at equal intervals, positioning of the illumination spots 221 and 222 or processing by the image processing section 100 can be simplified.

The image obtained using the illumination section and the image sensing section will be described.

The image obtained by the illumination section and the image sensing section as shown in FIG. 4 is the same as that obtained by normal illumination from both sides except a stepped portion such as a label edge.

That is, a simple image reflecting the density distribution or reflection ratio distribution on the letter 200 is obtained. However, at the label edge portion and, particularly, at an edge in the main scanning direction perpendicular to the carrier direction 230, the output pixel value changes depending on the illumination direction, left or right, due to the oblique illumination effect (illumination using collimated light at a large incident angle).

A bright line or a dark line is formed in accordance with the illumination direction and the edge direction. More specifically, when the edge portion is illuminated obliquely from the higher side of the step, a dark line is formed. When the edge portion is illuminated obliquely from the lower side of the step, a bright line is formed.

When a label edge portion is present across the boundary between adjacent small illumination regions, transition from a bright line to a dark line or vice versa occurs at the boundary of the adjacent small illumination regions, so discontinuity of bright and dark portions is generated between the adjacent small illumination regions. FIG. 8 shows this image.

Referring to FIG. 8, the left and right label edges of the address label are almost straight. Bright lines and dark lines alternate at a specific phase and a specific period corresponding to the interval of the interdigital illumination, so an image indicated by broken lines is obtained at the label edge portion.

By detecting the period and phase of this signal, the presence of a step difference such as a label edge can be known. The image of the right end of the label is the same as that of the left end, though the phase of the signal of the edge portion is inverted. That is, a bright line portion at the right end corresponds to a dark line at the left end, and a dark line at the right end corresponds to a bright line at the left end. The right and left ends of the label can be identified from this fact.

As a specific method of detecting the edge, pattern matching or the like can be used. For example, assume that the read density in the main scanning direction of the CCD line image sensor 540 is a pixel per mm, and each small illumination region of the illumination region 220 is 2 mm wide.

That is, when the first and second pixels of the CCD line image sensor 540 sense the image of a right-side illumination region, the third and fourth pixels sense the image of a left-side illumination region, and the fifth and sixth pixels sense the image of the next right-side illumination region.

When the edge of an label 210 having a width of 4 cm and parallel to the main scanning direction enters the read region, the bright and dark portions alternate every two pixels on the line over a length of 4 cm, i.e., the width of the label edge portion. At a portion other than the label edge, no change occurs due to the illumination direction, and a simple image on the upper surface of the letter is obtained.

When an about 1-cm long reference pattern along the main scanning direction is prepared and correlated with the image while sequentially shifting the reference pattern in the main scanning direction by every pixel, a signal component changing in synchronism with a change in illumination direction can be detected.

A small change in density of, e.g., a character in the range of about 1 cm on the upper surface of the letter is rarely completely synchronized with the change in illumination direction in an area much larger than 1 cm. Therefore, correlation in this area can almost eliminate the influence.

Even when the density smoothly changes in an area larger than 1 cm, like the background design of the upper surface of the letter 200, correlation with the reference pattern can eliminate the influence. The edge portion can be detected in this manner.

The image processing section 100 also detects a stepped region of a label or the like from the position information of the stepped portion detected by the above method. In the output from the image sensing section shown in FIG. 8, broken-line-like patterns corresponding to the arrays of the small illumination regions 321 and 322 appear on the right and left sides of the address label.

From these patterns, it is detected that these two sides represent stepped portions. The left side corresponds to the right side in length and position. A bright line on the left side corresponds to a dark line on the right side while a dark line on the left side corresponds to a bright line on the right side.

For this reason, the two sides can be estimated as the left and right sides of a stepped region of a certain rectangle, so the stepped region of the rectangle can be detected. The image processing section 100 performs such processing to detect the region of the label 210 on the letter 200.

In the first embodiment, a plane with a label is illuminated from the left and right sides. For this reason, no output difference is generated between the right illumination and left illumination for a stepped portion extending in the left and right directions. That is, the upper and lower sides of the label 210, which are parallel to the subscanning direction, cannot be detected.

However, the first embodiment aims to detect not all sides of the label 210 on the letter 200 but the position and region of the label 210.

In most cases, the label 210 is rectangular. Once the positions of the left and right sides opposing each other are detected, the region of the rectangle corresponding to the label 210 can be specified even when the upper and lower sides cannot be detected. Therefore, the purpose of the first embodiment can be sufficiently achieved.

The effect of the step difference detection apparatus according to the first embodiment will be described next. The image obtained by interdigital illumination from two directions is considerably similar to that obtained by the conventional uniform illumination without the interdigital structure and reflecting the density distribution on the letter 200. However, the image is modulated at the label edge portion by a signal having a specific period and phase.

When the characteristic signal having the specific period and phase is extracted by, e.g., pattern matching, only the label edge portion can be easily detected without being influenced by the density distribution on the letter 200.

When the step difference detection apparatus of the first embodiment is incorporated in, e.g., a postal address reading and sorting machine, the region of an address label or address window where the address is written can be quickly and properly detected by an address recognition section to improve the address recognition ratio.

As described above, the output image from the image sensor 540 is influenced by the background design. However, this influence can be reduced or eliminated by adjusting the intervals of the small illumination regions 321 and 322 in the illumination not to be influenced by the ground pattern. In a background design, the density may change by chance at a certain portion of the boundaries of the small illumination regions. However, the density hardly continuously changes at the boundaries of the small illumination regions for many periods.

Therefore, by appropriately selecting the intervals of the small illumination regions and the size of the reference pattern (the number of small illumination regions corresponding to the size of the reference pattern), the influence of the background design can be avoided in most cases.

The first embodiment of the present invention has been described above in detail. The present invention is not limited to the arrangement of the first embodiment. For example, the image processing section for detecting a step difference may use not only pattern matching but also any other method for detecting a stepped portion.

As another arrangement of the image processing section, even when a filter for converting image data into a time-series signal and extracting a frequency component corresponding to the pattern is used, simple detection can be realized.

As still another arrangement of the image processing section, the image may be traced. In this method, portions which are regarded as dark and bright lines are traced in the image output from the image sensing section, and it is checked whether the output pixel values of these curves discontinuously change at the boundaries of the small illumination regions where the illumination direction changes.

If the dark and bright lines are formed by a step difference, the output pixel values discontinuously change at the boundaries of the small illumination regions. It can be determined from this fact whether the curve is formed by a step difference.

With this arrangement, even when the stepped portion largely shifts from the main scanning direction of the line image sensor 540 or the stepped portion is curved, the stepped portion can be detected without any problems.

As still another arrangement of the image processing section, interpolation and a difference may be used. In this technique, the image output from the image sensing section is segmented into two pieces by separating the pixels in the right illumination region and those in the left illumination region. By interpolating pixels omitted on each image with adjacent pixels, a perfect right illumination image and a perfect left illumination image are formed.

The difference between pixels of these two images is calculated to obtain another image (difference image). The image obtained by illuminating the entire region by right illumination is expected to be the same as that obtained by illuminating the entire region by left illumination. The same relationship is expected to approximately hold between an image obtained by interpolating the right illumination image and that obtained by interpolating the left illumination image.

Therefore, the difference image has a value only at the position of the step difference and a pixel value of 0 at the remaining positions because the pixel values are canceled. The position of the step difference can be detected in the above manner. With this arrangement, mounting of the image processing section is largely facilitated, and high performance can be obtained.

The method of realizing the illumination section is not limited to the arrangement using the collimator lens 102 and the slits 103 described with reference to FIG. 7. Light transmitted through the slits 103 may be guided to the illumination section using an imaging lens.

In this method, by ensuring a sufficient focal depth, the parallelism of illumination light can be improved, and the detection precision can be increased. Alternatively, bright and dark portions may be alternated in the illumination section using a lens array or the like. With this method, the characteristics can be easily adjusted, or the device can be made compact.

Figure 9:
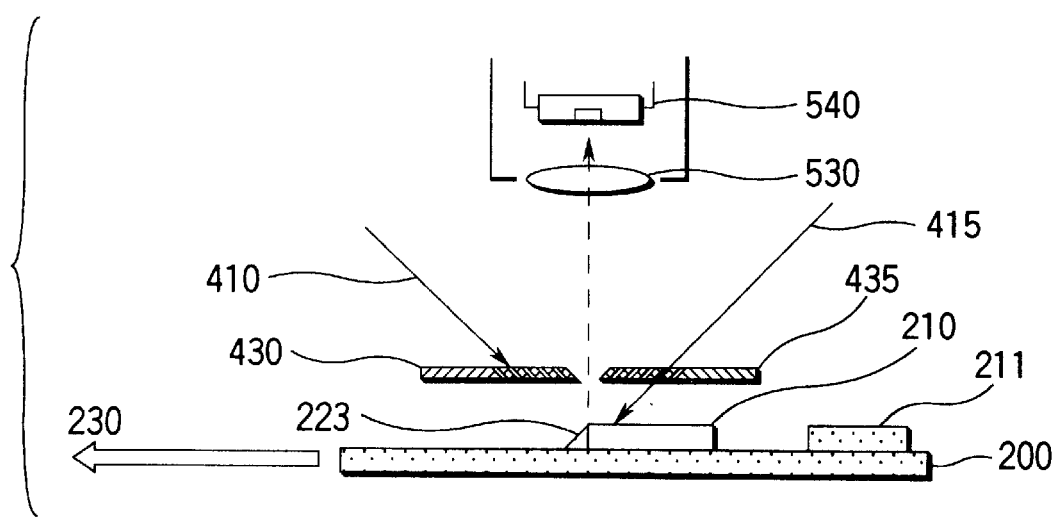
FIG. 9 is a front view showing the slit arrangement positions in the step difference detection apparatus of the first embodiment.
Figure 10:
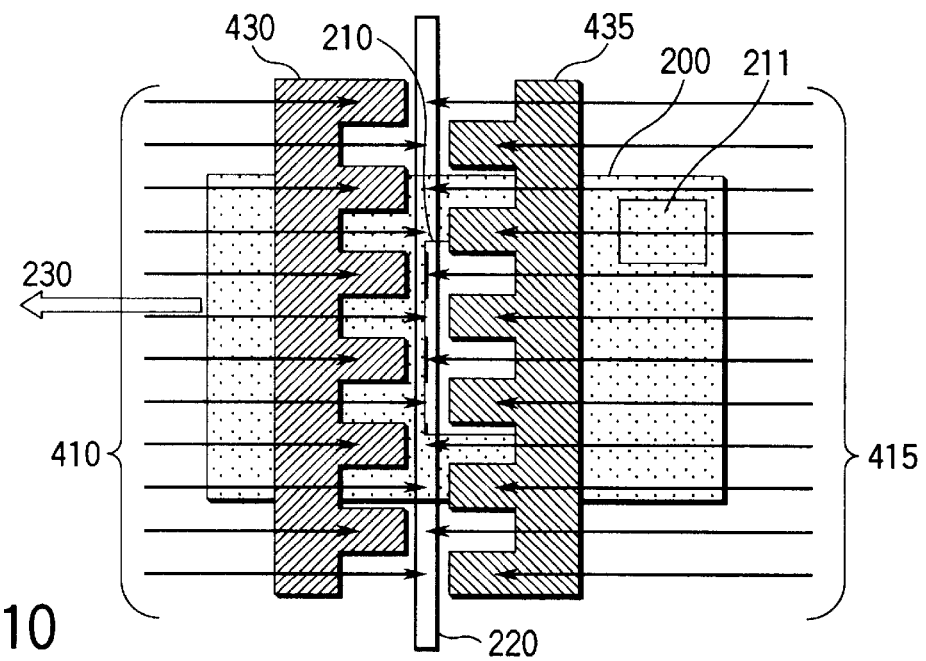
FIG. 10 is a plan view showing the slit arrangement positions viewed from the upper side.

When the slits are used, the highly collimated light source is not always necessary. Another example in which interdigital illumination is realized using slits is shown in FIGS. 9 and 10. FIG. 9 is a front view of the step difference detection apparatus. FIG. 10 is a plan view of the apparatus. In this arrangement, a halogen lamp (not shown) is used as a light source, and light emitted from the halogen lamp is guided using a linear light guide and used as the illumination light 410 and the illumination light 415.

The linear light guide is formed by bundling a number of optical fibers having exit ports arrayed in a line, and normally used to illuminate a linear region. Interdigital illumination is realized by placing interdigital slits 430 and 435 as shown in FIGS. 9 and 10 near the portion to be illuminated.

Light having a certain divergence angle emerges from the optical fibers of the linear light guide. The typical value of this divergence angle is about 15° on both sides of the central axis. Even when such a light source for emitting uncollimated light is used, the object of this embodiment can be achieved as far as the divergence angle of the illumination beam is sufficiently smaller than a ratio obtained by dividing the slit pitch by the distance between the slits and the upper surface of the letter.

In a light source having a divergence angle of 15° from the central axis, the light spreads to 0.5 times the unit length on a plane separated from the exit port by the unit length. At this time, to obtain sufficient modulation, the distance between the slits 430 and 435 and the upper surface of the letter 200 must be equal to or smaller than the slit pitch. Conversely, when the distance between the slits 430 and 435 and the upper surface of the letter 200 is shortened, the requirement for the parallelism of the linear light source can be relaxed.

The read region of the CCD line image sensor 540 need not always be illuminated from two directions, i.e., from the left and right sides and may be illuminated from three or more directions.

In the first embodiment, an edge of the label 210 on the letter 200, which is parallel to the main scanning direction, can be detected, although it is difficult to detect an edge parallel to the subscanning direction, as described above. When the letter is illuminated with illumination light from two directions, edge detection in a certain direction becomes difficult. However, this problem can be avoided by illuminating the letter from three or more directions to eliminate the direction difficult to detect.

The carrier direction of the letter 200 need not always be perpendicular to the direction of the line image sensor. By adjusting the angle made by the carrier direction of the letter 200 (subscanning direction 230) and the main scanning direction of the line image sensor 540, edge detection in a desired direction can be facilitated.

For example, when the letter 200 is to be carried from the right to the left, the CCD line image sensor 540 is set to read a linear region from the upper right side to the lower left side. The letter is interdigitally illuminated at a large incident angle from the lower right side and the lower left side.

In this case, dark and bright lines are generated along not only sides of the address label perpendicular to the subscanning direction 230 but also sides parallel to the subscanning direction 230, so the edges parallel to the subscanning direction 230 can be detected.

The illuminances of illumination light beams illuminating the plane from the respective directions need not always equal and may be different. In this case, the illuminances are corrected by a shading correction processing section.

The illumination light beams from the respective directions need not always have the same characteristics. For example, a halogen lamp may be used to emit illumination light from the upper right side while a fluorescent lamp may be used to emit illumination light from the upper left side. In this case, by performing correction by an appropriate correction section, the labor and cost for adjustment for finely matching the characteristics of the plurality of light sources with each other can be reduced.

The above-described various modifications can be made. These modifications are incorporated in the present invention within the spirit and scope of the present invention.

Second Embodiment

A step difference detection apparatus according to the second embodiment comprises three sections: an illumination section, an image sensing section, and an image processing section, as in the first embodiment described with reference to FIG. 4. The image sensing section uses a CCD area image sensor in place of the CCD line image sensor 540 in FIG. 4. With this arrangement, the image on the two-dimensional read region corresponding to the entire surface of, e.g., a letter 200 is read at once.

Figure 11:
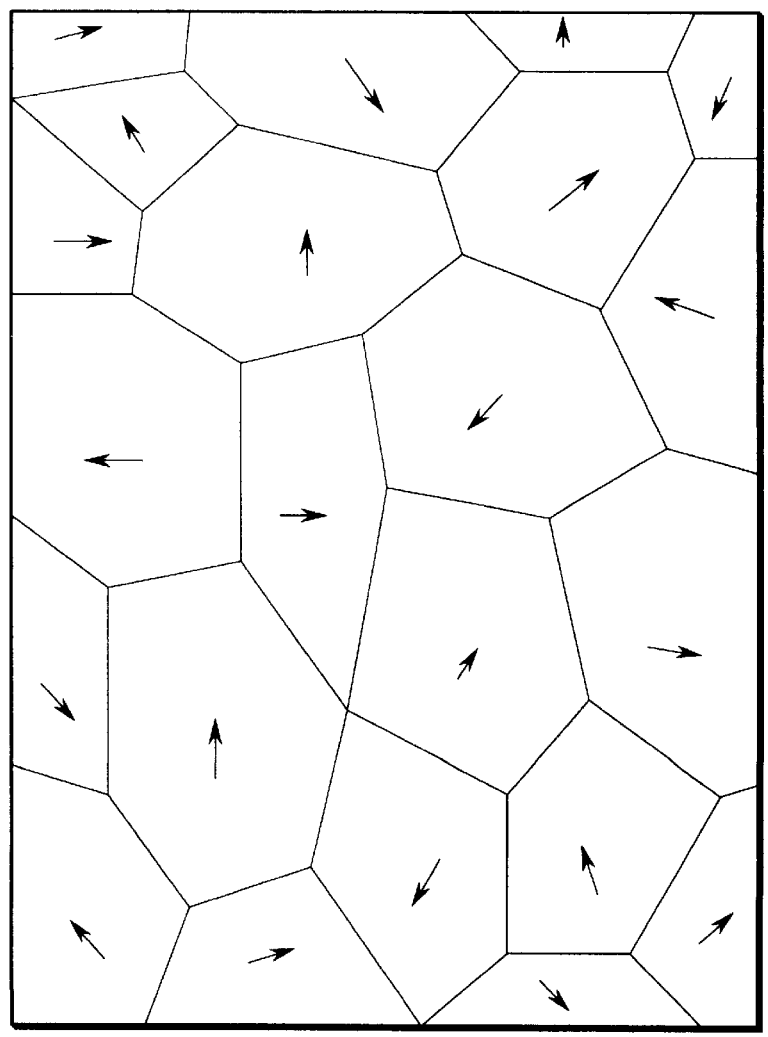
FIG. 11 is a view showing an arrangement of small illumination regions used in a step difference detection apparatus of according to the second embodiment of the present invention.

The illumination section divides the two-dimensional read region into small illumination regions in a pentagonal shape shown in FIG. 11 and illuminates each region with illumination light at a large incident angle (the angle formed by the normal and the light beam is about 70°).

At this time, adjacent small illumination regions are illuminated from different directions. An arrow in each small illumination region shown in FIG. 11 indicates the illumination direction for the small illumination region, which is projected on the read plane. Image data sensed by the image sensing section is processed by the image processing section. The position data of a stepped portion is extracted and output.

As an example of processing by the image processing section, a method of tracing the image will be described. In this method, portions which are regarded as dark and bright lines are traced in the image output from the image sensing section, and it is checked whether the output pixel values of these curves discontinuously change at the boundaries of the small illumination regions where the illumination direction change.

If the dark and bright lines are formed by a step difference, the output pixel values discontinuously change at the boundaries of the small illumination regions. It can be determined from this fact whether the curve is formed by a step difference.

To extract the position information of a step difference by the image processing section, the image tracing method need not always be used. For example, a neural network, pattern matching, or interpolation and a difference may be used.

When the plane is illuminated from four illumination directions (directions of illumination light projected onto the read surface), i.e., from the upper, lower, left, and right sides, the illumination unit can be simplified, resulting in a decrease in cost. On the basis of the four color theorem, the four illumination directions can be selected such that adjacent small illumination regions are illuminated from different directions.

The above-described various modifications can be made. These modifications are incorporated in the present invention within the spirit and scope of the present invention.

Third Embodiment

A step difference detection apparatus according to the third embodiment of the present invention comprises an illumination section, an image sensing section, and an image processing section.

Figure 12:
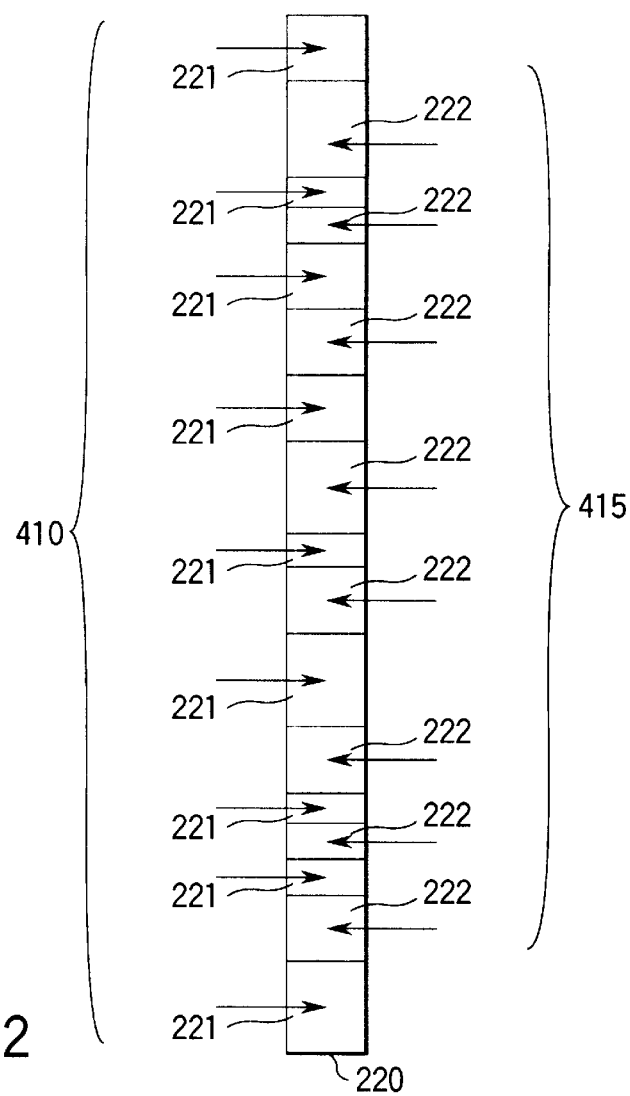
FIG. 12 is a view showing an arrangement of small illumination regions used in a step difference detection apparatus of according to the third embodiment of the present invention.

The third embodiment has almost the same arrangement as that of the first embodiment shown in FIG. 4 except that small illumination regions in the illumination section are arranged at different intervals. FIG. 12 shows the arrangement of illumination spots 221 and illumination spots 222 in the linear read region in this embodiment.

In a read region 220 of a CCD line image sensor 540, the plurality of illumination spots 221 illuminated with illumination light beams from the left side at a large incident angle of about 70° and the plurality of illumination spots 222 illuminated with illumination light beams from the right side at a large incident angle of about 70° alternate at different intervals along the longitudinal direction of the read region 220, as shown in FIG. 12.

When the read region is sensed using the image sensing section while carrying the letter in the carrier direction perpendicular to the longitudinal direction of the read region 220, the entire letter is divided into a plurality of small illumination regions parallel to the carrier direction and arranged at inequable intervals.

By processing the image of the read region, the position information of a step difference is extracted. As the processing method used by the image processing section, the processing method used in the first embodiment can be applied.

The effect of the step difference detection apparatus according to the third embodiment will be described. Various contents may be printed on the surface of a letter 200, and a pattern having a periodicity such as stripes is often printed.

The present invention has as one of objects to minimize the influence of printed contents on the letter 200. When small illumination regions are arranged at equal intervals, and the period of the pattern having the periodicity matches the interval of the small illumination regions by chance, the image processing section may operate erroneously.

In the third embodiment, by arranging the small illumination regions at different intervals at random, the influence of a pattern having a periodicity which is often printed on the surface of the letter 200 can be minimized.

Fourth Embodiment

In a step difference detection apparatus according to the fourth embodiment of the present invention, illumination light incident on small illumination regions comprises illumination light beams from two or more directions, and the intensity ratio of the light beams changes between adjacent small illumination regions.

Assume that, when a number of small illumination regions 321 and 322 alternate on the surface of a letter 200, as in the first or third embodiment, and an odd-numbered small illumination region is illuminated with light having an illuminance of 8,000 lx from the left side and light having an illuminance of 2,000 lx from the right side. Assume that an even-numbered small illumination region is illuminated with light having an illuminance of 3,000 lx from the right side and light having an illuminance of 6,000 lx from the left side.

In this case, the odd-numbered small illumination region is mainly illuminated from the right side, and the even-numbered small illumination region is mainly illuminated from the left side. However, these small illumination regions also slightly receive the illumination light from the left or right side.

Such an arrangement in which illumination light incident on each small illumination region comprises illumination light beams from two or more directions, which have different intensity ratios between adjacent small illumination regions is also incorporated in the concept of the present invention, "adjacent small illumination regions are illuminated illumination light beams from different directions".

As in FIG. 4, assume that illumination light 410 and illumination light 415 from two directions are used, the first and second small illumination regions 321 and 322 alternate, and the illumination light 410 and the illumination light 415 mixed at an arbitrary ratio are incident on each small illumination region. In this case as well, the stepped portion can be detected by the image processing section when a certain condition is satisfied.

Consider a case wherein, for a flat read surface, light in an amount L1A from a light source A and light in an amount L1B from a light source B are incident on the small illumination region 321, and light in an amount L2A from the light source A and light in an amount L2B from the light source B are incident on the small illumination region 322.

An output from the small illumination region 321 is given by $$L1 = L1A + L1B$$

An output L2 from the small illumination region 322 is given by $$L2 = L2A + L2B$$

When the portion to be read is a stepped portion having a tilt angle, the light amounts from the light sources A and B change at a predetermined ratio as follows:

$$L1 = \alpha L1A + \beta L1B$$

$$L2 = \alpha L2A + \beta L2B$$

In this case, when $$L1A \times L2B - L1B \times L2A \neq 0$$

holds, $\alpha$ and $\beta$ can be reversely calculated from the pixel values, so it is determined by image processing whether the portion to be read is a stepped portion.

A case wherein there are two directions of light sources and two types of small illumination regions having different light amount ratios has been described above. Even when three or more light source directions and three or more types of small illumination regions are employed, the same effect as described above can be obtained. With this setting, a new degree of freedom is introduced to the arrangement of the illumination system, so a unit for simplifying stray light processing or the like can be easily constituted.

In the fourth embodiment, it is necessary that the ratio of light amounts from the respective light sources changes between adjacent small illumination regions. As far as this condition is satisfied, the step difference can be detected by performing appropriate processing by the image processing section independently of the light amount ratio.

Fifth Embodiment

A step difference detection apparatus according to the fifth embodiment of the present invention has an arrangement in which a small region is present at the boundary between small illumination regions 321 and 322 and is illuminated with illumination light beams from both illumination directions for the two small illumination regions 321 and 322 on both sides of the boundary.

More specifically, in a linear read region 220, adjacent spots 221 and 222 partially overlap. The remaining portions are the same as those in the above-described embodiments.

An illumination section for uniformly illuminating each small illumination region only from one direction and strictly switching the illumination direction at the boundary of small illumination regions is not practical. An optical system for realizing such an image sensing section may be very expensive.

In the fifth embodiment, the small boundary region is formed near the boundary between the small illumination regions 321 and 322. With this arrangement, the requirement for the optical system is relaxed, resulting in a decrease in cost.

When the boundary between the small illumination regions 321 and 322 is blurred, the pixel values of the curves such as dark and bright lines formed due to the step difference on a letter 200 may have no obvious discontinuity.

However, in this case as well, the periodicity or phase of the bright and dark portions of the curves generated by the step difference still matches the boundary position between the small illumination regions 321 and 322. For this reason, when processing by the image processing section is optimized, the stepped portion can be determined.

The same effect as described above can be expected even when a small region at the boundary between the small illumination regions 321 and 322 is not illuminated with illumination light from either illumination directions for the two regions on both sides of the boundary.

When the image processing section simply neglects the output pixel values from the small region, the stepped portion can be detected by almost the same processing as in the absence of the small region.

Sixth Embodiment

Figure 13:
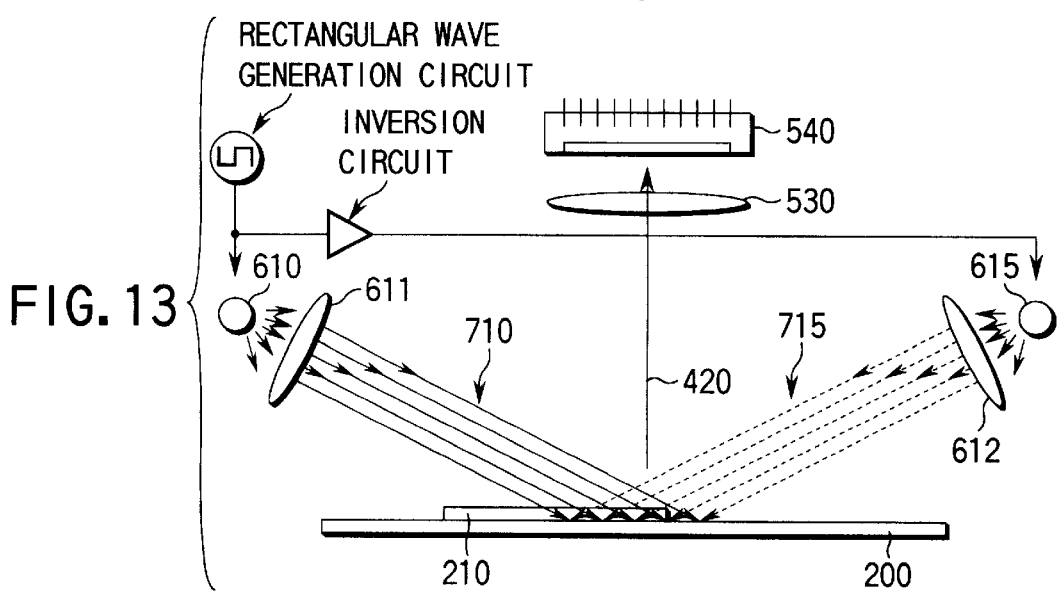
FIG. 13 is a front view showing a step difference detection apparatus according to the sixth embodiment of the present invention.

FIG. 13 shows the arrangement of a step difference detection apparatus according to the sixth embodiment of the present invention. This step difference detection apparatus also comprises three sections: an illumination section, an image sensing section, and an image processing section, as in the first embodiment. In the first embodiment, the illumination section simultaneously illuminates a plane with illumination light beams from the left and right sides along a line parallel to the carrier direction of a letter 200. In the sixth embodiment, however, two illumination units arranged on a line perpendicular to the carrier direction of the letter 200 alternately illuminate the plane with illumination light beams.

More specifically, as shown in FIG. 13, the letter 200 is carried from the front side to the back side of the drawing. Light emitted from a light source 610 on the left side of FIG. 13 is converted into a plate-like parallel beam by a planar collimating device 611 and illuminates the linear read region.

Light emitted from a light source 615 on the right side of FIG. 13 is also converted into a plate-like parallel beam by a planar collimating device 612 and illuminates the linear read region. The two light sources 610 and 615 have the same illumination capabilities.

The light sources 610 and 615 are controlled by a drive circuit comprising a rectangular wave generation circuit and an inversion circuit to alternately emit light in synchronism with the carrying operation of the letter 200.

As the image sensing section, a line image sensor 540 is used. The image of the linear read region is formed on the line image sensor 540 through an imaging lens 530.

The linear read region is perpendicular to the carrier direction (subscanning direction) of the letter 200. Every time the letter 200 is carried by a predetermined distance, e.g., 5 mm, the illumination direction is switched.

The illumination direction projected on the letter 200 matches the main scanning direction perpendicular to the carrier direction of the letter 200 or is included in a small angular range centered on the main scanning direction.

Figure 14:
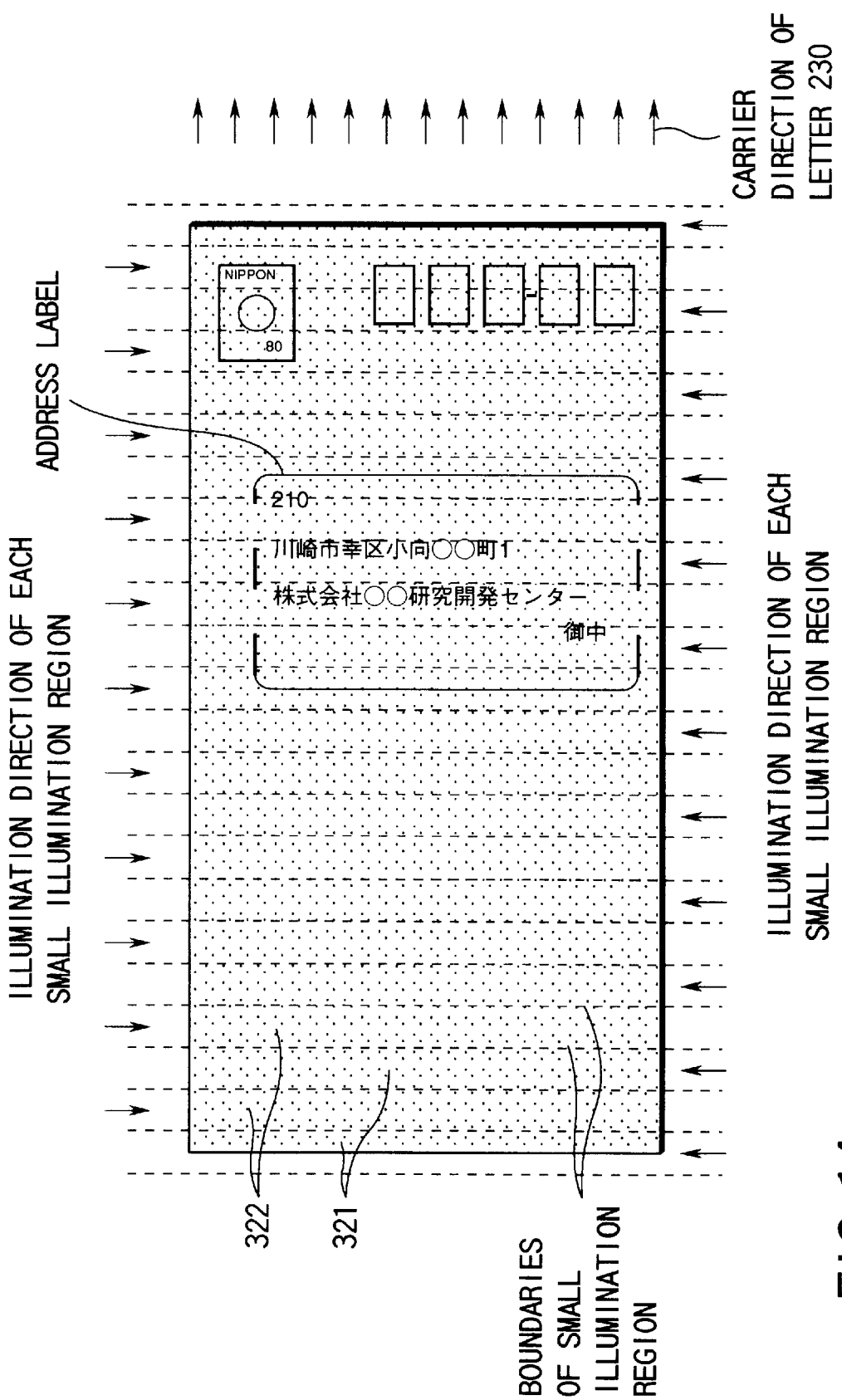
FIG. 14 is a view showing an image output from the image sensing section of the step difference detection apparatus according to the sixth embodiment.

When the two light sources 610 and 615 for emitting light beams in different directions are alternately caused to emit light beams in synchronism with the carrying operation of the letter 200 to time-divisionally switch the illumination direction, the entire letter surface is divided into a number of small illumination regions parallel to the main scanning direction, and adjacent small illumination regions are illuminated with illumination light beams from different directions, as shown in FIG. 14.

With this arrangement, an image obtained by rotating the image shown in FIG. 8 through 90° is obtained. That is, as shown in FIG. 14, small illumination regions 321 illuminated with illumination light beams from the light source 610 and small illumination regions 322 illuminated with illumination light beams from the light source 615 are alternately arranged. The boundary between the small illumination regions 321 and 322 is formed not in the subscanning direction but in the main scanning direction. A wave according to the distribution of bright and dark portions at the label edge also appears not on a side parallel to the main scanning direction but on a side parallel to the subscanning direction.

When the wave according to the distribution of bright and dark portions at the label edge is formed on a side parallel to the subscanning direction, the dark or bright lines at the label edge can be processed at the resolution power in the main scanning direction of the line sensor 540.

In a line sensor such as a CCD line sensor, even when the resolution in the main scanning direction is the same as that in the subscanning direction, adjacent pixels are mixed in the subscanning direction upon scanning, so the effective resolution in the subscanning direction tends to be lower than that in the main scanning direction.

Especially, assume that the illumination capability of the illumination units is difficult to sufficiently improve, or the carrying speed of the letter is very high. In this case, if the driving frequency of the CCD line sensor is made lower than the rated frequency, the resolution in the subscanning direction degrades as the frequency lowers, though the resolution in the main scanning direction does not change.

In detecting the label on the letter, even when the detected label position contains an error of several mm, no serious problem is posed. However, when the shadow or bright line at the label edge cannot be detected, label detection fails. In this case, it is important to process the shadow or bright line at the resolution in the main scanning direction.

Seventh Embodiment

Figure 15:
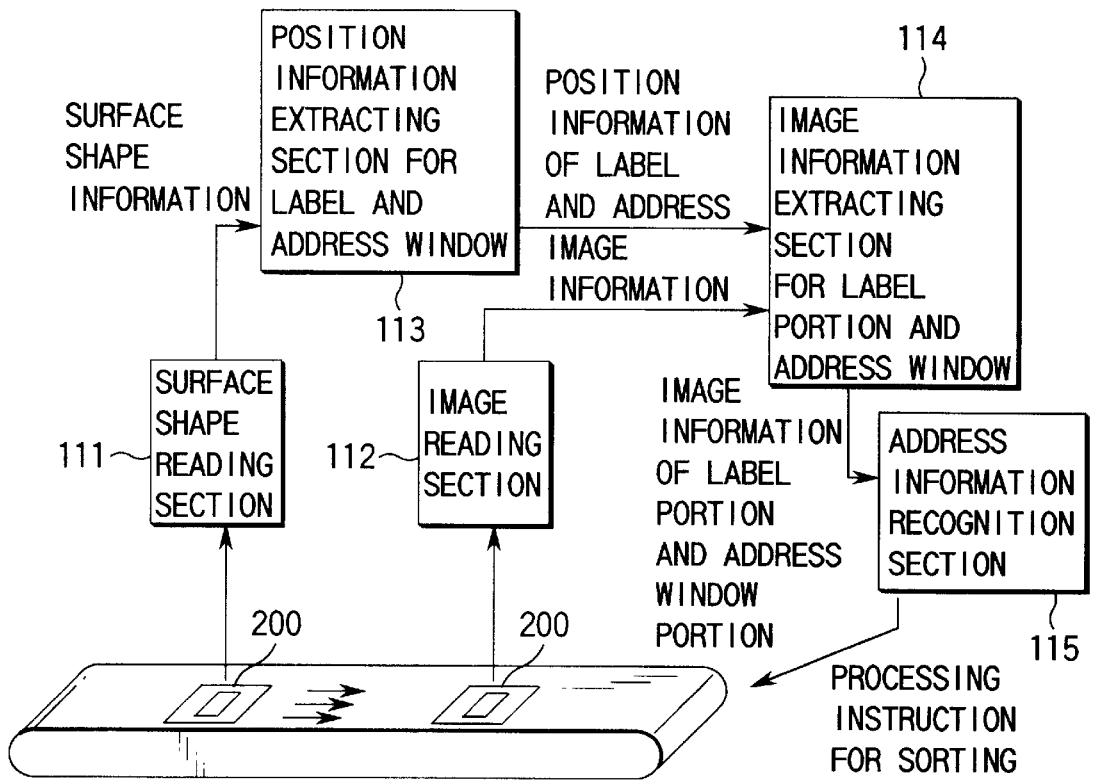
FIG. 15 is a block diagram showing the entire arrangement of a step difference detection processing apparatus according to the seventh embodiment of the present invention.

FIG. 15 shows a step difference detection processing apparatus according to the seventh embodiment of the present invention.

This step difference detection processing apparatus is used as a letter carrying/distributing apparatus for sorting mail items with address labels. This apparatus sorts a letter 200 to be processed while carrying the letter 200.

The letter 200 is carried by the belt of a carrying mechanism of the letter carrying/distributing apparatus. First, a three-dimensional shape due to a step difference on the surface of the letter 200 is read by a surface shape reading section 111 comprising a step difference detection apparatus having the arrangement of one of the above-described embodiments.

The letter 200 whose three-dimensional shape is read by the surface shape reading section 111 is carried to an image reading section 112 side to sense the image of characters or the like written on the upper surface of the letter 200.

A position information extracting section 113 for label and address window determines whether a label or an address window is present, on the basis of the information of the three-dimensional shape read by the surface shape reading section 111. If a label or an address window is present, the position information of the label or address window is output. An image information extraction section 114 for label and address window extracts the image information of the label or address window from the image information obtained by the image reading section 112, on the basis of the position information of the label or address window obtained by the position information extracting section 113.

The extracted image information is sent to an address information recognition section 115. If no label or address window is present, all image information is sent to the address information recognition section 115. The address information recognition section 115 performs image processing of, e.g., analyzing the address information by character recognition/knowledge processing on the basis of the image information of the label or address window portion.

How to distribute mail items is determined, and a processing instruction for sorting mail items is sent to a letter carrying/distributing apparatus 110. The letter carrying/distributing apparatus 110 distributes the letter in accordance with the instruction.

When the step difference detection apparatus of the present invention is used as a step difference detection processing apparatus for controlling the letter carrying/distributing apparatus 110, the address can be efficiently and properly recognized, and the mail items can be properly and quickly sorted.

The surface shape information of the label or address window, which is obtained by the surface shape reading section 111, can be used not only to simply extract the image of the label or address window portion from the image obtained by the image reading section 112 but also for any purposes for processing the image information using the surface shape information.

For example, on the basis of the position information of the stepped region obtained by the surface shape reading section 111, the probability of an address description region is calculated for each region on the upper surface of the letter 200, and address recognition is sequentially performed for the regions in descending order of probabilities.

With this arrangement, even when the first extraction of position information of the address label or address window fails, proper position information of the address label or address window is extracted in the second or subsequent processing, so the probability of success of address recognition increases.

The surface shape information obtained by the surface shape reading section 111 may be used not only to simply extract the image of the label or address window portion from the image obtained by the image reading section 112 but also for any purposes for processing the image information.

The arrangement of the step difference detection processing apparatus is not limited to that shown in FIG. 15. The image reading section 112 may be omitted, and the image obtained by the image sensing section of the surface shape reading section 111 may be used as image information instead of the image obtained by the image reading section 112.

The image obtained by the image reading section 112 is almost the same as that obtained by the surface shape reading section 111 except the stepped portion. Therefore, the image reading section 112 may be omitted, and the surface shape reading section 111 may have the function of the image reading section. In this case, the apparatus is simplified, and cost can be reduced.

The arrangement and purpose of the step difference detection processing apparatus are not limited to those described above. On the basis of the surface shape of the carried letter 200, which is read by the surface shape reading section 111, the position of the flap (folded seal portion of mail) or stamp may be detected to face or sort the letter 200.

As described above, even when the image reading section 112 is omitted, a step difference detection processing apparatus performing useful processing of sorting, distributing, and facing mail items on the basis of the surface shape information obtained by the surface shape reading section 111 can be constituted.

The above-described various modifications can be made. These modifications are incorporated in the present invention within the spirit and scope of the present invention which is to process the read image data using the read surface shape data and effectively use the image data.

Eighth Embodiment

Figure 16:
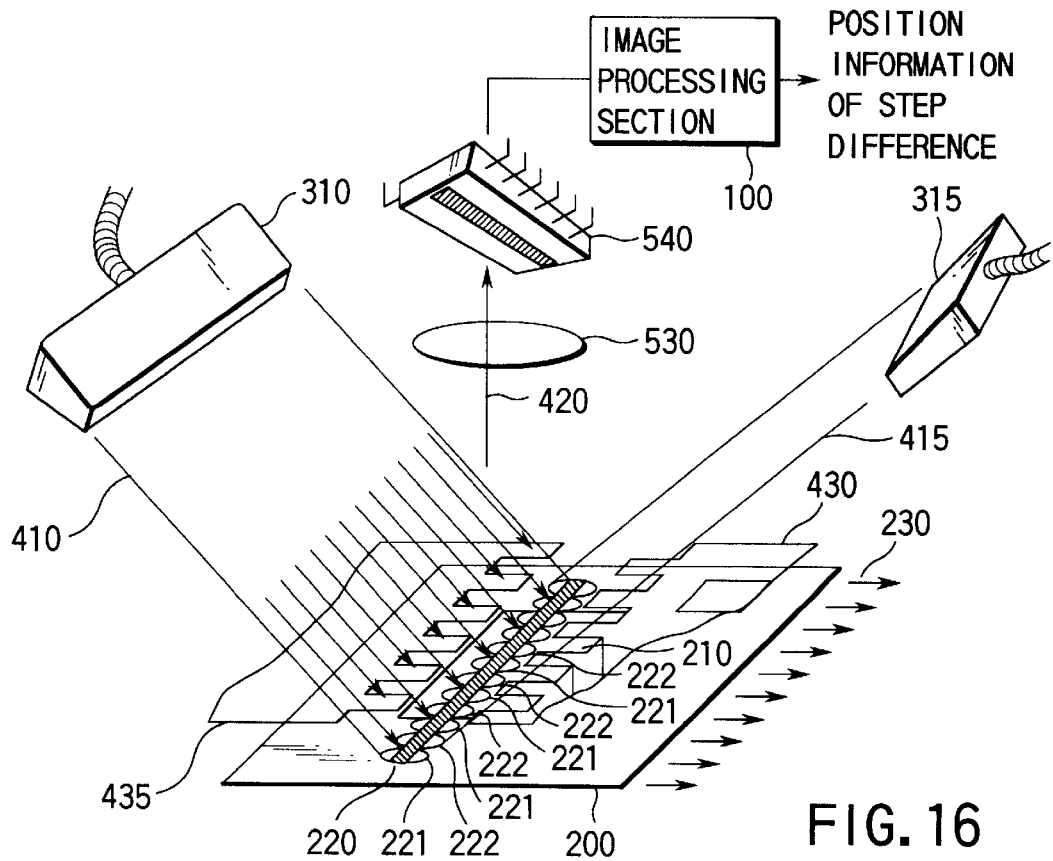
FIG. 16 is a view showing the entire arrangement of a step difference detection apparatus according to the eighth and ninth embodiments.
Figure 17:
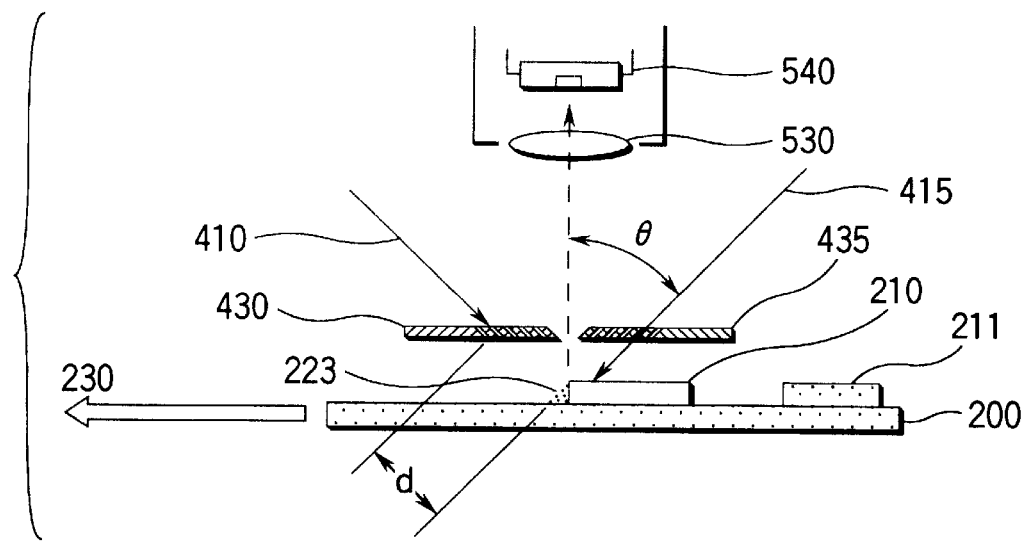
FIG. 17 is a front view of the step difference detection apparatus shown in FIG. 13.
Figure 18:
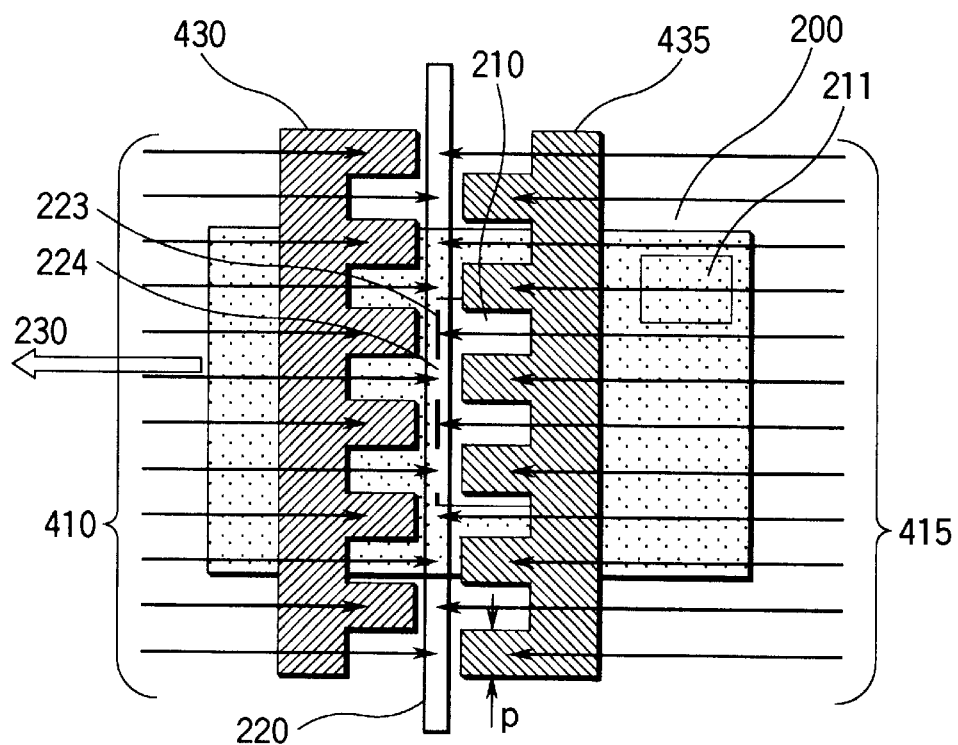
FIG. 18 is a plan view of the step difference detection apparatus shown in FIG. 13.

FIG. 16 shows the overall arrangement of a step difference detection apparatus according to the eighth embodiment of the present invention. FIG. 17 is a front view of the step difference detection apparatus shown in FIG. 16 when viewed from the front side. FIG. 18 is a plan view of the step difference detection apparatus shown in FIG. 16 when viewed from the upper side. The same reference numerals as in FIG. 4 denote the same parts in FIGS. 16 to 18.

The step difference detection apparatus of this embodiment is used as, e.g., a detection apparatus for detecting the position and region of an address label or address indication cellophane window (address window) of mail, and comprises three sections: an illumination section, an image sensing section, and an image processing section.

The illumination section is the most important section as a characteristic feature of this embodiment. The illumination section for illuminating a letter such as mail with illumination light beams from the left and right sides at large incident angles is constituted by two illumination units 310 and 315 for emitting illumination beams from long exit ports to a linear region 220, and two interdigital slits 430 and 435 set near the surface of a letter 200 to select illumination light to be incident on each point to be illuminated.

With the function of these slits as light-shielding portions, illumination light 410 emitted from the illumination unit 310 obliquely from the upper left side and illumination light 415 emitted from the illumination unit 315 obliquely from the upper right side simultaneously illuminate portions alternately arranged in the linear read region 220 on the surface of the letter 200 carried in a subscanning direction 230 by a carrying unit (not shown).

As the left and right illumination units 310 and 315 for emitting illumination beams from the long exit ports to the linear read region 220, linear light guides are used. A linear light guide is formed by arraying the exit ports of a bundle of optical fibers in lines (e.g., two lines along a straight line), on which a light beam emitted from a light source such as a halogen lamp is temporarily focused and made incident. The linear light guide is an optical device suitable to uniformly illuminate a linear region.

The incident angles of the illumination light 410 and the illumination light 415 emitted from the illumination units and reaching the read region 220, i.e., angles θ formed by the illumination light beams and the normal of the surface of the letter 200 equal, and θ is set to be about 45°.

The illumination units 310 and 315 have the same illumination capability. When this system is viewed from the upper side, the illumination units 310 and 315 are symmetrical with respect to the read region 220.

The read region 220 is a linear region whose longitudinal direction is perpendicular to the subscanning direction 230, i.e., parallel to the main scanning direction. The image of this linear region is read by a line image sensor 540 constituting the image sensing section.

The illumination light 410 and the illumination light 415 illuminating the read region 220 are converted into a number of parallel illumination beams at equal intervals through the interdigital slits 430 and 435 shown in FIG. 18 to illuminate the read region 220.

The illumination beams of the illumination light 410 form a number of illumination spots 221 while the illumination beams of the illumination light 415 form a number of illumination spots 222. When the surface of the letter 200 is flat, adjustment is made such that both the illumination light 410 and the illumination light 415 illuminate the linear read region 220 at a uniform illuminance.

Figure 21:
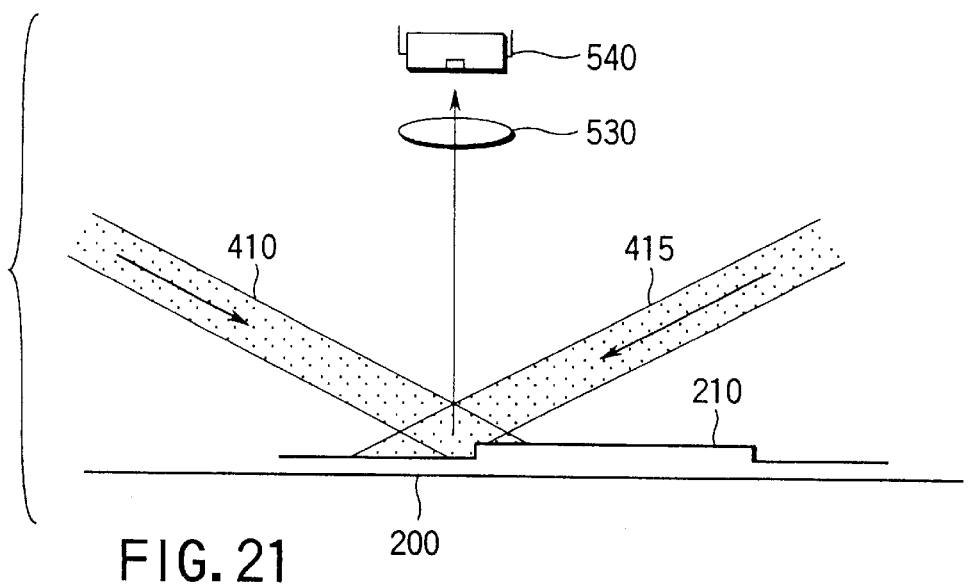
FIG. 21 is a view for explaining an illumination method.
Figure 22:
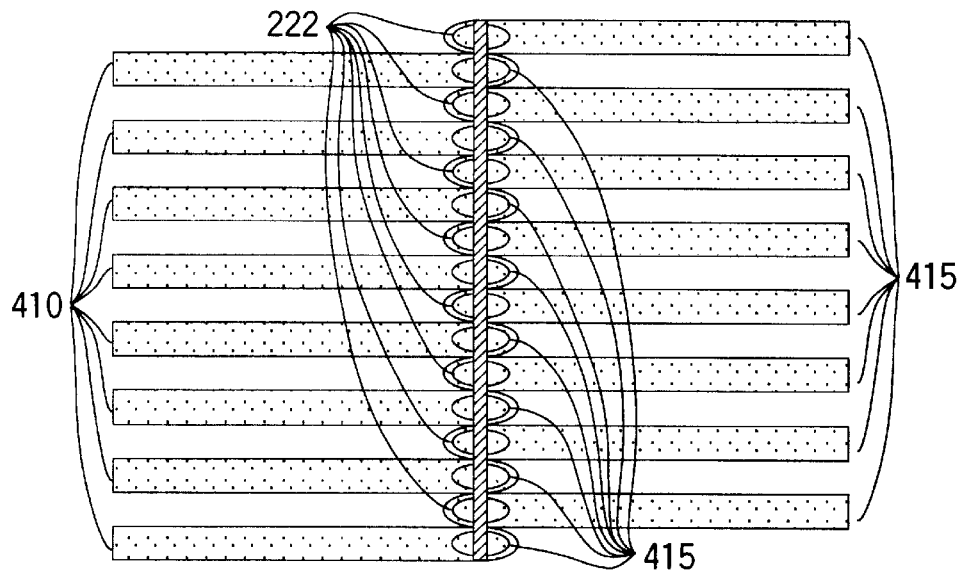
FIG. 22 is a view for explaining the illumination method.

As shown in FIG. 22, a number of illumination spots 221 formed with the illumination light 410 and a number of illumination spots 222 formed with the illumination light 415 alternate (221, 222, 221, 222, . . . ) at equal intervals on the linear read region 220. FIG. 21 is a view for explaining illumination near the address label on the letter 200.

Since the letter 200 is carried in the subscanning direction 230 perpendicular to the longitudinal direction of the linear read region 220, the entire surface of the letter 200 is scanned by the read region 220 from the right to the left.

Figure 23:
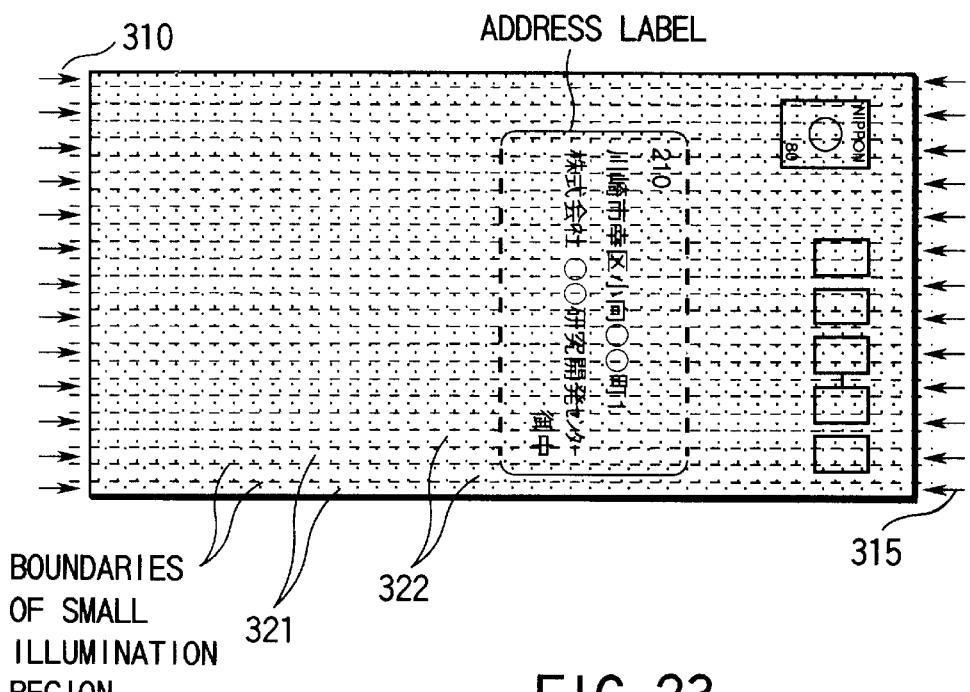
FIG. 23 is a view showing an image output from an image sensing section.

A number of illumination spots 221 and 222 are also scanned from the right to the left across the surface of the letter 200. With this arrangement, the entire surface of the letter 200 is divided into a number of small illumination regions extending in parallel to the subscanning direction 230 along the loci of the illumination spots 221 and 222. FIG. 23 shows this state.

The sensed image of the letter 200 is constituted by a number of small illumination regions 321 formed by the illumination light 410 from the left and a number of small illumination regions 322 formed by the illumination light 415 from the right. The small illumination regions 321 and 322 alternate.

Note that the "small illumination region" means a strip-shaped region having a small width p and extending in the subscanning direction on the upper surface of the letter 200. The "illumination spot" means a small region obtained by dividing the read region of the line sensor by the length p and often means a long region extending in the main scanning direction.

The boundary between the small illumination regions overlaps that between the illumination spots. The locus of each illumination spot, which is formed by scanning the illumination spot in the subscanning direction, corresponds to a small illumination region.

In a description of the characteristics of the illumination section, three parameters p, d, and w to be described below are important. Each slit has a shape as shown in FIG. 18. The slits are staggered each other. The pitch is p, as shown in FIG. 18. As shown in FIG. 17, the slit is arranged at a position separated from the portion to be illuminated by the distance d along the light beam incident direction.

The relationship between the emerging direction of light from the line light guide and the light intensity depends on the characteristics of the optical fibers constituting the line light guide. The divergence width w is used to represent the degree of divergence of light emitted along the central axis of the optical fiber.

Figure 19:
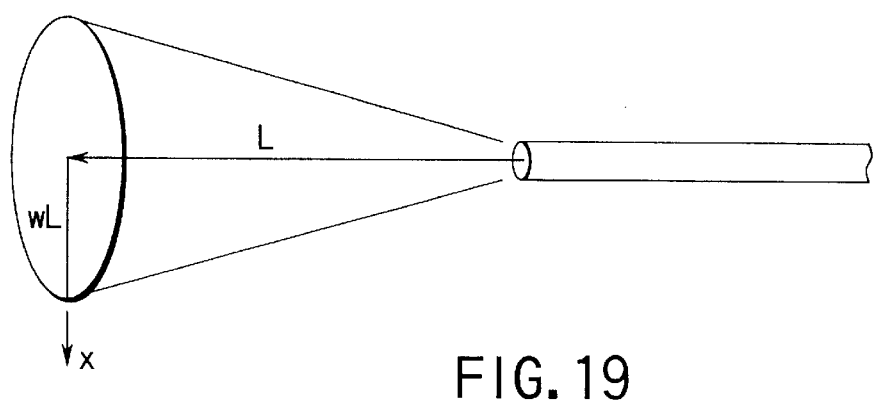
FIG. 19 is a view for explaining divergence of light emerging from an optical fiber.
Figure 20:
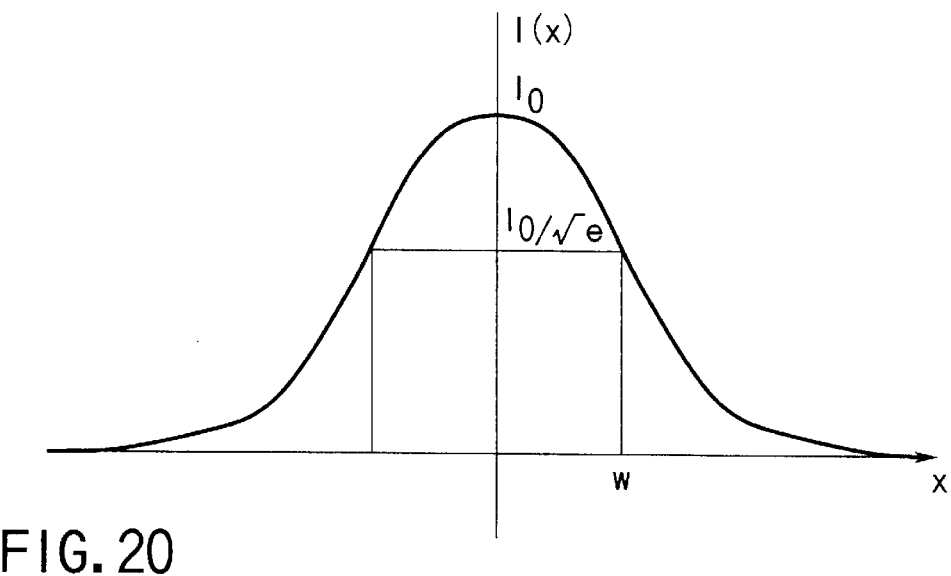
FIG. 20 is a graph for explaining divergence of light emerging from an optical fiber.

In FIGS. 19 and 20, let w be the radius at which the illuminance drops to $1/\sqrt{e}$ times that at the central point of a plane separated from the exit port of the optical fiber by a unit distance. Assume that the diameter of the optical fiber is sufficiently smaller than the unit distance. The three parameters are selected such that p/wd>4 is satisfied.

For example, when w=0.24, p=5 mm, and d=4 mm. As will be described later, the illuminance distribution in the read region can be determined using the three parameters.

As shown in FIG. 16, an imaging lens 530 is positioned above the linear read region 220. The image of the read region 220 is formed on the CCD line image sensor 540 above the imaging lens 530 and sensed.

As the letter 200 is carried in the subscanning direction 230, the CCD line image sensor 540 senses the image of the entire letter 200 and outputs the image. The obtained image data is sent to an image processing section 100 to extract the position information of a step difference.

The schematic arrangement of this embodiment has been described above. The image obtained using the illumination section and the image sensing section will be described below.

Because of the presence of the interdigital light-shielding plates 430 and 435, the image obtained by the illumination section and the image sensing section as shown in FIG. 16 is the same as that obtained by normal illumination for illuminating the plane from both sides except the stepped portion such as a label edge.

That is, a simple image reflecting the density distribution or reflection ratio distribution on the letter 200 is obtained. However, at the label edge portion and, particularly, at an edge in the main scanning direction perpendicular to the carrier direction 230, the output pixel value changes depending on the illumination direction, left or right, due to the oblique illumination effect (effect of illumination using collimated light at a large incident angle).

A bright line or a dark line is formed in accordance with the illumination direction and the edge direction. More specifically, when the edge portion is illuminated obliquely from the higher side of the step, a dark line is formed. When the edge portion is illuminated obliquely from the lower side of the step, a bright line is formed.

When a label edge is present across the boundary between adjacent small illumination regions, transition from a bright line to a dark line or vice versa occurs at the boundary of the adjacent small illumination regions, so discontinuity of bright and dark portions is generated between the adjacent small illumination regions. FIG. 23 shows this image.

Referring to FIG. 23, the left and right label edges of the address label are almost straight. Bright lines and dark lines alternate at a specific phase and a specific period corresponding to the interval of the interdigital illumination, so an image indicated by broken lines is obtained at the label edge portion.

By detecting the period and phase of this signal, the presence of a step difference such as a label edge can be known. This is the principle of step difference detection of this scheme. The image of the right end of the label is the same as that of the left end, though the phase of the signal of the edge portion is inverted. That is, a bright line portion at the right end corresponds to a dark line at the left end, and a dark line at the right end corresponds to a bright line at the left end. The right and left ends of the label can be identified from this fact.

As a specific method of detecting the edge, image processing such as pattern matching can be used.

As described above, in this embodiment, the illumination region is illuminated from the illumination direction which is switched to the left side to right side at every interval with certain length p, thereby detecting the position or region of a step difference.

The interdigital illumination directions are realized using the interdigital slits shown in FIG. 18. As described above, when p/wd>4 is satisfied in association with the shape and set position of the slits, satisfactory detection characteristics can be realized.

This condition is necessary to prevent the illumination light 415 from the right side from straying into the illumination spots 221 to be illuminated with the illumination light 410 from the left side in the arrangement shown in FIG. 16. This condition will be described below in detail.

First, the illuminance distribution in the absence of the slits will be described. As shown in FIG. 17, d is the distance between the interdigital light-shielding plate and the portion to be illuminated (read region 220) along the illumination direction of illumination light.

The value w is an index representing the degree of divergence of light emitted from the optical fiber constituting the linear light guide used as the light source. The definition of the value w will be described with reference to FIGS. 19 and 20.

In FIG. 19, one optical fiber (sectional area ΔA) is placed on the Z-axis such that a distance L between the exit port and the origin becomes sufficiently larger than the size of the fiber section. The plane to be illuminated is set on the X-Y plane, and the illuminance distribution on the X-axis is measured. In many cases, this illuminance distribution can be approximated as follows.

$$I(x) = I_0 e^{-\frac{1}{2}\left|\frac{x}{w}\right|^c} \qquad (1)$$

In a typical case, w=0.24, and c=2.8. As described above, w can be defined as the FWHM of the illuminance distribution formed on the plane separated by a unit distance. Letting D be the distance between the optical fiber having the sectional area ΔA and the above exit light divergence characteristics and the portion to be illuminated, the illuminance at the portion to be illuminated is given by:

$$\frac{I(x/D)}{D^2} \Delta A \qquad (2)$$

When both the width of the exit port and the width of the portion to be illuminated are sufficiently small, and the incident direction θ shown in FIG. 17 is not 0, the illuminance at the portion to be illuminated can be obtained by simply multiplying the above equation by |cos θ|. Therefore, an illuminance distribution I(x, y) on a plane separated, by the distance D, from the line fiber having an exit port with a width ΔY and a length of ΔX is given by:

$$I(x, y) = \cos\theta \int_{-\Delta Y/2}^{+\Delta Y/2} dY \int_{-\Delta X/2}^{+\Delta X/2} dX \frac{I\left(\frac{\sqrt{(x-X)^2 + (y-Y)^2}}{D}\right)}{D^2} \qquad (3)$$

An arrangement with slits will be considered. Assume that the plane to be illuminated is set on the X-Y plane, the optical fiber constituting the linear light guide is set in parallel to the Z-axis, the central point of the exit port set at (x, y, z)=(0, 0, D), and the longitudinal direction of the exit port is parallel to the X direction.

Also, assume that the slit is set on a plane z=d, and light is transmitted when 2np<x<(2n+1)p and shielded when (2n−1)p<x<2np (n is an integer). The illuminance distribution on the plane to be illuminated by an illumination system constituted by the linear light guide and the slits is calculated.

When the exit port of the linear light guide is sufficiently long in the X direction (ΔX/p>>1), translation symmetry is established in the X direction. At this time, if the system is cut along a plane perpendicular to the X-axis, light having divergence represented by the expression of I(x) is emitted from the light source having a width ΔY on z=D.

When the system is cut along a plane perpendicular to the Y-axis, a light source having an infinite length is present on z=D, so the light source is viewed from the portion to be illuminated through the slit present on z=d. The luminance of a light beam emitted from the light source in a certain direction does not change before and after it is transmitted through the slit. For this reason, this state is equivalent to a case wherein a light source having divergence represented by I(x) is present at the transmission portion of the slit. When the illuminance on the X-axis in the plane to be illuminated is to be considered, the illuminance can be calculated assuming that light sources for emitting light with divergence represented by I(x) and having a width of (d/D) ΔY and the length p are arranged at the interval p on a line on z=d and y=0. A function is defined:

$$H(x) = \begin{cases} 1 & (2n < x < 2n+1, n \text{ is an integer}) \\ 0 & (2n-1 < x < 2n, n \text{ is an interger}) \end{cases} \qquad (4)$$

Using this function, the transmission ratio of the slit having a pitch of 2p (width p) is represented by H(X/p). This yields $$I(x, y = 0) = \int_{-\frac{d}{D}\frac{\Delta Y}{2}}^{+\frac{d}{D}\frac{\Delta Y}{2}} dY \int_{-\Delta X/2}^{+\Delta X/2} dX \, H(X/p) \frac{I\left(\frac{\sqrt{(x-X)^2 + (0-Y)^2}}{d}\right)}{d^2} \qquad (5)$$

$$\cong \frac{\Delta Y}{Dd} \int_{-\infty}^{\infty} H(X/p) I\left(\frac{|x-X|}{d}\right) dX$$

$$= I_0 w \frac{\Delta Y}{D} \int_{-\infty}^{\infty} H\left(\frac{x}{p} - \frac{X}{\frac{p}{wd}}\right) e^{-\frac{|x|^c}{2}} dX$$

This equation reveals that the illuminance distribution I(x, y=0) at the portion to be read is determined by the coefficient p/wd (more specifically, the illuminance distribution also depends on the function form of I(x). In this case, exp{−|x|$^{c/2}$}). Integration of the above equation is equivalent to integration of exp{|x|$^{c/2}$} within the integration range of the length of p/wd which appears at a predetermined interval of 2 p/wd. When the central peak of exp{|x|$^{c/2}$} is positioned at the center in this integration range, the above equation takes the maximum value $I_{max}$(p/wd). When the central peak of exp{|x|$^{c/2}$} is positioned at the center in the integration range, the above equation takes the minimum value $I_{min}$(p/wd).

The maximum value of I(x, y=0) is obtained when x/p=+½, i.e., a portion near the center of exp{−|x|$^{c/2}$} is to be integrated, and the minimum value is obtained when x/p=−½.

However, when the width of the integration range is about ⅓ the full width of exp{|x|$^{c/2}$}, contribution of the peripheral portion of exp{|x|$^{c/2}$} becomes larger than that of the central portion, and the maximum value is replaced with the minimum value. When the width of the integration range is sufficiently larger than the width of exp{|x|$^{c/2}$}, $$I(x = p/2, y = 0) = I_{max}(p/wd = \infty) = I_0 w \frac{\Delta Y}{D} \int_{-\infty}^{\infty} e^{-\frac{|x|^c}{2}} dX \qquad (6)$$

In addition, $$I(x = p/2, y = 0) = I_{\min}(p/wd = \infty) = \quad (7)$$

$$I_0 w \frac{\Delta Y}{D} \left\{ \int_{x<-x_L} e^{-\frac{|x|^c}{2}} dX + \int_{x>x_L} e^{-\frac{|x|^c}{2}} dX \right\}^{(X_L \to \infty)=0}$$

The difference between the maximum value and the minimum value is $I_{max}(\infty)$. The "modulation ratio" can be defined on the basis of this value. More specifically, let $I_L(x, p/wd)$ be the illuminance of the illumination light from the left side, and $I_R(x, p/wd)$ be the illuminance of the illumination light from the right side. At this time, $I_R(x, p/wd) = I_{max}(\infty) - I_L(x, p/wd)$ holds. Using this equation, $|I_L(x, p/wd) - I_R(x, p/wd)|/I_{max}(\infty)$ is defined as the modulation ratio at a point x. Especially, the modulation ratio when $x = \pm p/2$ at which $I_L(x, p/wd)$ or $I_R(x, p/wd)$ takes the maximum value or the minimum value will be simply referred to as a "modulation ratio". That is, a value obtained by dividing, by the reference illuminance value, the difference between the maximum illuminance and the minimum illuminance when the slit is inserted is the "modulation ratio".

As described above, the "modulation ratio" of the illuminance in the region to be illuminated due to the interdigital slit depends only on p/wd. When p/wd is small, the slit pattern completely becomes blurred on the plane to be illuminated, so no sufficient "modulation ratio" can be obtained. This also impedes detection of a step difference. When p/wd is sufficiently large, the slit pattern is projected on the plane to be illuminated, and a sufficient "modulation ratio" can be obtained.

Figure 24:
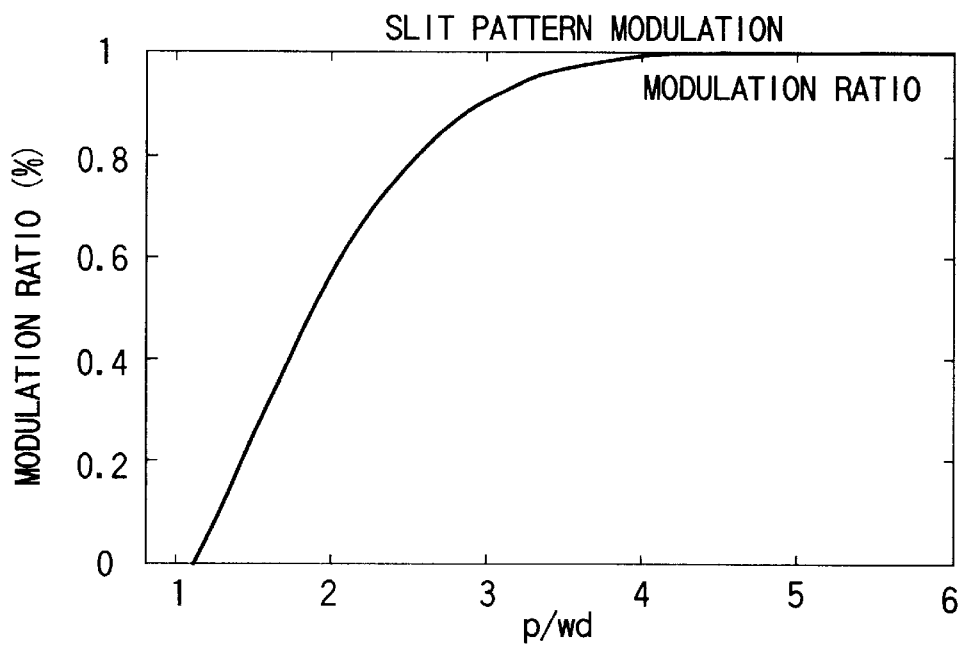
FIG. 24 is a graph showing the relationship between p/wd and the "modulation ratio"

FIG. 24 is a graph showing the "modulation ratio" for the value p/wd. Referring to FIG. 24, the "modulation ratio" of interdigital illumination, i.e., the standardized value of the illuminance difference between the central portions of adjacent small illumination regions is 0 when p/wd=1.1. If p/wd>1.1 is not satisfied, step difference detection based on a characteristic pattern cannot be performed in this embodiment. More practically, the "modulation ratio" is preferably 100% because the illumination light can be effectively utilized.

Referring back to FIG. 24, in this sense, when p/wd>4, it can be said that p/wd is sufficiently large.

Figure 25:
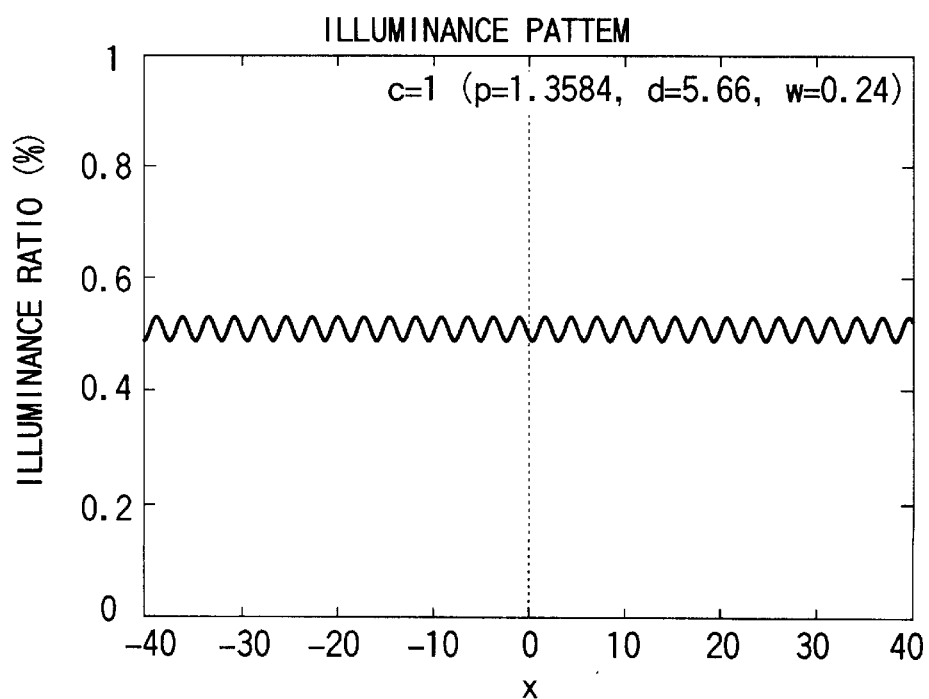
FIG. 25 is a graph showing the illuminance distribution when p/wd=1.

On the basis of the above calculation, the illuminance distribution in the linear read region 220 was calculated while setting p, d, and w at various values. FIG. 25 is a graph showing the illuminance distribution when p/wd=1. In this case, since the slit pitch is too small, the distance between the slit and the read region is too large, or the directivity of the illumination light 410 and 415 is insufficient, the interdigital pattern completely becomes blurred. The light from the left and right sides are mixed across the read region.

Figure 26:
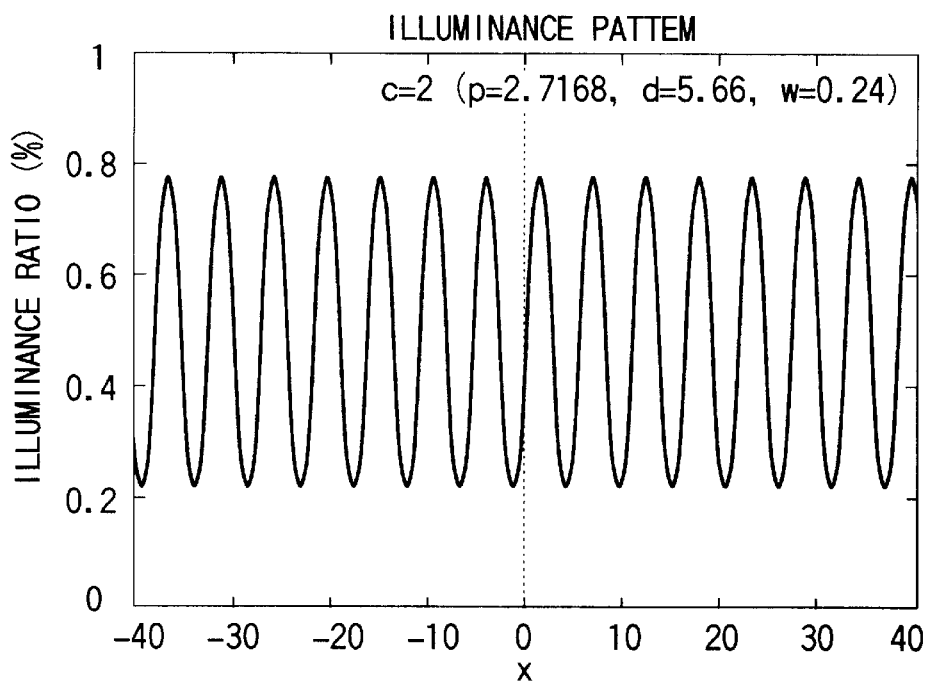
FIG. 26 is a graph showing the illuminance distribution when p/wd=2.
Figure 27:
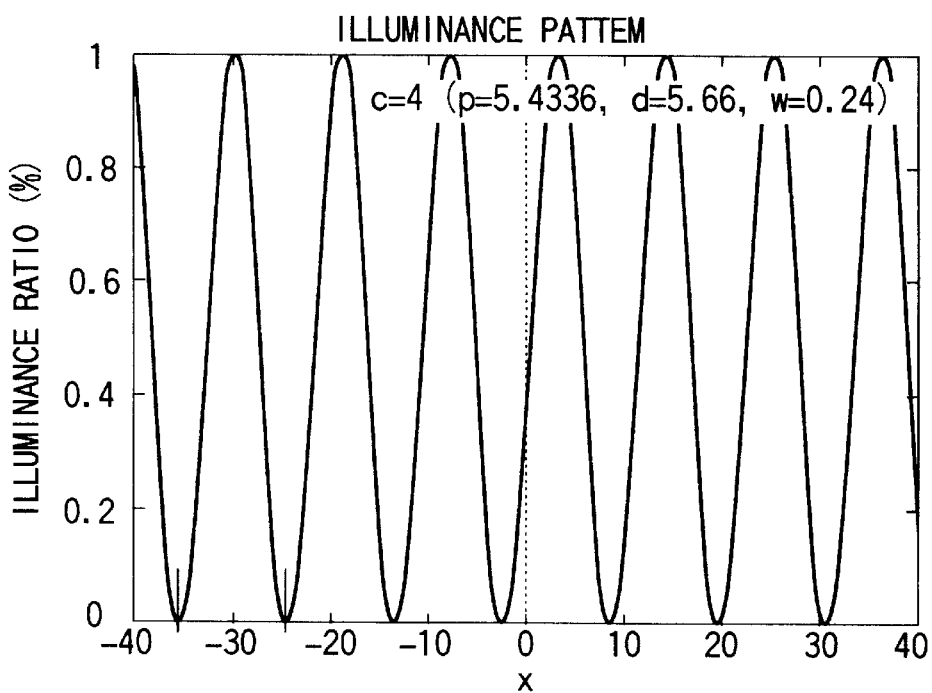
FIG. 27 is a graph showing the illuminance distribution when p/wd=4.

This state is equivalent to a state wherein the read region is illuminated with light sources having a ½ light intensity without inserting the slit, so the step difference cannot be detected. FIG. 26 is a graph showing the illuminance distribution when p/wd=2. In this case, the "modulation ratio" is about 55%. Since any portions in the read region 220 are illuminated with the illumination light beams from both the left and right sides, the contrast between bright lines and dark lines at the stepped portion is low. Although the step difference can be detected, the "modulation ratio" is much lower than the maximum value. FIG. 27 is a graph showing the illuminance distribution when p/wd=4.

Figure 28:
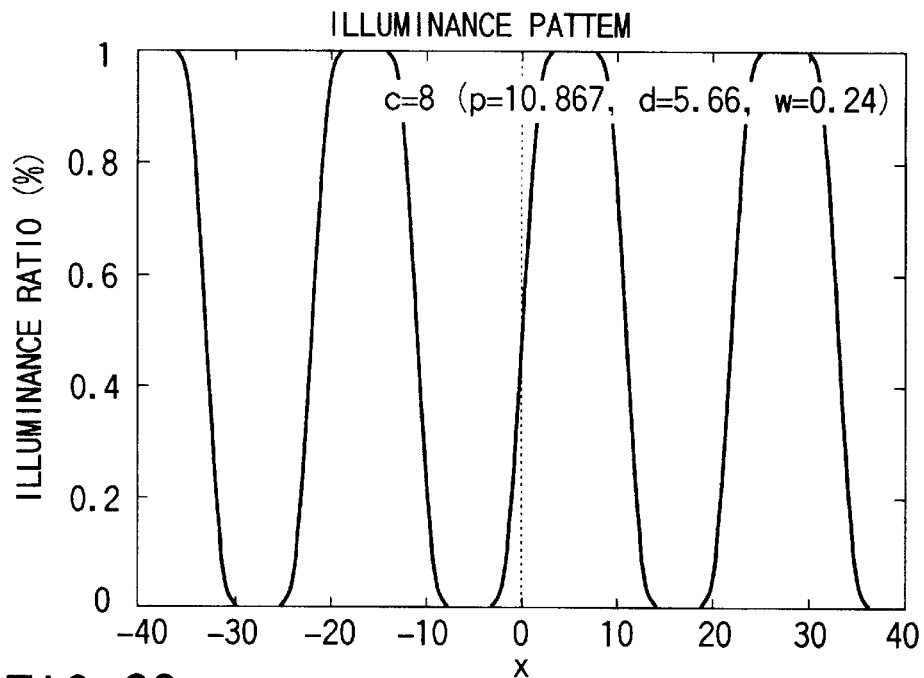
FIG. 28 is a graph showing the illuminance distribution when p/wd=8.

In this case, the "modulation ratio" is almost 100%, so the light from the left side and that from the right side are sufficiently separated near the central point of each small illumination region. The position of the stepped region (address label) can be detected at the resolution corresponding to p in the main scanning direction. FIG. 28 is a graph showing the illuminance distribution when p/wd=8. In this state, the boundaries between small illumination regions can be sufficiently discriminated.

A supplementary explanation will be made for the reason why the threshold value of 4 is set for p/wd. As described above, the threshold value of 4 is determined to ensure a sufficient illuminance difference between the central portions of adjacent small illumination regions. The reason why the reference is set while placing an importance only on the central portions will be described.

When illumination as in this embodiment is actually made, an image as shown in FIG. 23 is obtained. Detection of a stepped region from this image is performed by image processing. If the stepped region to be detected is an address label on a letter, processing contents can be considerably simplified as compared to detection of a stepped region in a general shape. As one of the reasons for this, since most address labels have rectangular shapes and straight label edges, simple processing suffices as compared to detection of a general shape.

As another reason why the required position detection accuracy is relaxed, the label has a size on the order of several cm. In most cases, to shorten the address recognition processing time or avoid erroneous recognition for a limited address region, the accuracy on the order of several mm or less is not required.

To use the method of this embodiment, the illuminance distribution modulation ratio at least near the central portion of a small illumination region need be sufficient. However, the modulation ratio near the boundary between the small illumination regions need not always be high (i.e., the pattern may be blurred). In this case, the accuracy of stepped region position detection is about p in the main scanning direction.

To obtain a detection accuracy on the order of several mm or less, the pitch p of interdigital illumination need be several mm or less. If the illumination pattern near the boundary between the small illumination regions is blurred, the label edge position can be specified from only pixel data near the central portions of the small illumination regions at the accuracy corresponding to p by applying a powerful line extraction algorithm such as Hough transform.

That is, to obtain the required accuracy almost corresponding to p, the "modulation ratio" at the central portions of the small illumination regions must be sufficient, and for this purpose, p/wd>4 need hold.

The effects of the step difference detection apparatus of this embodiment will be described below. In this embodiment, special illumination is performed using the interdigital slits, thereby detecting a step difference at a high accuracy and likelihood.

The image obtained by the method of the present invention is considerably similar to that obtained by the conventional uniform illumination without the interdigital structure and reflecting the density distribution on the letter. However, the image is modulated at the label edge portion by a signal having a specific period and specific phase. For this reason, information for step difference detection can be extracted from the resultant image, and additionally, the obtained image can be used to recognize characters printed on the label.

The illumination unit according to the present invention can be easily realized without using light sources having high parallelism, and instead, by setting interdigital light-shielding plates in accordance with conditions described in claims. The interdigital slit can be formed at very lost cost and provides a large effect for step difference detection.

When the step difference detection apparatus of this embodiment is incorporated in an automatic postal address reading and sorting machine or the like, the region of an address label or address window where the address is described can be quickly and properly detected by an address recognition section to improve the address recognition ratio and processing speed, i.e., a synergy effect can be obtained. Most automatic postal address reading and sorting machines incorporate upper letter surface image reading apparatuses.

For this reason, the step difference detection function can be added to the original functions only at cost of setting the interdigital light-shielding plates near the read region.

An embodiment of the present invention has been described above in detail. However, the present invention is not limited to this embodiment.

For example, the CCD line sensor must have a resolution of at least 100 μm to detect the stepped portion in the subscanning direction. However, the resolution in the main scanning direction need not so high to detect the step difference.

However, when the resolution in the main scanning direction is as high as 100 μm, the acquired image can also be used for character recognition. The step difference can be detected even when one or several points are selected in each small illumination region, and the information amount in the main scanning direction is decreased.

When the interdigital light-shielding plate (slit) is inserted between the line illumination and the linear read region 220, the illuminance pattern on the linear read region is determined by the shape of a small part of the interdigital light-shielding plate.

Figure 29:
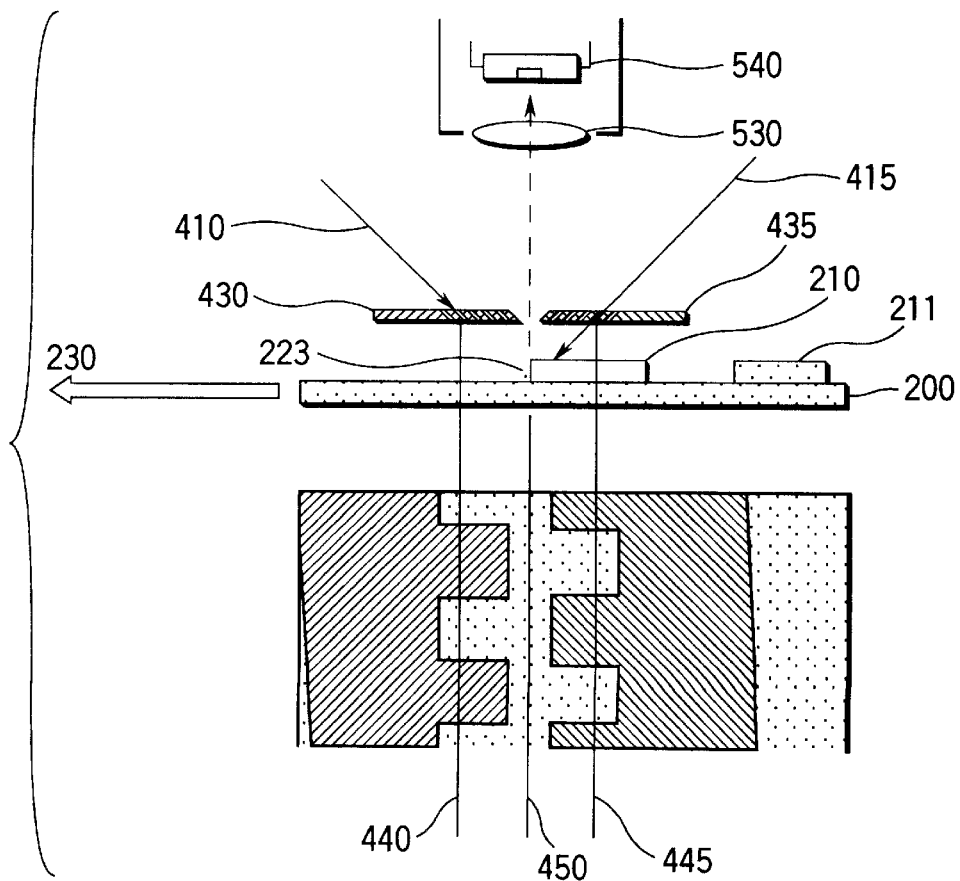
FIG. 29 is a view for explaining a light-shielding plate (slit)

That is, in FIG. 29, the light beam emitted from the line illumination to the linear read region is almost included in two planes (planes including the illumination light 410 or 415) extending obliquely at 45° on both sides of the linear read region.

Figure 31:
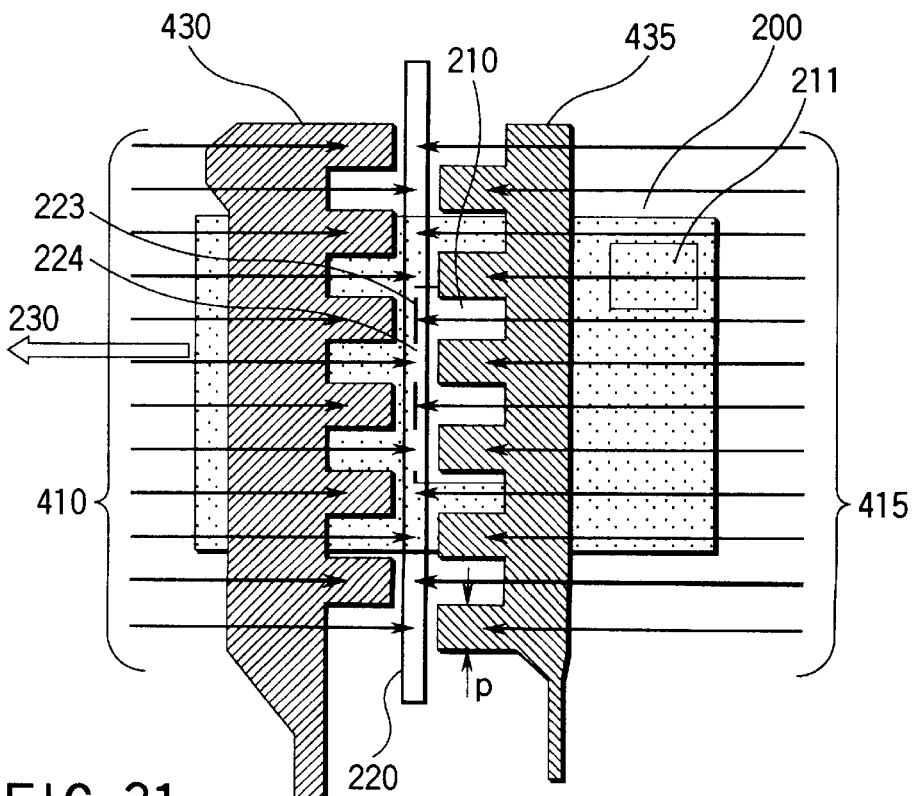
FIG. 31 is a view showing the second modification of the slit.

Therefore, for the light-shielding plate, the shape of a portion where the light-shielding plate crosses the two planes is important. When the arrangement of the light-shielding portions and transmission portions on straight line portions 440 and 445 shown in FIG. 29 remains the same, the illuminance pattern on the linear read region does not change even when the shape of the remaining portion changes. Therefore, either the light-shielding plate as shown in FIG. 18 or that as shown in FIG. 31 can be used to obtain the same effect.

Since the light-shielding plate must not impede the image sensing section from reading the read region, a gap 450 must be formed near the read region. However, to detect a step difference, image information of the entire read region is not necessary. A step difference can be detected using information of only one or several points in each small illumination region.

Figure 30:
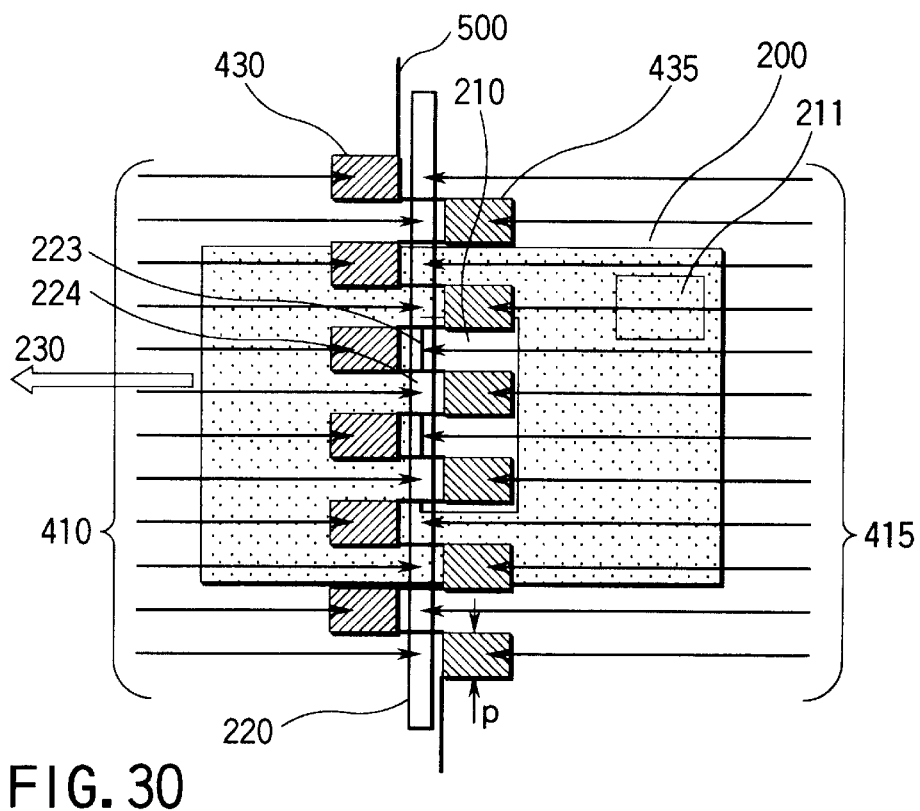
FIG. 30 is a view showing the first modification of the slit.

Therefore, as the slit shape, light-shielding portions may be attached to only necessary portions and connected by thin wires 500, as shown in FIG. 30. Even when the wire portion is almost above the boundaries between the small illumination regions, this rarely poses a problem because the illuminance pattern at the boundary portions between the small illumination regions is often blurred and cannot be used for step difference detection.

For the interdigital light-shielding plate, the width of each light-shielding portion and the width of each transmission portion need not always equal. When at least one of the light-shielding portions has a width p for satisfying p/wd>4, the shadow of that portion is formed on the read region at a "modulation ratio" of 100%. In addition, when at least one of the transmission portions has a width p for satisfying p/wd>4, the shadow of that portion is formed on the read region at a "modulation ratio" of 100%. Therefore, the read image at that portion can be used for step difference detection, and this arrangement is also incorporated in the present invention.

The incident angles of the left and right illumination light beams need not always equal.

As described above, various modifications can be made, and these modifications are incorporated in the present invention within the spirit and scope of the present invention.

Ninth Embodiment

FIG. 16 shows the overall arrangement of a step difference detection apparatus according to the ninth embodiment of the present invention. FIG. 17 is a front view of the step difference detection apparatus shown in FIG. 16 when viewed from the front side. FIG. 18 is a plan view of the step difference detection apparatus shown in FIG. 16 when viewed from the upper side. The step difference detection apparatus of this embodiment is used as, e.g., a detection apparatus for detecting the position and region of an address label or address indication cellophane window (address window) of mail, and comprises three sections: an illumination section, an image sensing section, and an image processing section.

The illumination section is the most important section as a characteristic feature of this embodiment. The illumination section for illuminating a letter such as mail with illumination light beams from the left and right sides at large incident angles is constituted by two illumination units 310 and 315 for emitting illumination beams from long exit ports to a linear region 220, and two interdigital slits 430 and 435 set near the surface of a letter 200 to select illumination light to be incident on each point to be illuminated.

With the function of these slits as light-shielding portions, illumination light 410 emitted from the illumination unit 310 obliquely from the upper left side and illumination light 415 emitted from the illumination unit 315 obliquely from the upper right side simultaneously illuminate portions alternately arranged in the linear read region 220 on the surface of the letter 200 carried in a subscanning direction 230 by a carrying unit (not shown).

As the left and right illumination units 310 and 315 for emitting illumination beams from the long exit ports to the linear read region 220, linear light guides are used. A linear light guide is formed by arraying the exit ports of a bundle of optical fibers in lines (e.g., two lines along a straight line), on which a light beam emitted from a light source such as a halogen lamp is temporarily focused and made incident. The linear light guide is an optical device suitable to uniformly illuminate a linear region.

The incident angles of the illumination light 410 and the illumination light 415 emitted from the illumination units and reaching the read region 220, i.e., angles θ formed by the illumination light beams and the normal of the surface of the letter 200 equal, and θ is set to be about 45°.

The illumination units 310 and 315 have the same illumination capability. When this system is viewed from the upper side, the illumination units 310 and 315 are symmetrical with respect to the read region 220.

The read region 220 is a linear region whose longitudinal direction is perpendicular to the subscanning direction 230, i.e., parallel to the main scanning direction. The image of this linear region is read by a line image sensor 540 constituting the image sensing section.

The illumination light 410 and the illumination light 415 illuminating the read region 220 are converted into a number of parallel illumination beams at equal intervals through the interdigital slits 430 and 435 shown in FIG. 18 to illuminate the read region 220.

The illumination beams of the illumination light 410 form a number of illumination spots 221 while the illumination beams of the illumination light 415 form a number of illumination spots 222. When the surface of the letter 200 is flat, adjustment is made such that both the illumination light 410 and the illumination light 415 illuminate the linear read region 220 at a uniform illuminance.

As shown in FIG. 22, a number of illumination spots 221 formed with the illumination light 410 and a number of illumination spots 222 formed with the illumination light 415 alternate (221, 222, 221, 222, . . . ) at equal intervals on the linear read region 220.

Since the letter 200 is carried in the subscanning direction 230 perpendicular to the longitudinal direction of the linear read region 220, the entire surface of the letter 200 is scanned by the read region 220 from the right to the left.

A number of illumination spots 221 and 222 are also scanned from the right to the left across the surface of the letter 200. With this arrangement, the entire surface of the letter 200 is divided into a number of small illumination regions extending in parallel to the subscanning direction 230 along the loci of the illumination spots 221 and 222. FIG. 23 shows this state.

The sensed image of the letter 200 is constituted by a number of small illumination regions 321 formed by the illumination light 410 from the left and a number of small illumination regions 322 formed by the illumination light 415 from the right. The small illumination regions 321 and 322 alternate.

Note that the "small illumination region" means a strip-shaped region having a small width p and extending in the subscanning direction on the upper surface of the letter 200. The "illumination spot" means a small region obtained by dividing the read region of the line sensor by the length p and often means a long region extending in the main scanning direction.

The boundary between the small illumination regions overlaps that between the illumination spots. The locus of each illumination spot, which is formed by scanning the illumination spot in the subscanning direction, corresponds to a small illumination region.

In a description of the characteristics of the illumination section, three parameters p, d, and w to be described below are important. Each slit has a shape as shown in FIG. 18. The slits are staggered each other. The pitch is p, as shown in FIG. 18. As shown in FIG. 17, the slit is arranged at a position separated from the portion to be illuminated by the distance d along the light beam incident direction.

The relationship between the emerging direction of light from the line light guide and the light intensity depends on the characteristics of the optical fibers constituting the line light guide. The divergence width w is used to represent the degree of divergence of light emitted along the central axis of the optical fiber.

In FIGS. 19 and 20, let w be the radius at which the illuminance drops to $1/\sqrt{e}$ times that at the central point of a plane separated from the exit port of the optical fiber by a unit distance. Assume that the diameter of the optical fiber is sufficiently smaller than the unit distance. The three parameters are selected such that p/wd>8 is satisfied. For example, when w=0.24, p=5 mm, and d=4 mm. As will be described later, the illuminance distribution in the read region can be determined using the three parameters.

As shown in FIG. 16, an imaging lens 530 is positioned above the linear read region 220. The image of the read region 220 is formed on the CCD line image sensor 540 above the imaging lens 530 and sensed. As the letter 200 is carried in the subscanning direction 230, the CCD line image sensor 540 senses the image of the entire letter 200 and outputs the image. The obtained image data is sent to an image processing section 100 to extract the position information of a step difference.

The schematic arrangement of this embodiment has been described above. The image obtained using the illumination section and the image sensing section will be described below.

(Because of the presence of the interdigital light-shielding plates 430 and 435), the image obtained by the illumination section and the image sensing section as shown in FIG. 16 is the same as that obtained by normal illumination for illuminating the plane from both sides except the stepped portion such as a label edge.

That is, a simple image reflecting the density distribution or reflection ratio distribution on the letter 200 is obtained. However, at the label edge portion and, particularly, at an edge in the main scanning direction perpendicular to the carrier direction 230, the output pixel value changes depending on the illumination direction, left or right, due to the oblique illumination effect (effect of illumination using collimated light at a large incident angle).

A bright line or a dark line is formed in accordance with the illumination direction and the edge direction. More specifically, when the edge portion is illuminated obliquely from the higher side of the step, a dark line is formed. When the edge portion is illuminated obliquely from the lower side of the step, a bright line is formed.

When a label edge is present across the boundary between adjacent small illumination regions, transition from a bright line to a dark line or vice versa occurs at the boundary of the adjacent small illumination regions, so discontinuity of bright and dark portions is generated between the adjacent small illumination regions. FIG. 23 shows this image.

Referring to FIG. 23, the left and right label edges of the address label are almost straight. Bright lines and dark lines alternate at a specific phase and a specific period corresponding to the interval of the interdigital illumination.

With this arrangement, an image indicated by broken lines is obtained at the label edge portion. By detecting the period and phase of this signal, the presence of a step difference such as a label edge can be known.

This is the principle of step difference detection of this scheme. The image of the right end of the label is the same as that of the left end, though the phase of the signal of the edge portion is inverted. That is, a bright line portion at the right end corresponds to a dark line at the left end, and a dark line at the right end corresponds to a bright line at the left end. The right and left ends of the label can be identified from this fact.

As a specific method of detecting the edge, image processing such as pattern matching can be used.

As described above, in this embodiment, the illumination region is illuminated from the illumination direction which is switched to the left side to right side at every interval with certain length p, thereby detecting the position or region of a step difference.

The interdigital illumination directions are realized using the interdigital slits shown in FIG. 18. As described above, when p/wd>8 is satisfied in association with the shape and set position of the slits, satisfactory detection characteristics can be realized.

This condition is necessary to prevent the illumination light 415 from the right side from straying into the illumination spots 221 to be illuminated with the illumination light 410 from the left side in the arrangement shown in FIG. 16. This condition will be described below in detail.

First, the illuminance distribution in the absence of the slits will be described. As shown in FIG. 17, d is the distance between the interdigital light-shielding plate and the portion to be illuminated (read region 220) along the illumination direction of illumination light.

The value w is an index representing the degree of divergence of light emitted from the optical fiber constituting the linear light guide used as the light source. The definition of the value w will be described with reference to FIGS. 19 and 20. In FIG. 19, one optical fiber (sectional area ΔA) is placed on the Z-axis such that a distance L between the exit port and the origin becomes sufficiently larger than the size of the fiber section. The plane to be illuminated is set on the X-Y plane, and the illuminance distribution on the X-axis is measured. In many cases, this illuminance distribution can be approximated as follows.

$$I(x) = I_0 e^{-\frac{1}{2}\left|\frac{x}{w}\right|^c} \tag{8}$$

In a typical case, w=0.24, and c=2.8.

As described above, w can be defined as the FWHM of the illuminance distribution formed on the plane separated by a unit distance. Letting D be the distance between the optical fiber having the sectional area ΔA and the above exit light divergence characteristics and the portion to be illuminated, the illuminance at the portion to be illuminated is given by:

$$\frac{I(x/D)}{D^2}\Delta A \tag{9}$$

When both the width of the exit port and the width of the portion to be illuminated are sufficiently small, and the incident direction θ shown in FIG. 17 is not 0, the illuminance at the portion to be illuminated can be obtained by simply multiplying the above equation by |cos θ|. Therefore, an illuminance distribution I(x, y) on a plane separated, by the distance D, from the line fiber having an exit port with a width ΔY and a length of ΔX is given by:

$$I(x, y) = \cos\theta \int_{-\Delta Y/2}^{+\Delta Y/2} dY \int_{-\Delta X/2}^{+\Delta X/2} dX \frac{I\left(\frac{\sqrt{(x-X)^2+(y-Y)^2}}{D}\right)}{D^2} \tag{10}$$

An arrangement with slits will be considered. Assume that the plane to be illuminated is set on the X-Y plane, the optical fiber constituting the linear light guide is set in parallel to the Z-axis, the central point of the exit port set at (x, y, z)=(0, 0, D), and the longitudinal direction of the exit port is parallel to the X direction.

Also, assume that the slit is set on a plane z=d, and light is transmitted when 2np<x<(2n+1)p and shielded when (2n−1)p<x<2np (n is an integer). The illuminance distribution on the plane to be illuminated by an illumination system constituted by the linear light guide and the slits is calculated.

When the exit port of the linear light guide is sufficiently long in the X direction (ΔX/p>>1), translation symmetry is established in the X direction. At this time, if the system is cut along a plane perpendicular to the X-axis, light having divergence represented by the expression of I(x) is emitted from the light source having a width ΔY on z=D.

When the system is cut along a plane perpendicular to the Y-axis, a light source having an infinite length is present on z=D, so the light source is viewed from the portion to be illuminated through the slit present on z=d. The luminance of a light beam emitted from the light source in a certain direction does not change before and after it is transmitted through the slit. For this reason, this state is equivalent to a case wherein a light source having divergence represented by I(x) is present at the transmission portion of the slit.

When the illuminance on the X-axis in the plane to be illuminated is to be considered, the illuminance can be calculated assuming that light sources for emitting light with divergence represented by I(x) and having a width of (d/D) ΔY and the length p are arranged at the interval p on a line on z=d and y=0. A function is defined:

$$H(x) = \begin{cases} 1 & (2n < x < 2n+1, n \text{ is an integer}) \\ 0 & (2n-1 < x < 2n, n \text{ is an interger}) \end{cases} \tag{11}$$

Using this function, the transmission ratio of the slit having a pitch of 2p (width p) is represented by H(X/p). This yields $$I(x, y=0) = \int_{-\frac{d}{D}\frac{\Delta Y}{2}}^{+\frac{d}{D}\frac{\Delta Y}{2}} dY \int_{-\Delta X/2}^{+\Delta X/2} dX \, H(X/p) \frac{I\left(\frac{\sqrt{(x-X)^2+(0-Y)^2}}{d}\right)}{d^2} \tag{12}$$

$$= \frac{\Delta Y}{Dd} \int_{-\infty}^{\infty} H(X/p) I\left(\frac{|x-X|}{d}\right) dX$$

$$= I_0 w \frac{\Delta Y}{D} \int_{-\infty}^{\infty} H\left(\frac{x}{p} - \frac{X}{\frac{p}{wd}}\right) e^{-\frac{|x|^c}{2}} dX$$

This equation reveals that the illuminance distribution I(x, y=0) at the portion to be read is determined by the coefficient p/wd (more specifically, the illuminance distribution also depends on the function form of I(x).

In this case, exp{−|x|$^{c/2}$}). Integration of the above equation is equivalent to integration of exp{|x|$^{c/2}$} within the integration range of the length of p/wd which appears at a predetermined interval of 2 p/wd.

The illuminance pattern on the read region becomes close to a rectangle as the value of p/wd increases. An illuminance pattern as shown in FIGS. 27 or 28 is obtained. The illuminance pattern due to contribution from the right side is phase-shifted from that due to contribution from the left side by 180°.

To clearly recognize the stepped portion, the difference between the illumination light from the right side and that from the left side is preferably as large as possible, i.e., the modulation ratio is preferably as high as possible. The modulation ratio at a certain point x means a value obtained by dividing the illuminance difference between the left and right illumination light by the sum of illuminances of the left and right illumination light.

In the present invention, a step difference is determined on the basis of a change in luminance at a portion where the illumination direction is switched. At the stepped portion, the luminance largely changes between illumination from the right side and illumination from the left side. When one portion is illuminated from both the left and right sides, no shadow is formed, so the stepped portion can hardly be discriminated from a flat portion.

When the illumination direction is switched in units of small illumination regions, as in this embodiment, illumination light beams from both sides are simultaneously present near the boundary portion between the small illumination regions. For this reason, in such a region where illumination light beams from both sides are present, it is difficult to clearly recognize the stepped portion.

If the label edge is present in this region (by chance), the position of the label edge can hardly be detected. That is, in the region where the illumination light beams from the left and right sides are simultaneously present, it can hardly be determined whether the portion has a step difference.

When p/wd is about 4, the position of the label edge or the like can be specified at an accuracy almost corresponding to p. When this condition is satisfied, the intensity difference between the illumination light from the left and right sides is sufficiently large at least near the central portions of the small illumination regions.

The illumination light beams from both the left and right sides are present at a portion other than the central portions, so the step difference cannot be sufficiently recognized. The label edge can be detected using only the data near the central portions. However, a limitation is imposed on the accuracy corresponding to p because only the data near the central portions can be used.

If p/wd has a larger value, e.g., p/wd>8, the region having a modulation ratio of about 100% extends to the boundary portion between the small illumination regions. Therefore, the region having a low modulation ratio, i.e., the region where step difference detection is difficult becomes narrow. Actually, the edge of the stepped portion may be present in the region with a low modulation ratio. However, as this region narrows, the stepped portion in this region can be detected at a higher accuracy, and the probability that the stepped portion is present in this region also lowers. When the edge of the stepped portion is present in the region having a modulation ratio of almost 100%, the position accuracy is not restricted by the width p of the small illumination region.

The position resolution almost equals the resolution of the line sensor, though it is unlimited in fact. As described above, when p/wd is sufficiently large, considerably high accuracy and resolution can be obtained.

In addition, since the broken line pattern clearly appears, the detection accuracy of the broken line pattern is also improved. However, if p becomes too large, the step difference can hardly be determined, though it depends on the image processing scheme.

Figure 32:
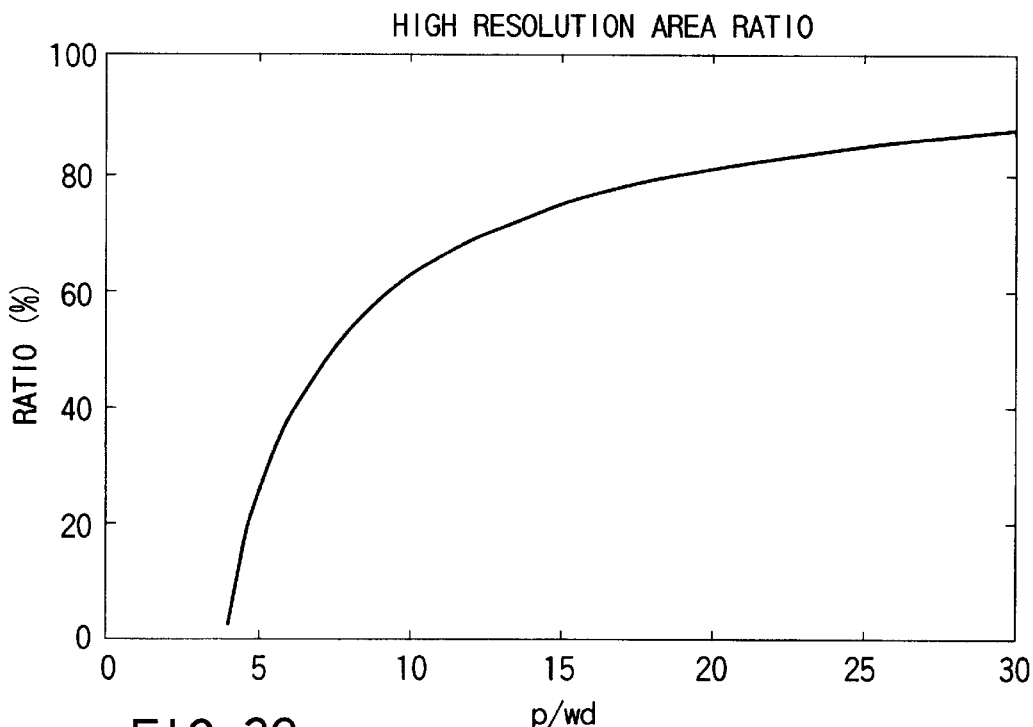
FIG. 32 is a graph showing the ratio of a region where the modulation ratio is 99% or more.

FIG. 32 shows the ratio of an interval where the a modulation ratio is 100% or more in an interval from x=0 to x=p. Referring to FIG. 32, when p/wd>8, the ratio of the high resolution area exceeds 50%.

For example, when p/wd=10, an area having a modulation ratio of 62.8% is a high resolution area. At this time, the end points of the label edges (points at four corners of the label) are included in the high resolution area at a probability of 62.8% and in the low resolution area at a probability of 37.2%. When the points are included in the high resolution area, the end point positions of the label edge are specified at the resolution of the line sensor (e.g., 0.1 mm).

When the points are included in the low resolution area, the end point positions of the label edge are specified at the resolution corresponding to the width of the low resolution area (e.g., when p=5 mm, 5 mm×37.2%=1.86 mm).

On the basis of the above calculation, the illuminance distribution in the linear read region 220 was calculated while setting p, d, and w at various values. FIG. 25 is a graph showing the illuminance distribution when p/wd=1.

In this case, since the slit pitch is too small, the distance between the slit and the read region is too large, or the directivity of the illumination light 410 and 415 is insufficient, the interdigital pattern completely becomes blurred. The light from the left and right sides are mixed across the read region.

This state is equivalent to a state wherein the read region is illuminated with light sources having a ½ light intensity without inserting the slit, so the step difference cannot be detected. FIG. 26 is a graph showing the illuminance distribution when p/wd=2.

In this case, the "modulation ratio" is about 55%. Since any portions in the read region 220 are illuminated with the illumination light beams from both the left and right sides, the contrast between bright lines and dark lines at the stepped portion is low.

Although the step difference can be detected, the "modulation ratio" is much lower than the maximum value. FIG. 27 is a graph showing the illuminance distribution when p/wd=4. In this case, the "modulation ratio" is almost 100%, so the light from the left side and that from the right side are sufficiently separated near the central point of each small illumination region.

The position of the stepped region (address label) can be detected at the resolution corresponding to p in the main scanning direction. FIG. 28 is a graph showing the illuminance distribution when p/wd=8. In this state, the boundaries between small illumination regions can be sufficiently discriminated.

The effects of the step difference detection apparatus of this embodiment will be described below. In this embodiment, special illumination is performed using the interdigital slits, thereby detecting a step difference at a high accuracy and likelihood.

The image obtained by the method of the present invention is considerably similar to that obtained by the conventional uniform illumination without the interdigital structure and reflecting the density distribution on the letter. However, the image is modulated at the label edge portion by a signal having a specific period and specific phase.

For this reason, information for step difference detection can be extracted from the resultant image, and additionally, the obtained image can be used to recognize characters printed on the label.

The illumination unit according to the present invention can be easily realized without using light sources having high parallelism, and instead, by setting interdigital light-shielding plates in accordance with conditions described in claims. The interdigital slit can be formed at very lost cost and provides a large effect for step difference detection.

When the step difference detection apparatus of this embodiment is incorporated in an automatic postal address reading and sorting machine or the like, the region of an address label or address window where the address is described can be quickly and properly detected by an address recognition section to improve the address recognition ratio and processing speed, i.e., a synergy effect can be obtained.

Most automatic postal address reading and sorting machines incorporate upper letter surface image reading apparatuses. For this reason, the step difference detection function can be added to the original functions only at cost of setting the interdigital light-shielding plates near the read region.

The ninth embodiment of the present invention has been described above in detail. However, the present invention is not limited to this embodiment.

For example, the CCD line sensor must have a resolution of at least 100 µm to detect the stepped portion in the subscanning direction. However, the resolution in the main scanning direction need not so high to detect the step difference.

However, when the resolution in the main scanning direction is as high as 100 µm, the acquired image can also be used for character recognition. The step difference can be detected even when one or several points are selected in each small illumination region, and the information amount in the main scanning direction is decreased.

When the interdigital light-shielding plate is inserted between the line illumination and the linear read region 220, the illuminance pattern on the linear read region is determined by the shape of a small part of the interdigital light-shielding plate.

That is, in FIG. 29, the light beam emitted from the line illumination to the linear read region is almost included in two planes (planes including the illumination light 410 or 415) extending obliquely at 45° on both sides of the linear read region.

Therefore, for the light-shielding plate, the shape of a portion where the light-shielding plate crosses the two planes is important. When the arrangement of the light-shielding portions and transmission portions on straight line portions 440 and 445 shown in FIG. 29 remains the same, the illuminance pattern on the linear read region does not change even when the shape of the remaining portion changes.

Therefore, either the light-shielding plate as shown in FIG. 18 or that as shown in FIG. 31 can be used to obtain the same effect. Since the light-shielding plate must not impede the image sensing section from reading the read region, a gap 450 must be formed near the read region.

However, to detect a step difference, image information of the entire read region is not necessary. A step difference can be detected using information of only one or several points in each small illumination region. Therefore, as the slit shape, light-shielding portions may be attached to only necessary portions and connected by thin wires, as shown in FIG. 30.

Even when the wire portion is almost above the boundaries between the small illumination regions, this rarely poses a problem because the illuminance pattern at the boundary portions between the small illumination regions is often blurred and cannot be used for step difference detection.

For the interdigital light-shielding plate, the width of each light-shielding portion and the width of each transmission portion need not always equal. When at least one of the light-shielding portions has a width p for satisfying p/wd>8, the shadow of that portion is formed on the read region at a "modulation ratio" of 100%. In addition, when at least one of the transmission portions has a width p for satisfying p/wd>8, the shadow of that portion is formed on the read region at a "modulation ratio" of 100%. Therefore, the read image at that portion can be used for step difference detection, and this arrangement is also incorporated in the present invention.

The incident angles of the left and right illumination light need not always equal.

As described above, various modifications can be made, and these modifications are incorporated in the present invention within the spirit and scope of the present invention.

10th Embodiment

Figure 33:
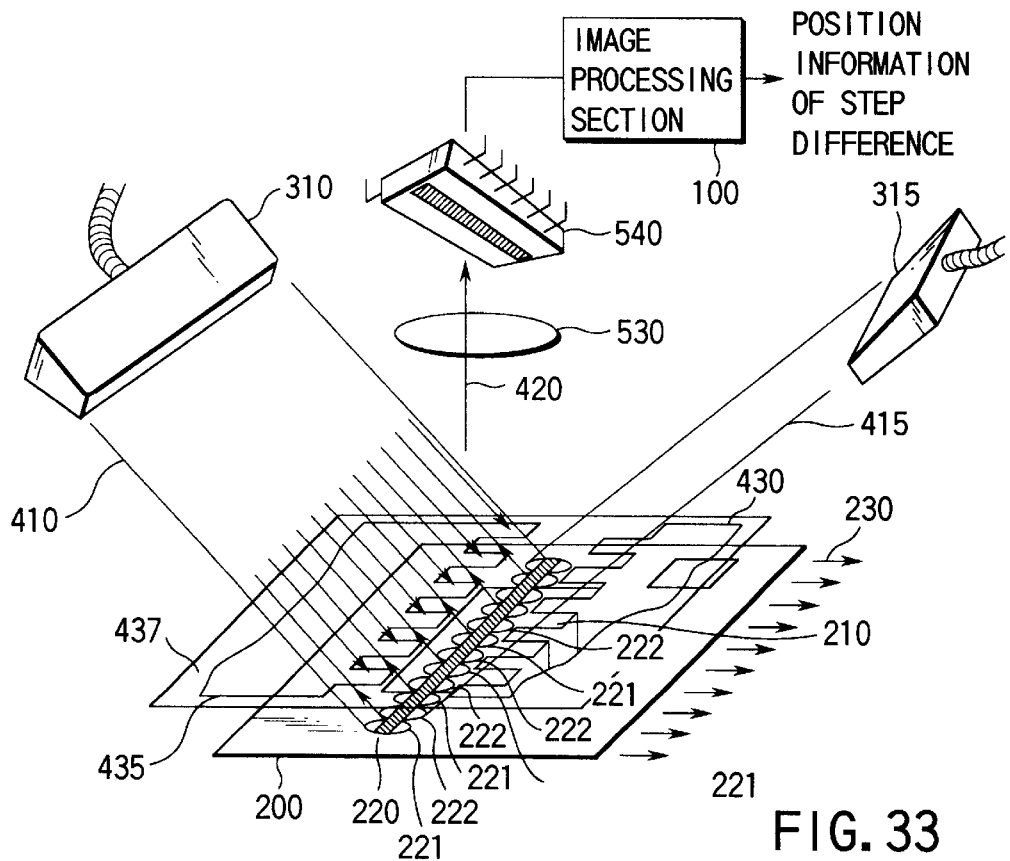
FIG. 33 is a view showing the overall arrangement of a step difference detection apparatus according to the 10th embodiment of the present invention.
Figure 34:
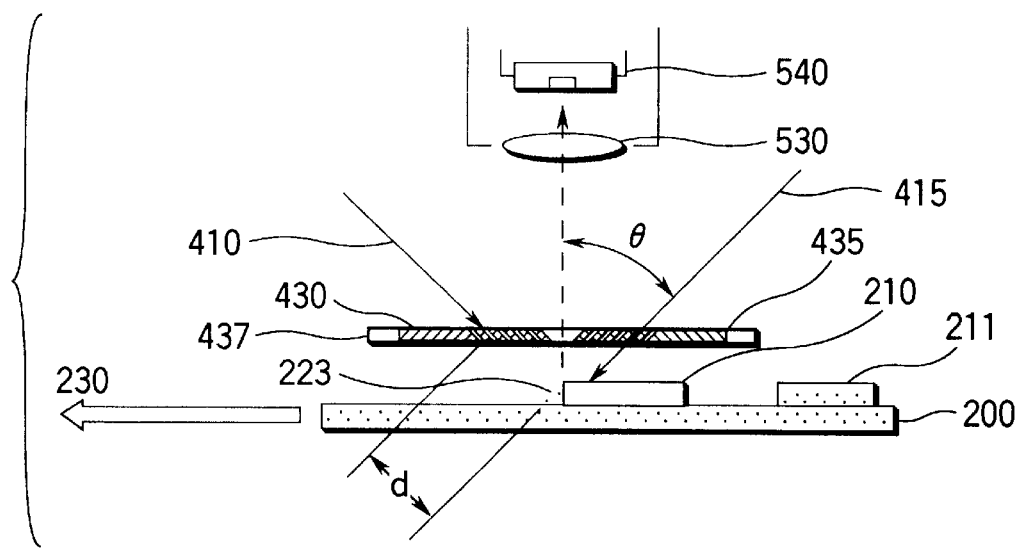
FIG. 34 is a front view of the step difference detection apparatus shown in FIG. 30.
Figure 35:
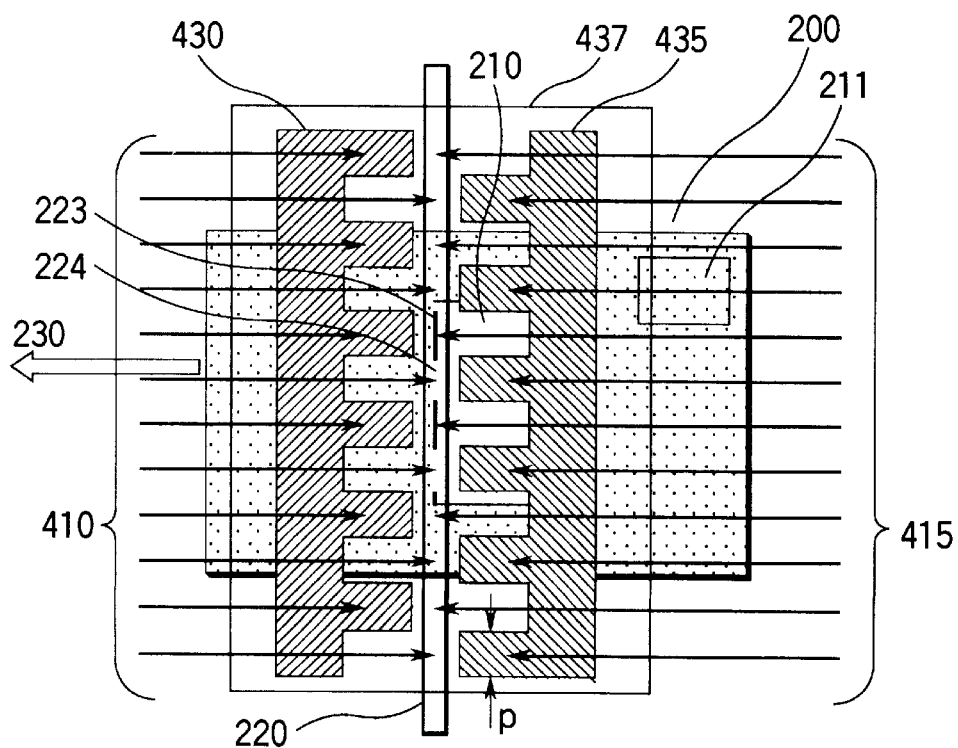
FIG. 35 is a plan view of the step difference detection apparatus shown in FIG. 30.
Figure 36:
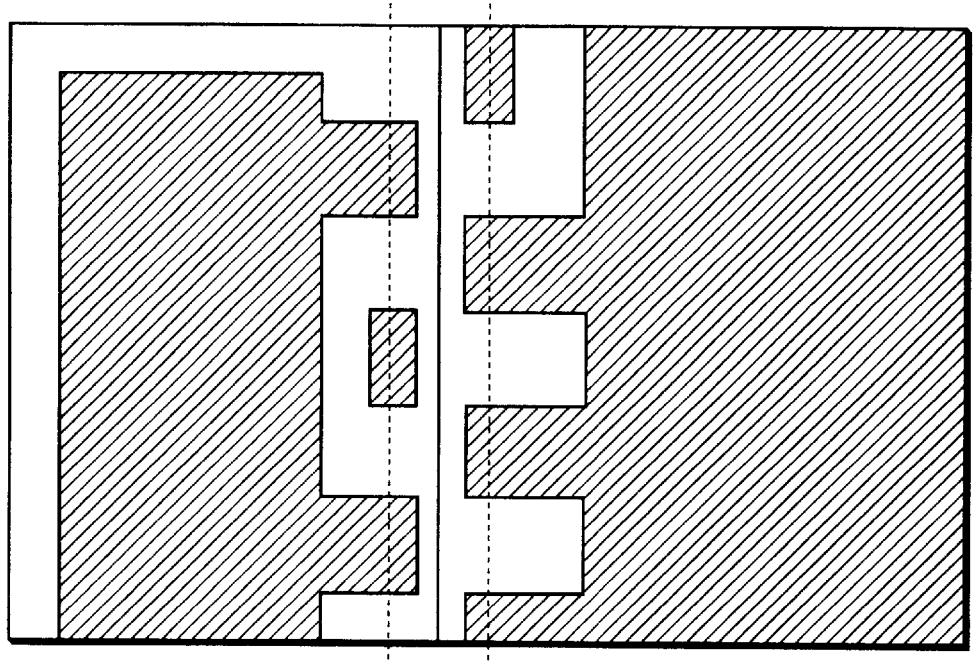
FIG. 36 is a view showing an example in which a light-shielding portion is formed in a transparent substrate.
Figure 37:
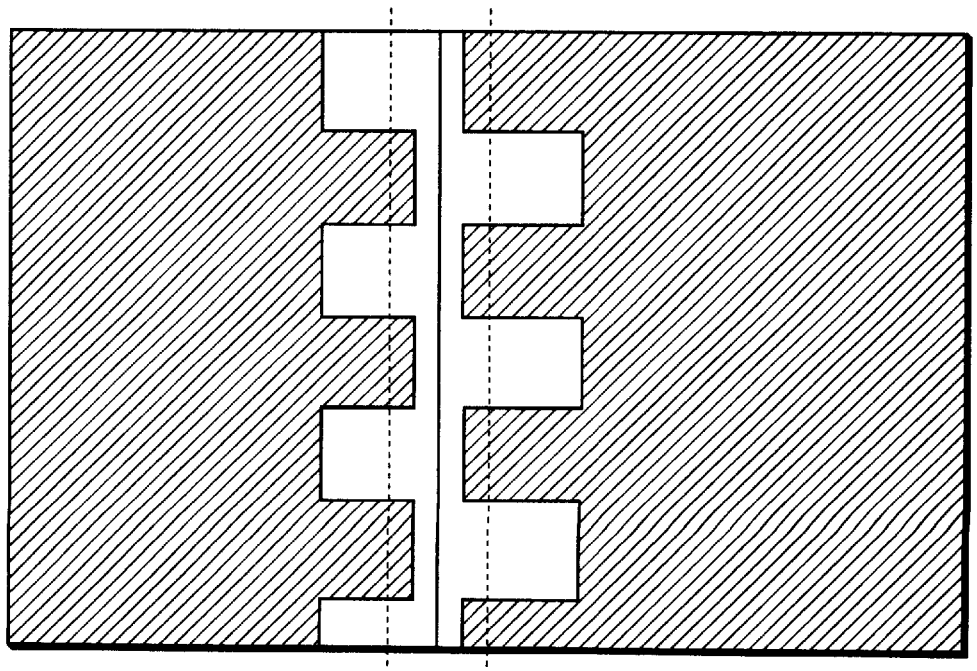
FIG. 37 is a view showing another example in which a light-shielding portion is formed in a transparent substrate.
Figure 38:
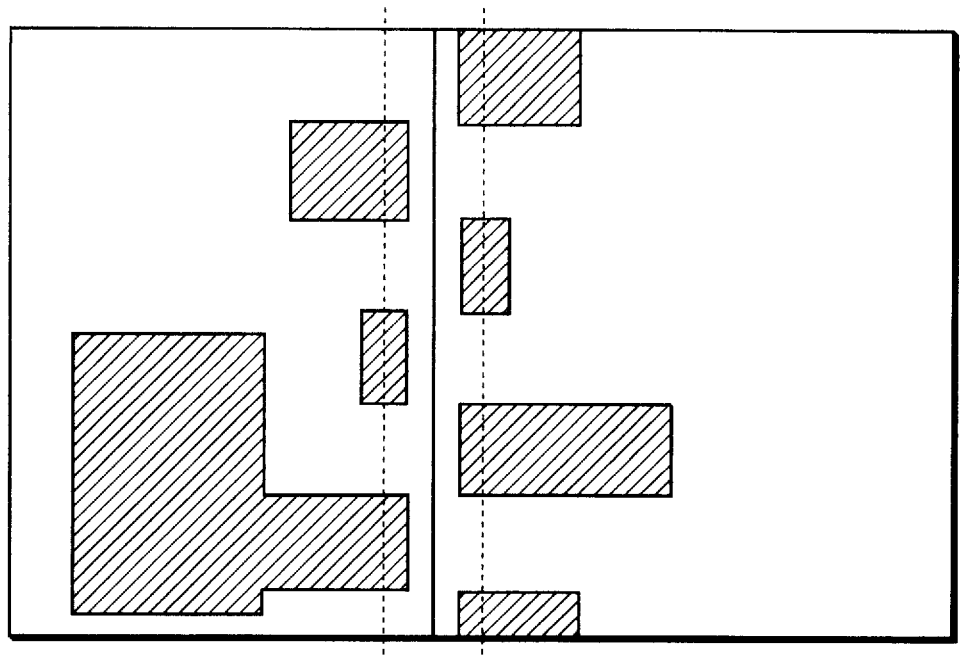
FIG. 38 is a view showing still another example in which a light-shielding portion is formed in a transparent substrate.
Figure 39:
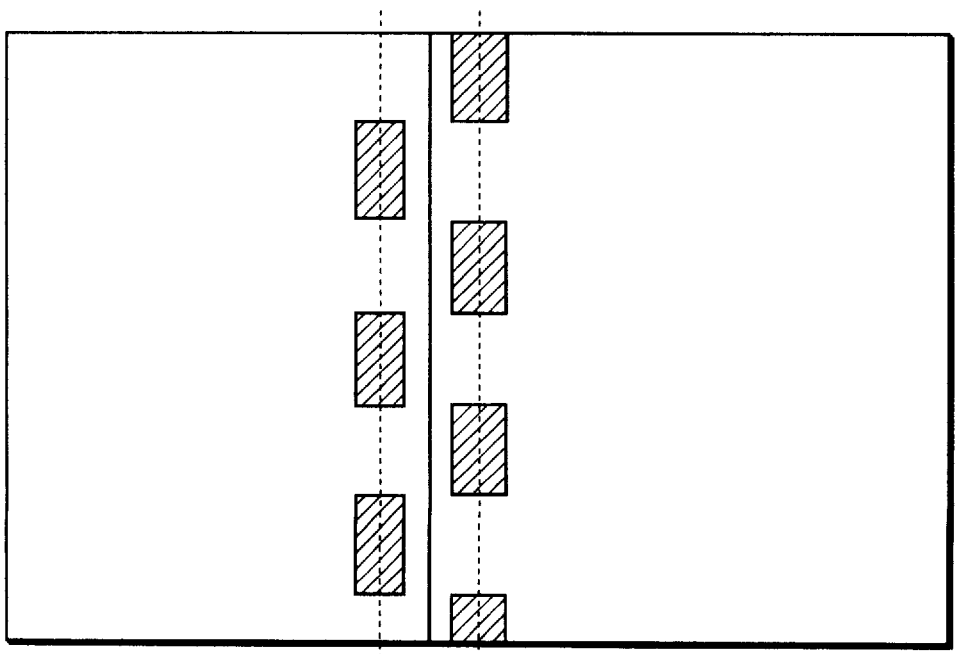
FIG. 39 is a view showing still another example in which a light-shielding portion is formed in a transparent substrate.

FIG. 33 shows the overall arrangement of a step difference detection apparatus according to the 10th embodiment of the present invention. FIG. 34 is a front view of the step difference detection apparatus shown in FIG. 33 when viewed from the front side. FIG. 35 is a plan view of the step difference detection apparatus shown in FIG. 33 when viewed from the upper side.

The step difference detection apparatus of this embodiment is used as, e.g., a detection apparatus for detecting the position and region of an address label or address indication cellophane window (address window) of mail, and comprises three sections: an illumination section, an image sensing section, and an image processing section.

The illumination section is the most important section as a characteristic feature of this embodiment. The illumination section for illuminating a letter such as mail with illumination light beams from the left and right sides at large incident angles is constituted by two illumination units 310 and 315 for emitting illumination beams from long exit ports to a linear region 220, and a transparent glass substrate 437 set near the surface of a letter 200.

To select illumination light to be incident on each point to be illuminated, two interdigital light-shielding patterns are formed on this transparent glass substrate. With the function of these light-shielding patterns, illumination light 410 emitted from the illumination unit 310 obliquely from the upper left side and illumination light 415 emitted from the illumination unit 315 obliquely from the upper right side simultaneously illuminate portions alternately arranged in the linear read region 220 on the surface of the letter 200 carried in a subscanning direction 230 by a carrying unit (not shown). This illumination section will be described below in detail.

As the left and right illumination units 310 and 315 for emitting illumination beams from the long exit ports to the linear read region 220, linear light guides are used. A linear light guide is formed by arraying the exit ports of a bundle of optical fibers in lines (e.g., two lines along a straight line), on which a light beam emitted from a light source such as a halogen lamp is temporarily focused and made incident. The linear light guide is an optical device suitable to uniformly illuminate a linear region.

The incident angles of the illumination light 410 and the illumination light 415 emitted from the illumination units and reaching the read region 220, i.e., angles θ formed by the illumination light beams and the normal of the surface of the letter 200 equal, and θ is set to be about 45°.

The illumination units 310 and 315 have the same illumination capability. When this system is viewed from the upper side, the illumination units 310 and 315 are symmetrical with respect to the read region 220.

The read region 220 is a linear region whose longitudinal direction is perpendicular to the subscanning direction 230, i.e., parallel to the main scanning direction. The image of this linear region is read by a line image sensor 540 constituting the image sensing section.

The light-shielding patterns formed on the transparent member have shapes as shown in FIG. 35, and the left and right light-shielding patterns are alternated. These patterns form a light-shielding portion 417 in FIG. 35.

The illumination light 410 and the illumination light 415 emitted from the illumination units 310 and 315, respectively, and reaching the read region 220 to illuminate the read region 220 are converted into a number of parallel illumination beams at equal intervals through the light-shielding portion 437 shown in FIG. 35 to illuminate the read region. The illumination beams of the illumination light 410 form a number of illumination spots 221 while the illumination beams of the illumination light 415 form a number of illumination spots 222.

When the surface of the letter 200 is flat, both the illumination light 410 and the illumination light 415 illuminate the linear read region 220 at a uniform illuminance.

As shown in FIG. 22, a number of illumination spots 221 formed with the illumination light 410 and a number of illumination spots 222 formed with the illumination light 415 alternate (221, 222, 221, 222, . . . ) at equal intervals on the linear read region 220.

Since the letter 200 is carried in the subscanning direction 230 perpendicular to the longitudinal direction of the linear read region 220, the entire surface of the letter 200 is scanned by the read region 220 from the right to the left.

A number of illumination spots 221 and 222 are also scanned from the right to the left across the surface of the letter 200. With this arrangement, the entire surface of the letter 200 is divided into a number of small illumination regions extending in parallel to the subscanning direction 230 along the loci of the illumination spots 221 and 222. FIG. 23 shows this state.

The sensed image of the letter 200 is constituted by a number of small illumination regions 321 formed by the illumination light 410 from the left and a number of small illumination regions 322 formed by the illumination light 415 from the right. The small illumination regions 321 and 322 alternate.

As shown in FIG. 33, an imaging lens 530 is positioned above the linear read region 220. The image of the read region 220 is formed on the CCD line image sensor 540 above the imaging lens 530 and sensed.

As the letter 200 is carried in the subscanning direction 230, the CCD line image sensor 540 senses the image of the entire letter 200 and outputs the image. The obtained image data is sent to an image processing section 100 to extract the position information of a step difference.

As described above, this apparatus has the same arrangement and principle as those of the apparatus described in the eighth embodiment. As a characteristic feature of this embodiment, instead of inserting the interdigital light-shielding plates from the left and right sides of the read region, patterns of interdigital light-shielding plates are printed on the glass plate to shield light only at those portions.

The image obtained by these illumination section and image sensing section is the same as that obtained by the arrangement of the eighth embodiment, i.e., the image shown in FIG. 23 is obtained. The same image processing method as described above can also be used to detect the stepped portion from the obtained image.

The effects of the step difference detection apparatus of this embodiment will be described next. If the light-shielding pattern is to have the same design as that in the eight embodiment, the typical value d must be several mm or less.

Letters to be carried by an actual automatic postal address reading and sorting machine are assumed to be in various states. The carrying speed is normally as high as several meters per second. When the comb-shaped portions of the interdigital slits are close to the letter carrying route, letters may be caught by the slits and damaged.

To solve this problem, in this embodiment, the interdigital slit patterns are printed on the glass plate.

When the slit patterns are printed on the glass plate, no physical comb-shaped portions are present, so letters are less likely to be damaged. In addition, the slits themselves are prevented from bending, resulting in improved durability.

Furthermore, since a letter and the optical reading section are separated by the glass plate, dust is prevented from sticking to the optical reading section, and maintenance is facilitated. Unlike a case wherein two slits are inserted from the left and right sides, and the interval therebetween is adjusted, when the two slit patterns having a predetermined positional relationship are printed on the glass plate, the adjustment operation can be omitted, resulting in reduction of assembly cost.

An embodiment of the present invention has been described above in detail. However, the present invention is not limited to this embodiment.

For example, an opaque layer may be formed on the upper or lower surface of the glass plate. The opaque layer may be formed by drawing a slit pattern with an opaque ink or depositing an opaque pattern. Interdigital slits and interdigital glass plates may be combined to form a flat plate as a whole.

The transparent member may consist of sapphire glass.

For the light-shielding portion, a light-absorbent opaque member, a mirror surface for reflecting light toward portions other than the portion to be illuminated, or a diffusion plate for scattering light toward portions other than the portion to be illuminated may be used.

A diffraction plate for diffracting light toward portions other than the portion to be illuminated may be used. A lens or a prism for refracting light toward portions other than the portion to be illuminated may be used. As described above, the light-shielding member is not limited to an absorbing member for shielding light, which is formed on the transparent member, and may be a member such as a lens having a three-dimensional structure for shielding light.

Any structures except a structure having white and black interdigital patterns are incorporated in the present invention as far as the pattern of the light-shielding portion is formed such that a desired illumination spot is formed with the illumination light from the light source and the remaining illumination spots are not formed with the illumination light beams to obtain a desired illuminance distribution in the read region.

The light-shielding portion need not always have a structure having a transparent portion for transmitting the illumination light toward a desired illumination spot such that the illumination light is prevented from directly propagating to illumination spots other than the desired illumination spot or caused to directly propagate to the desired illumination spot.

A pattern such as a mirror surface, a diffusion plate, or a diffraction plate may be formed at a portion other than the light-shielding portion to reflect, diffract, or refract illumination light from the light source and guide the light to the desired illumination spot.

Such a structure also corresponds to the light-shielding portion "having a pattern formed on a transparent member to obtain a light-shielding effect" described in claims. With this structure, the effect of this embodiment can be obtained.

Figure 40:
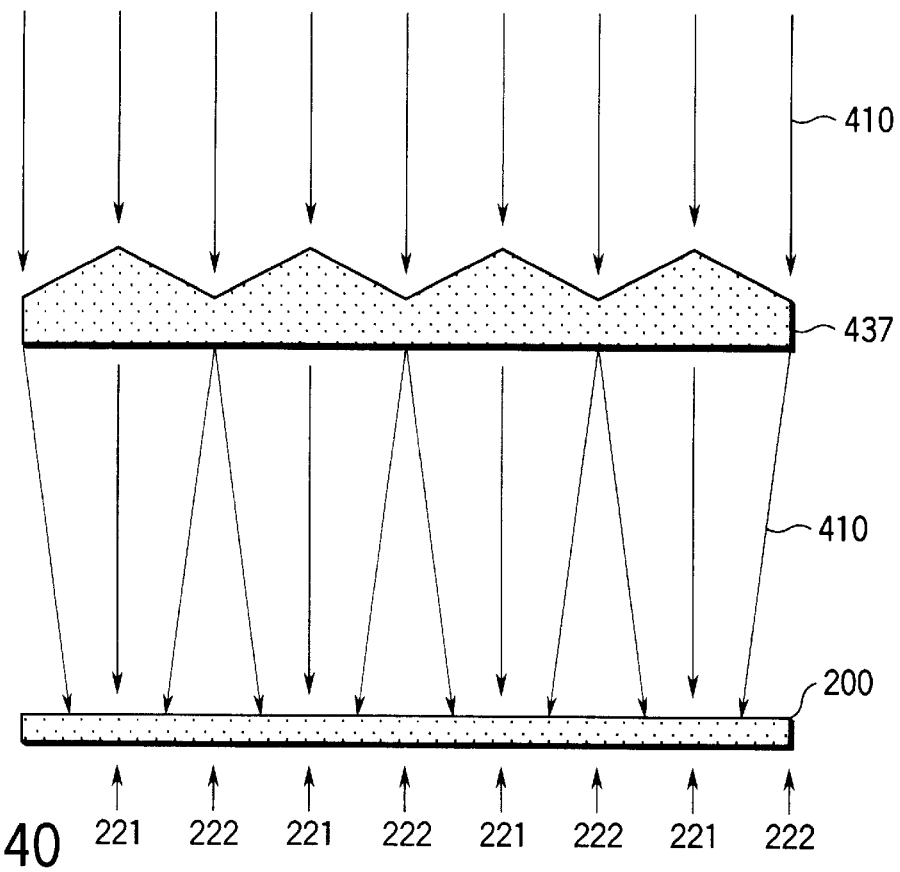
FIG. 40 is a view showing still another example in which a light-shielding portion is formed in a transparent substrate.

FIG. 40 shows an example. FIG. 40 is a sectional view showing the system taken along a plane including the left-side illumination light 410 and the read region 220 in FIG. 33.

The optical path of the illumination light 410 emitted from the left-side light source is refracted by the light-shielding portion having a pattern formed on a transparent member to obtain the light-shielding effect. All light beams are directed to the illumination spots 221 to be illuminated with the left-side illumination light 410 and not directed to the illumination spots 222 to be illuminated with the right-side illumination light 415.

As described above, patterns for obtaining the light-shielding effect include not only a pattern for preventing the illumination light 410 from forming the illumination spots 222 but also a pattern for forming the illumination spots 221 with the illumination light 410.

A structure using a light-shielding portion having a pattern formed such that a desired illumination spot is formed with the illumination light from the light source and the remaining illumination spots are not formed with the illumination light beams to obtain a desired illuminance distribution on the read region is incorporated in the present invention.

When the interdigital light-shielding plate is inserted between the line illumination and the linear read region 220, the illuminance pattern on the linear read region is determined by the shape of a small part of the interdigital light-shielding plate.

That is, in FIG. 29, the light beam emitted from the line illumination to the linear read region is almost included in two planes (planes including the illumination light 410 or 415) extending obliquely at 45° on both sides of the linear read region. Therefore, for the light-shielding plate, the shape of a portion where the light-shielding plate crosses the two planes is important.

When the arrangement of the light-shielding portions and transmission portions on straight line portions 440 and 445 shown in FIG. 29 remains the same, the illuminance pattern on the linear read region does not change even when the shape of the remaining portion changes. Therefore, any one of patterns shown in FIGS. 36, 37, 38, and 39 can be used to obtain the same effect.

For the interdigital light-shielding plate, the width of each light-shielding portion and the width of each transmission portion need not always equal. When at least one of the light-shielding portions has a width p for satisfying p/wd>8, the shadow of that portion is formed on the read region at a "modulation ratio" of 100%. In addition, when at least one of the transmission portions has a width p for satisfying p/wd>8, the shadow of that portion is formed on the read region at a "modulation ratio" of 100%. Therefore, the read image at that portion can be used for step difference detection, and this arrangement is also incorporated in the present invention.

The incident angles of the left and right illumination light need not always equal.

As described above, various modifications can be made, and these modifications are incorporated in the present invention within the spirit and scope of the present invention.

As described above, according to the present invention, a step difference on the upper surface of a letter can be properly detected without being influenced by the color density distribution such as the printed contents on the upper surface of the letter. Even for direct mail items with large color advertisements, which are increasing in recent years, the position of an address label or the like can be accurately detected. Due to the effect of such accurate detection, erroneous recognition of an address, i.e., recognition of a portion other than the address as the address portion, can be largely decreased.

In addition, by detecting the address label position, an area to be subjected to address recognition is reduced. For this reason, the load on address recognition processing can be largely reduced by shortening the processing time or downsizing the processing circuit necessary for recognition processing. Therefore, the efficiency of postal processing can be largely improved.

11th Embodiment

Figure 41:
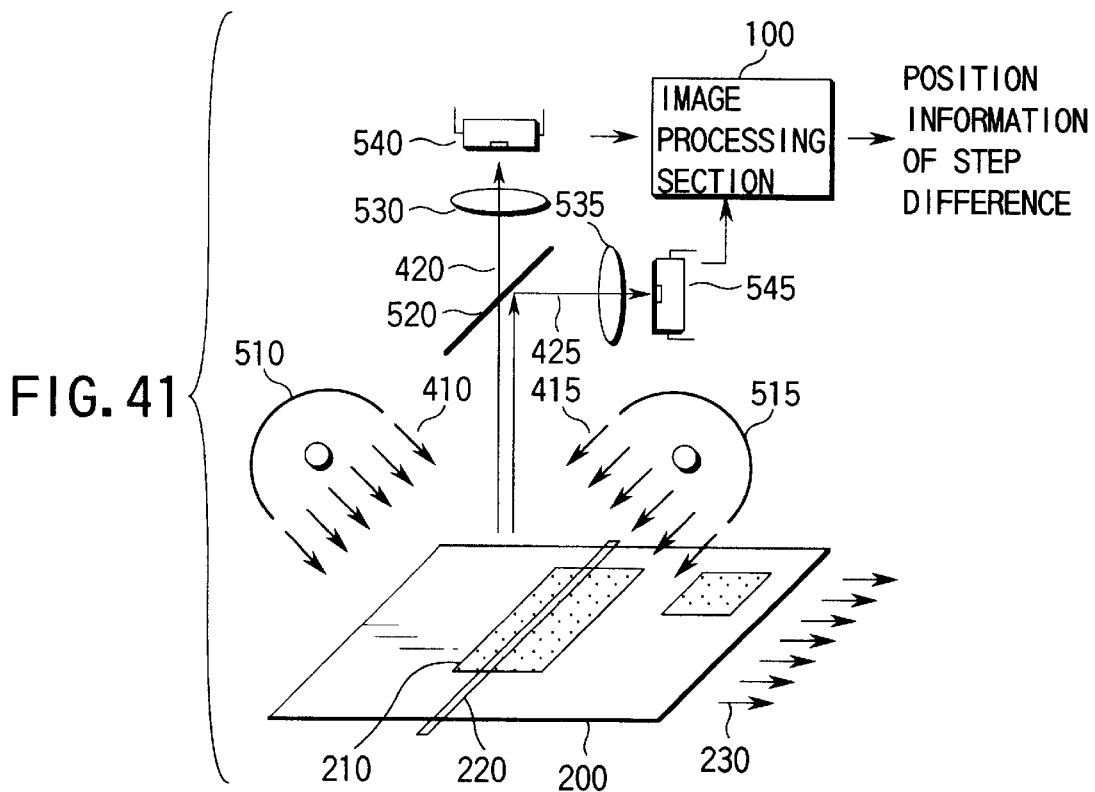
FIG. 41 is a view showing the overall arrangement of a step difference detection apparatus according to the 11th embodiment of the present invention.

FIG. 41 shows the arrangement of a step difference detection apparatus according to the 11th embodiment of the present invention. The step difference detection apparatus is used as, e.g., a detection apparatus for detecting the position and region of an address label or address indication cellophane window (address window) of mail, and comprises four sections: an illumination section, a beam splitting means, an image sensing section, and an image processing section.

In FIG. 41, illumination units 510 and 515 emit illumination light 410 and illumination light 415 having different wavelengths, respectively. The illumination light 410 is a laser beam having a wavelength of 780 nm, and the illumination light 415 is a laser beam having a wavelength of 830 nm. The illumination light 410 and the illumination light 415 illuminate a linear read region 220 from the left and right sides. The incident angles of the illumination light 410 and the illumination light 415 (an angle formed by each illumination light and the normal of the surface of a letter 200) equal and are set to be about 70°. The illumination units 510 and 515 have the same illumination capability. When this system is viewed from the upper side, the illumination units 510 and 515 are symmetrical with respect to the read region 220. That is, when a flat white paper sheet is illuminated, the same outputs are obtained from CCD line image sensors 540 and 545 (to be described later).

The read region 220 is positioned on the upper surface of the letter 200 carried by a carrying unit (not shown). The longitudinal direction of the read region 220 is perpendicular to a carrier direction 230 (subscanning direction) of the letter 200. The illumination light 410 and the illumination light 415 are scattered on the upper surface of the letter 200 in a similar manner and partially incident on a dichroic mirror 520 above the read region 220. The dichroic mirror (or dichroic filter) 520 selectively transmits or reflects light in accordance with its wavelength. The light incident on the dichroic mirror 520 is split into a component 420 from the illumination light 410 and a component 425 from the illumination light 415. The images of the two light components are formed on the different CCD line image sensors 540 and 545 through imaging lenses 530 and 535, respectively.

With this arrangement, the image of the letter 200, which is formed by the illumination light 410 from the left side, and that formed by the illumination light 415 from the right side are simultaneously output from the CCD line image sensors 540 and 545, respectively. The two output images are sent to an image processing means 100 to detect the position of a step difference.

The two images sent to the image processing means 100 in the above arrangement will be described. The two images are sensed under the same condition except the illumination direction and the wavelength of the illumination light. If the letter 200 has a completely flat surface, and the reflection ratios to the illumination light 410 and 415 equal on the entire surface of the letter 200, the two image are identical. However, at an edge portion of a label 210 and, more particularly, at an edge in the main scanning direction, the output pixel value changes depending on the illumination direction, left or right, due to the effect of oblique illumination (illumination using collimated light at a large incident angle). This will be described with reference to FIG. 42.

Figure 42:
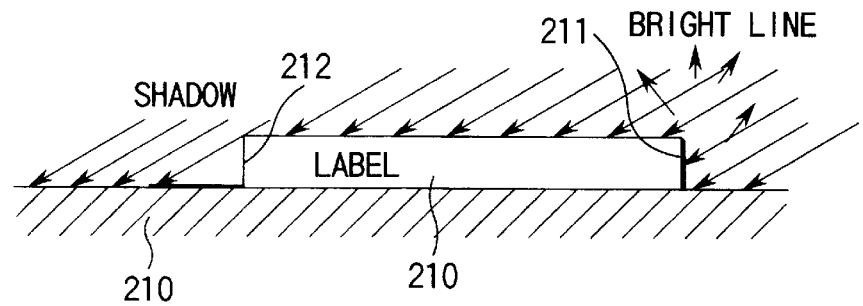
FIG. 42 is a view for explaining the principle of step difference detection used in the step difference detection apparatus of the 11th embodiment.

As shown in FIG. 42, the label 210 is bonded to the upper surface of the letter 200. Step differences are present at right and left edges 211 and 212. At the edge 211 on the side of light incidence, the light-receiving density is higher than that on the remaining flat surface portions. This is because the light is incident almost horizontally (at a large incident angle). When observed from the upper side of the letter 200, the image of the edge 211 has larger output pixel values than those at the remaining flat portions, so a bright line is formed. Conversely, at the edge 212 directed to the other side of light incidence, a shadow is formed by the edge itself. If light is incident from an opposite direction, the result is reversed. When observed from the upper side, the right-side edge 211 of the label 210, which is illuminated with the illumination light 415, forms a bright line, and this image is extracted by the CCD line image sensor 545. When the edge 211 is illuminated with the illumination light 410, a dark line as the shadow of the edge 211 is formed, and this image is extracted by the CCD line image sensor 540. For portions without any step difference, the images output from the CCD line image sensors 540 and 545 are identical.

Figure 43:
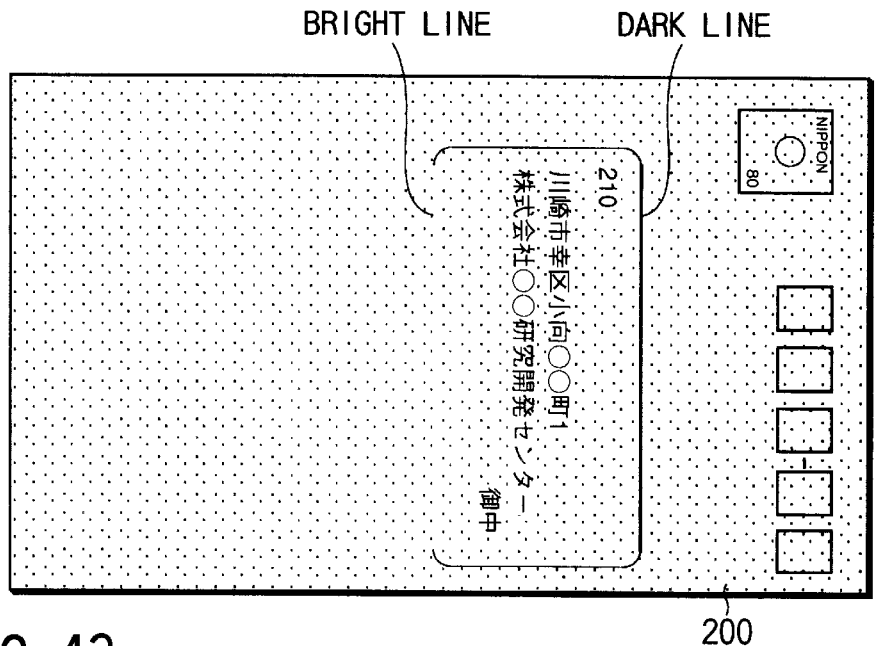
FIG. 43 is a view showing an image obtained by the step difference detection apparatus of the 11th embodiment using oblique illumination light from the upper left side.
Figure 44:
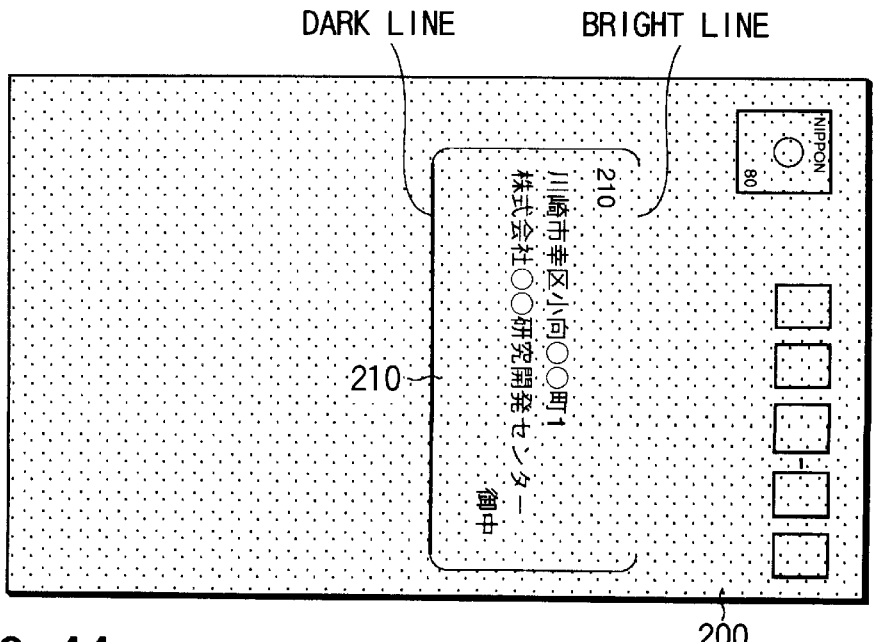
FIG. 44 is a view showing an image obtained by the step difference detection apparatus of the 11th embodiment using oblique illumination light from the upper right side.
Figure 45:
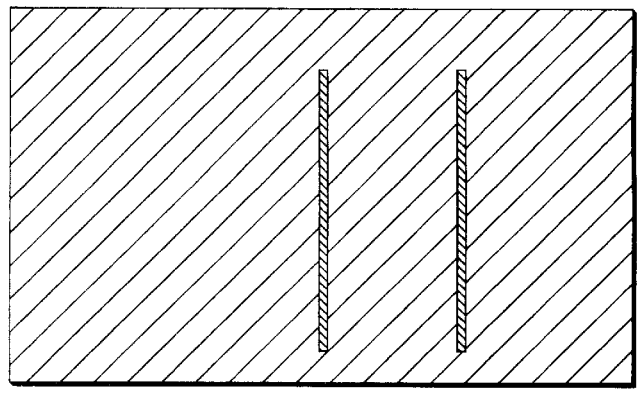
FIG. 45 is a view showing the difference between the images obtained by the step difference detection apparatus of the 11th embodiment by illumination from the left and right sides.

To detect the stepped portion such as a label edge, the difference between the two output images is calculated. The output values of portions other than the stepped portion are canceled to 0, and only the value at the stepped portion such as a label edge is left. With this arrangement, the step difference due to the label or address window can be detected. Upon calculating the difference, the higher side of the step difference can also be detected by determining whether the result is positive or negative, so the right and left ends of the label 210 can be discriminated. FIGS. 43 to 45 show examples of the image.

FIG. 43 shows an example of the output image from the CCD line image sensor 540. FIG. 44 shows an example of the output image from the CCD line image sensor 545. FIG. 45 shows the difference between the output image from the CCD line image sensor 540 and that from the CCD line image sensor 545.

As shown in FIG. 43, in the image corresponding to the illumination light 410 from the upper left side, a bright line is formed at the left-side edge portion of the label 210 while a dark line is formed at the right-side edge portion of the label 210. Conversely, as is apparent from FIG. 44, in the image corresponding to the illumination light 415 from the upper right side, a dark line is formed at the left-side edge portion of the label 210 while a bright line is formed at the right-side edge portion of the label 210. By calculating the difference between the image in FIG. 43 and that in FIG. 44 by the image processing means 100 in units of corresponding pixels, an image having luminance left only at the stepped portions corresponding to the left and right edge portions of the label 210 can be obtained. From this image, the positions of the stepped portions can be detected.

The image processing means 100 also detects the region of the label 210 from the position information of the stepped portions detected by the above method. That is, on the basis of the position information of the stepped portions shown in FIG. 45, left and right sides symmetrical and equal in length can be detected. With this processing, it can be estimated that the two sides are left and right sides of the stepped region of a rectangle, so the rectangular stepped region can be detected. The image processing means 100 performs this processing to detect the region of the address label on the letter 200. In this embodiment, since the surface with the label 210 is illuminated from the left and right sides, no output difference between the right illumination and left illumination is obtained from the stepped portion extending horizontally, i.e., parallel to the carrier direction 230 of the letter 200. That is, the upper and lower sides of the label 210 cannot be detected. However, the object of this embodiment is to detect the position of the label 210 on the letter 200. Most labels 210 have rectangular shapes. For this reason, once the positions of the left and right sides opposing each other are detected, the rectangular region of the label 210 can be specified even when the upper and lower sides cannot be detected. Therefore, the object of this embodiment can be sufficiently achieved.

How to select the two wavelengths to be used for illumination will be described next.

As described above, the difference between two images of light components obtained by splitting light reflected by the read region 220 using the dichroic mirror 520 is calculated. A stepped portion or a flat portion can be determined depending on whether the value of the residual of each pixel is larger or smaller than a reference value. At a flat portion, both the illumination light 410 and the illumination light 415 with different wavelengths illuminate the read region 220 at almost the same intensity, so the residual becomes small. On the other hand, at a stepped portion, one illumination light forms a shadow and does not illuminate the read region 220 while only the other illumination light having a different wavelength illuminates the read region 220, so the residual becomes large. Depending on conditions, the residual may become small even at a stepped portion or large even at a flat portion. The conditions for these phenomena will be examined below.

As an example, when the surface of the letter 200 has contents printed with a color ink, the residual becomes large even at a flat portion. On the normal white background, the two illumination light with different wavelengths are reflected at almost the same reflection ratio. On a color background, the reflection ratio changes depending on the wavelength. One illumination light used for illumination may be reflected at a high reflection ratio while the other may be reflected at a low reflection ratio. As a result, the residual at a flat portion may be larger than the reference value for step difference determination. To avoid this, two wavelengths whose reflection ratio difference for any color inks is always smaller than the reference value for step difference determination must be selected.

Figure 50:
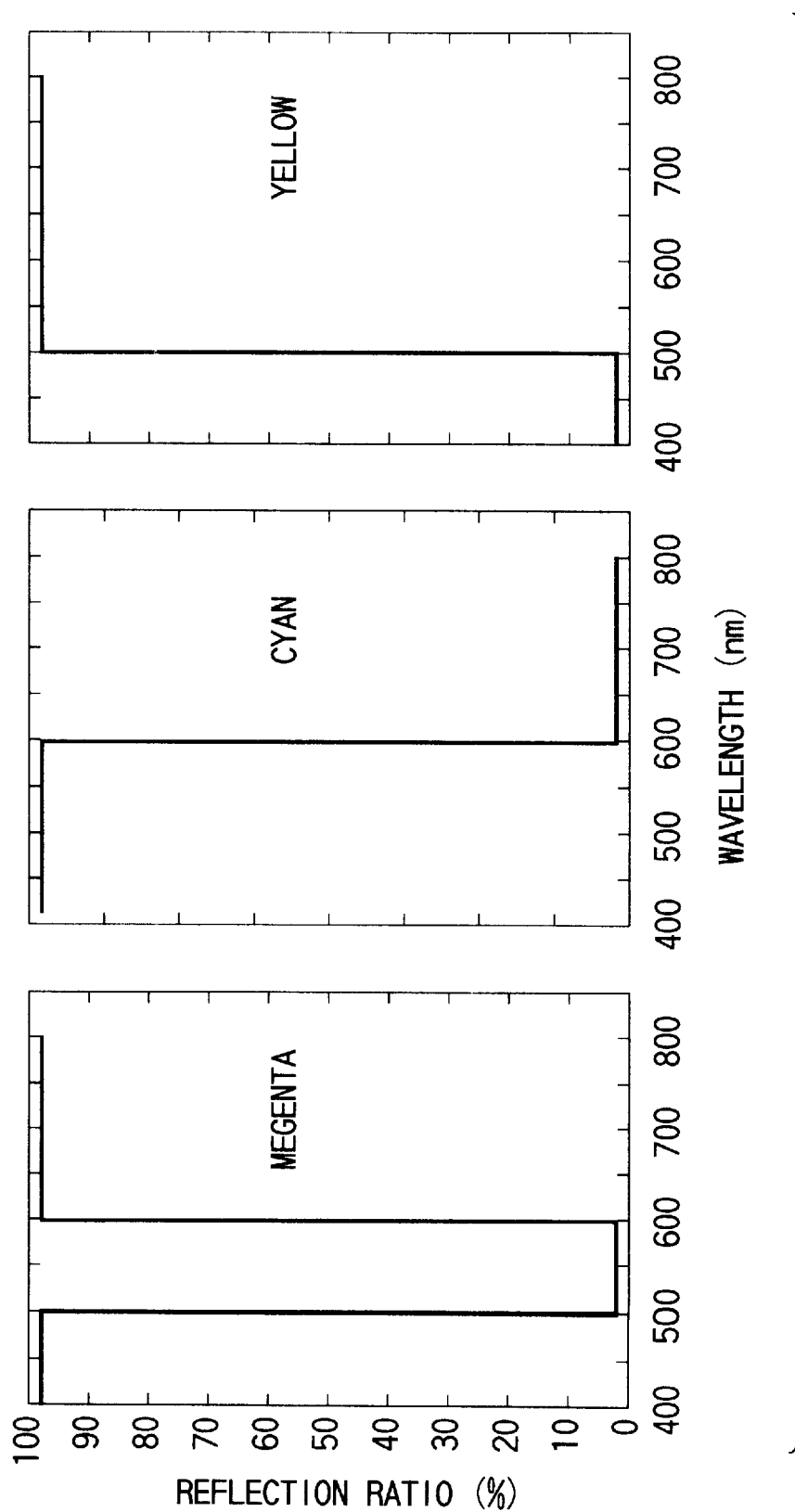
FIG. 50 shows graphs of the ideal spectral reflection ratio characteristics of process inks.
Figure 51:
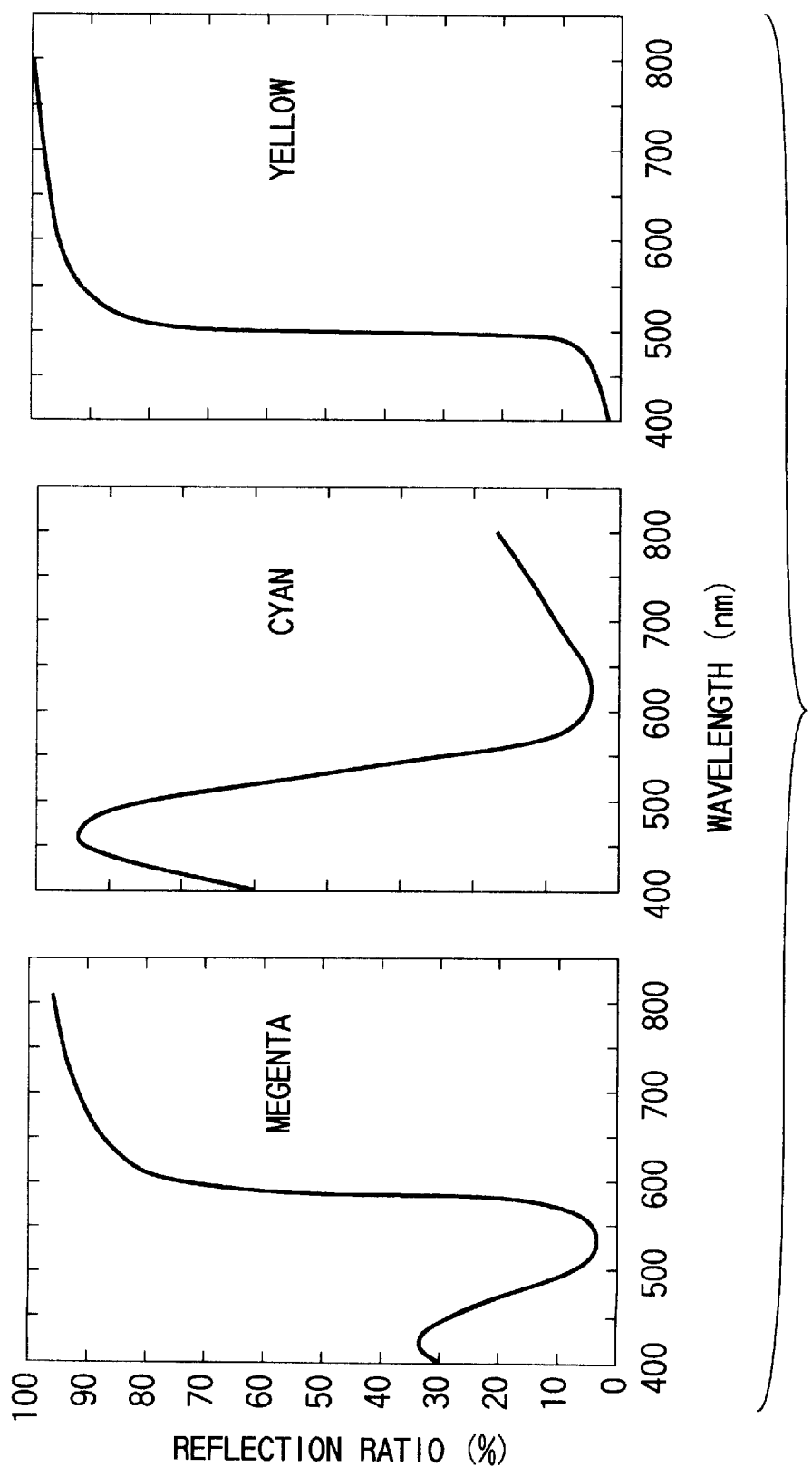
FIG. 51 shows graphs of the actual spectral reflection ratio characteristics of process inks.

FIG. 51 shows the characteristics of color inks used for actual printing. In many cases, an ink set of three primary colors (magenta, cyan, and yellow) are used for color printing. As shown in FIG. 50, as ideal characteristics of these inks, magenta has an absorption band of 500 to 600 nm, cyan has an absorption band of 600 nm or more, and yellow has an absorption band of 500 nm or less. However, inks which are popularly used have spectral reflection ratio characteristics as shown in FIG. 51 due to factors such as printing suitability, light resistance, humidity resistance, and cost, and these characteristics are different from ideal spectral reflection ratio characteristics. Most three-primary-color inks currently popularly used have almost the same spectral reflection ratio characteristics as those in FIG. 51.

As the reference value used to determine a stepped portion, when the residual value of the images of two light beams with different wavelengths is 30% of the value of each image, a stepped portion can be properly determined, as is empirically known. To use this reference, the residual of the images of two light beams with different wavelengths must be 30% or less at a flat portion independently of the ink color. Normally, any ink color is prepared by mixing inks of three primary colors. When the reflection ratio difference between the two light beams with different wavelengths is 30% or less for all of the three primary colors, the above condition is satisfied. On the other hand, to easily split the two wavelengths using a beam splitting means such as the dichroic mirror 520, the two wavelengths are preferably separated as large as possible.

Referring to FIG. 51 while taking the condition into consideration, when the wavelengths of the two illumination light beams are 600 nm or higher, almost flat spectral reflection ratio characteristics can be obtained for all of the magenta, cyan, and yellow inks, so the above condition is satisfied.

As another example, when the two wavelengths cannot be sufficiently split by the dichroic mirror 520 because the two wavelengths are too close, the residual does not become large even at a stepped portion. As a reason for this, the spectral widths of the two illumination light 410 and the illumination light 415 are not sufficiently smaller than the difference between the two wavelengths, or the wavelength separation performance of the dichroic mirror 520 is insufficient. When a laser beam is used as illumination light, the spectral width is sufficiently small, and no problem is posed. Therefore, the problem remaining unsolved is the wavelength separation capability of the general dichroic mirror 520.

Figure 52:
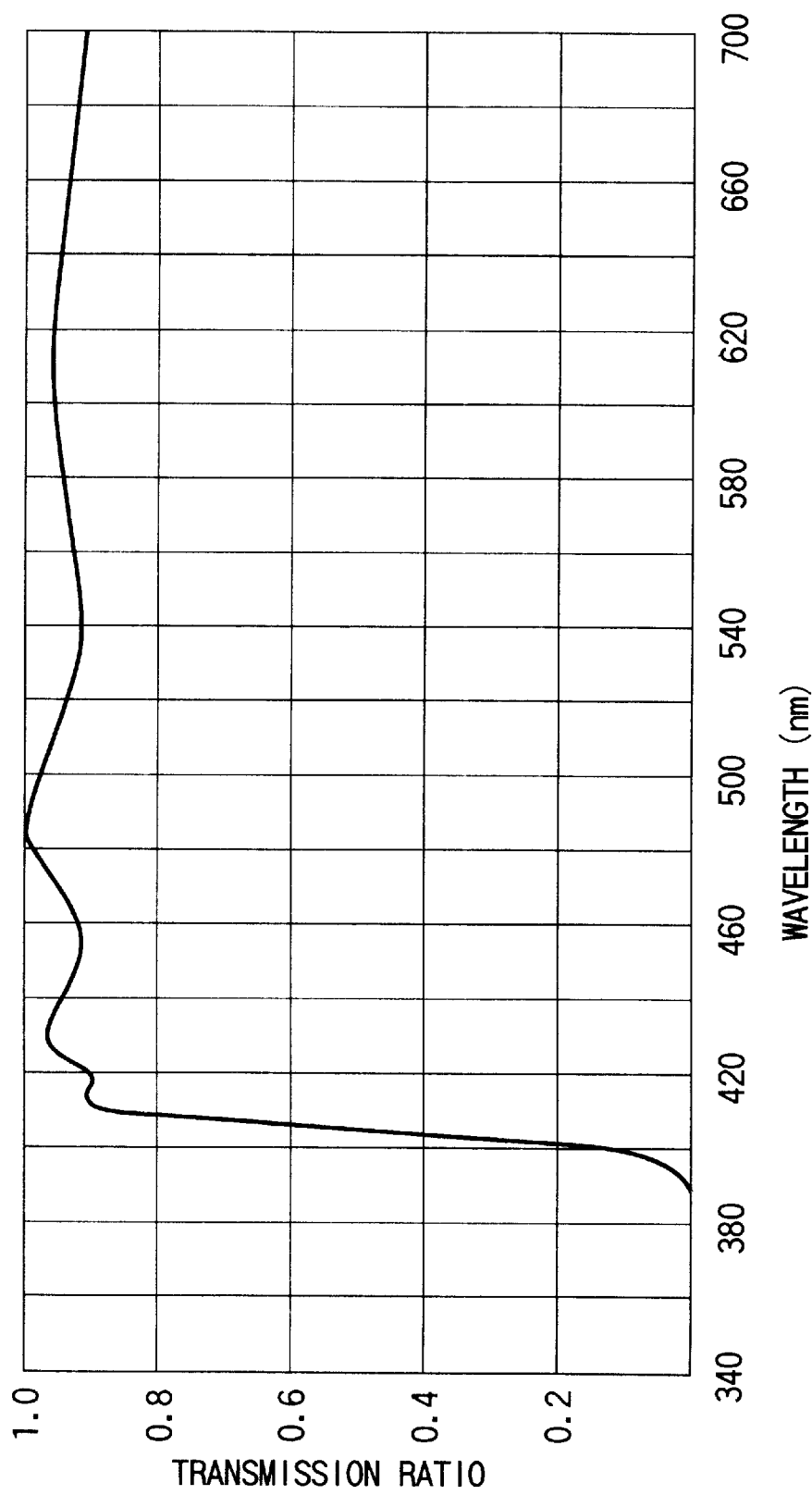
FIG. 52 is a graph showing the transmission ratio characteristics of a representative dichroic mirror.

FIG. 52 shows the wavelength transmission ratio characteristics of a typical bandwidth filter using a dichroic mirror. This drawing is quoted from "Optical Thin Film", Shiro Fujiwara, Kyoritsu-Shuppan (1985). This filter splits incident light into light on the short wavelength side and light on the long wavelength using the wavelength of 400 nm as the boundary. When this filter is to be used as a beam splitting means, light having a wavelength longer than 40 nm and light having a wavelength shorter than 400 nm are used as two illumination light beams. To detect a step difference, the residual of a portion (flat portion) other than a stepped portion must be clearly discriminated from that of the stepped portion.

When the light on the long-wavelength side is to form a shadow at the stepped portion, the reflection ratio of the light on the short-wavelength side must be sufficiently higher than the transmission ratio. When the light on the short-wavelength side is to form a shadow at the stepped portion, the transmission ratio of the light on the long-wavelength side must be sufficiently higher than the reflection ratio. At the flat portion, the difference between the reflection ratio of the light on the short-wavelength side and the transmission ratio of the light on the long-wavelength side must be sufficiently small. In FIG. 52, the transmission ratio is about 15% when the wavelength is 400 nm, and about 85% when the wavelength is 410 nm. If the loss of the filter can be neglected, these two wavelengths sufficiently satisfy the above condition. To use such a filter as a beam splitting means, the wavelength difference between the illumination light beams need be at least 10 nm.

FIG. 52 shows a band filter having a boundary at 400 nm. It is necessary herein to know the characteristics of a band filter at 800 nm. The reason for this is as follows. To make the reflection ratios almost equal between two wavelengths independently of the color of the background of the letter, both the two wavelengths used as illumination light beams are preferably 600 nm or more.

Generally, in designing a band filter using a dielectric multilayered film or the like, (thickness of layer)×(refractive index)÷(wavelength of light) of each layer is important. When only the thickness of each layer is doubled without changing the structure of each layer of the band filter, the band filter exhibits similar characteristics for light having a doubled wavelength. If the original band filter has characteristics representing a reflection ratio $f(\lambda)$ (%) for light having a wavelength $\lambda$ (nm), a band filter having a doubled thickness for each layer has characteristics representing a transmission ratio $f(\lambda/2)$ (%). Accordingly, a width $\Delta\lambda$ of the boundary region between the short-wavelength side and the long-wavelength side is also doubled. The performance of a band filter is substantially represented by the ratio of the width $\Delta\lambda$ of the boundary ratio between the short-wavelength side and the long-wavelength side to the wavelength $\lambda$. On the basis of this expression, the value obtained by dividing the wavelength difference between two illumination light beams to be used by the average value of the two wavelengths must be 1/40 or more.

In the band filter shown in FIG. 52, which has a boundary at 400 nm, the wavelength difference between two illumination light beams to be used is 10 nm or more, and the average value of the two wavelengths is 400 nm. The value obtained by dividing the difference between the two wavelengths (10 nm) by the average value of the two wavelength (400 nm) is 1/40 or more.

Actually, a band filter having a boundary at 800 nm is used. In this case as well, the value obtained by dividing the wavelength difference between two illumination light beams to be used by the average value of the two wavelengths is 1/40 or more. The reason for this is as follows. According to the characteristics of the band filter having a boundary at 800 nm, the wavelength difference for ensuring a residual of 30% or more for images corresponding to the two wavelengths at the stepped portion is twice that in use of the band filter having a boundary at 400 nm, i.e., 20 nm or more. The average value of the two wavelengths is also twice that in use of the band filter having a boundary at 400 nm, i.e., 800 nm.

The arrangement and operation of the 11th embodiment have been described above. The effects of the step difference detection apparatus of the 11th embodiment will be described next.

In the 11th embodiment, by calculating the difference between two images formed upon illumination from two directions, the influence of printed contents on the letter, which conventionally poses a problem in edge detection using oblique illumination, is canceled, so a clear image of the edge can be obtained. Therefore, the arrangement of the 11th embodiment is effectively used when the reflection ratios of the label and the envelope are almost the same, or the reflection ratio varies on the upper surface of the letter.

When the step difference detection apparatus according to the 11th embodiment is incorporated in an automatic postal address reading and sorting machine or the like, the region of an address label or address window where the address is described can be quickly and properly detected by an address recognition section to improve the address recognition ratio.

The 11th embodiment of the present invention has been described above in detail. The present invention is not limited to this embodiment. For example, the illumination light 410 and the illumination light 415 having different wavelengths need not always be generated by two light sources each for emitting the corresponding illumination light. Light emitted from one light source may be split into two light beams having different wavelengths using a beam splitting means such as a dichroic mirror. The light source to be used may be a white light source. When a single light source unit is used, the cost can be reduced, and additionally, the energy utilization efficiency can be improved to reduce the power consumption.

The illumination light 410 and the illumination light 415 having different wavelengths may be emitted from LEDs (Light-Emitting Diodes) having different central wavelengths. With this arrangement, very inexpensive light sources can be obtained.

Any light having different characteristics can be used in the 11th embodiment as far as the beam splitting means 520 is arranged to split the reflected light into two light beams at a ratio changing in correspondence with the mixture ratio of the two light beams when the two different light beams are mixed and incident.

Figure 46:
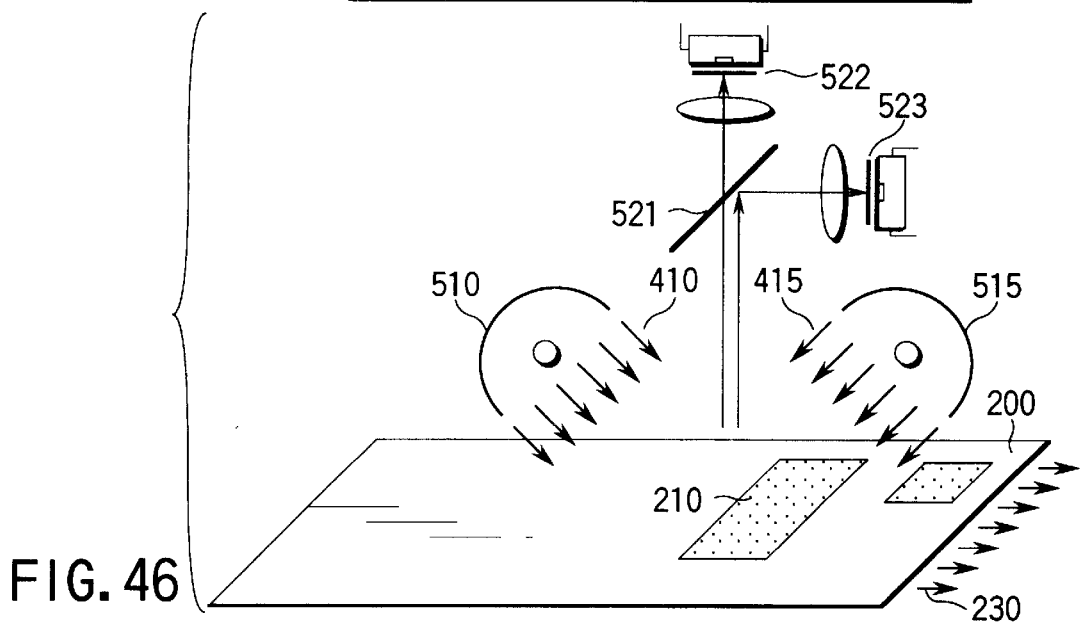
FIG. 46 is a view showing a state wherein two images are separated by the step difference detection apparatus of the 11th embodiment by using a beam splitter and color filters.
Figure 47:
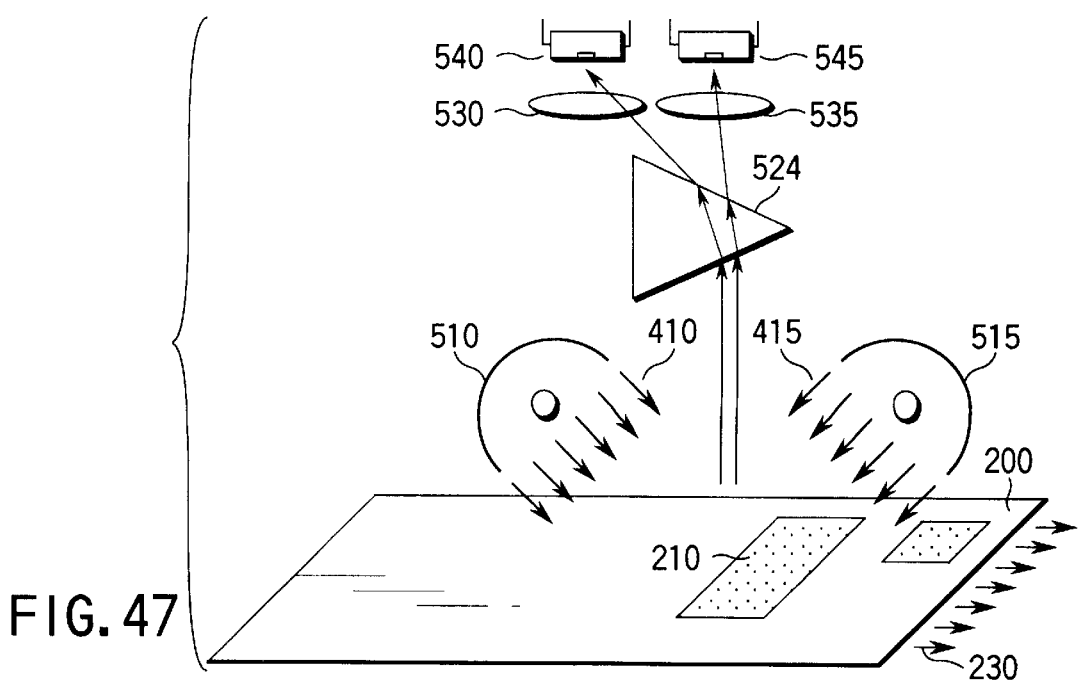
FIG. 47 is a view showing a state wherein two images are separated by the step difference detection apparatus of the 11th embodiment by using color dispersion of a prism.

The beam splitting means 520 for splitting the reflected light in accordance with the wavelength may be constituted by a beam splitter 521 for uniformly splitting the reflected light into two light beams independently of the wavelength, an optical filter 522 for transmitting light having the wavelength of the illumination light 410, and an optical filter 523 for transmitting light having the wavelength of the illumination light 415, as shown in FIG. 46. The beam splitting means 520 for splitting the reflected light into two light beams in accordance with the wavelength may use color dispersion by a prism 524 which changes the refraction direction depending on the wavelength, as shown in FIG. 47.

Figure 48:
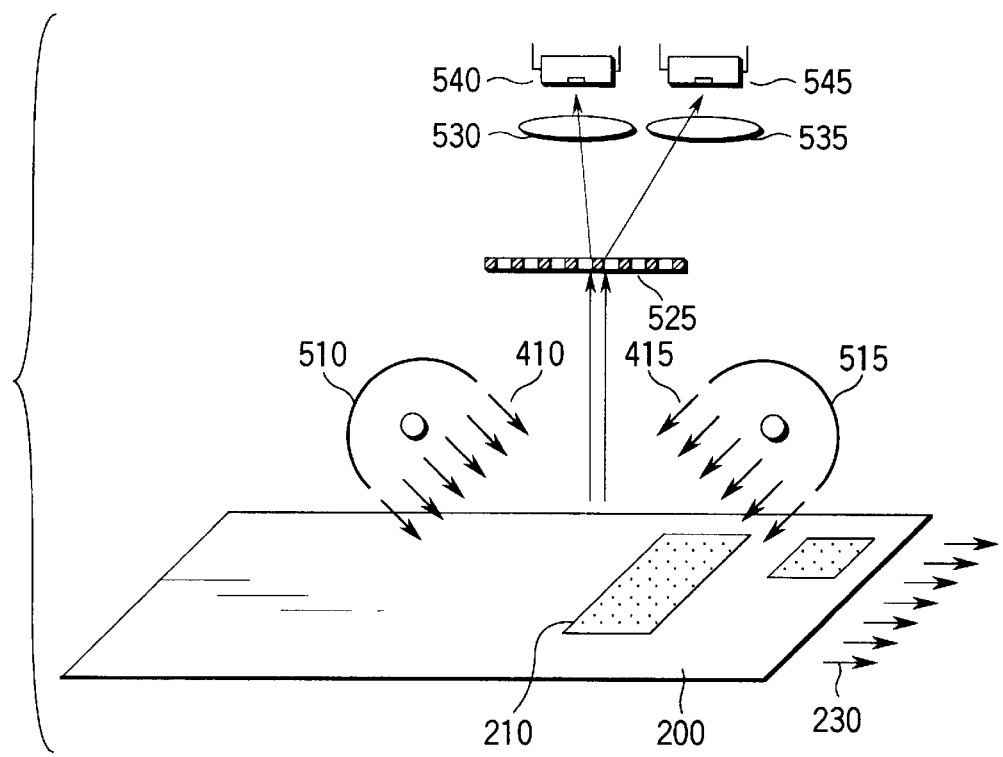
FIG. 48 is a view showing a state wherein two images are separated by the step difference detection apparatus of the 11th embodiment by using color dispersion of a diffraction grating.

The beam splitting means 520 for splitting the reflected light into two light beams in accordance with the wavelength may use color dispersion by a diffraction grating (grating element) 525, as shown in FIG. 48. With this arrangement, the system can be constituted at lower cost than in use of a dichroic mirror.

Two or more of the above-described beam splitting means may be combined. With this arrangement, the wavelength selectivity of light incident on the CCD line image sensors 540 and 545 can be precisely set.

As described above, the beam splitting means 520 for splitting the beam into two light beams in accordance with the wavelength need not always use a dichroic mirror and may use any other method.

Depending on the nature of the surface of the letter 200 or the beam splitting means 520, the two illumination light beams emitted from the two illumination units 510 and 515 cannot be completely split. However, the beam splitting means 520 according to the present invention is not limited to a means for completely splitting the light into the two illumination light beams. If the light amount due to the illumination light 410 and that due to the illumination light 415 independently influence the amount of two light beams split by the dichroic mirror 520, the image formed by the illumination light 410 and that formed by the illumination light 415 can be independently obtained by image processing in principle. Such a case is also incorporated in the present invention.

Figure 49:
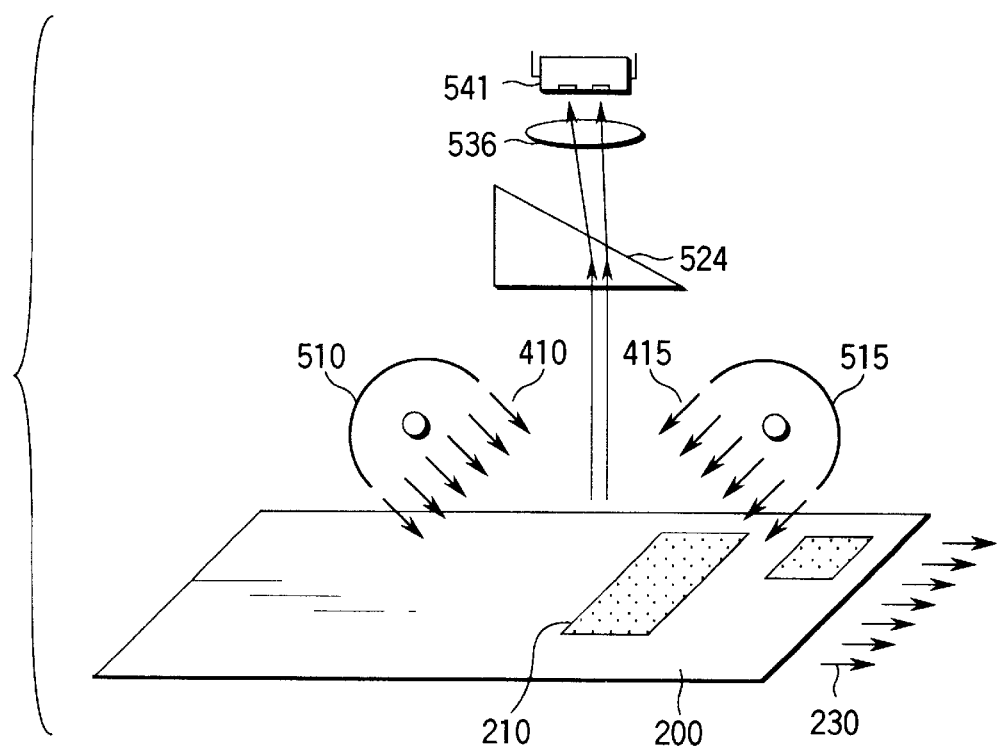
FIG. 49 is a view showing a state wherein two lines of light-receiving elements are arranged in one CCD package in the step difference detection apparatus of the 11th embodiment.

As far as image information can be obtained, any image sensing means such as a CCD line image sensor or a CCD area image sensor can be used. As the two image sensing means, any means capable of obtaining two desired images can be used. For example, two cameras, one camera including two CCD image sensors, or a CCD line image sensor 541 with a package including two lines of photodetecting portions, as shown in FIG. 49, may be used. One or two imaging lenses 536 can be used for the image sensing means 541. By using an image sensing means suitable for the arrangement, necessary and sufficient information can be efficiently collected.

Two light beams having different polarizing directions may be used in place of the two illumination light beams having different wavelengths, and a polarizing plate may be used as a beam splitting means for splitting the light. With this arrangement, the influence of the change in reflection ratio on the surface of the letter 200 due to the wavelength difference can be avoided, so step difference detection free from noise can be easily performed even for color printing.

The image processing means includes a function of calculating the difference between images obtained by illumination from different directions. However, another image processing for improving the detection accuracy, e.g., preprocessing of performing arithmetic processing of the difference or post-processing for the difference result may be further included.

As described above, various modifications can be made, and these modifications are incorporated in the present invention within the spirit and scope of the present invention.

12th Embodiment

Figure 53:
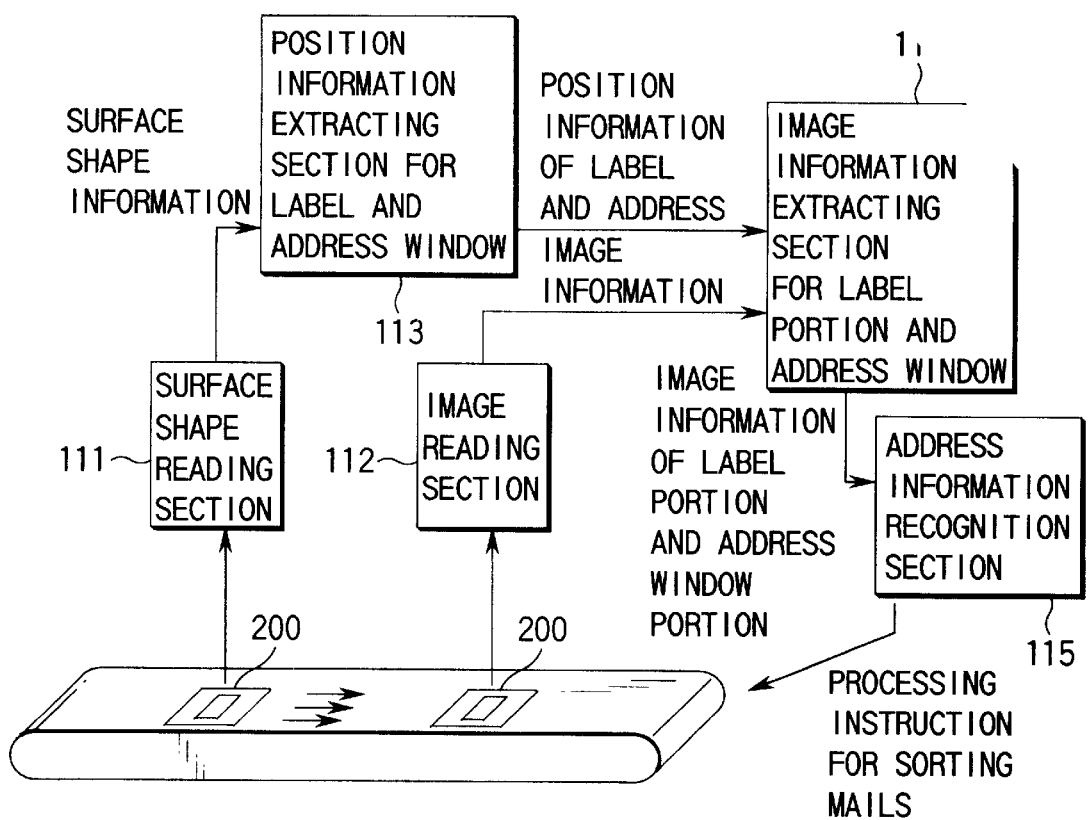
FIG. 53 is a view showing the arrangement of a sorting apparatus for mail items with address labels, to which a step difference detection apparatus according to the 12th embodiment of the present invention is applied.

FIG. 53 shows a step difference detection processing apparatus according to the 12th embodiment.

This step difference detection processing apparatus is used as a letter carrying/distributing apparatus for sorting mail items with address labels. This apparatus sorts a letter 200 to be processed while carrying the letter 200. The letter 200 is carried by the belt of a carrying mechanism of the letter carrying/distributing apparatus. First, a three-dimensional shape on the surface of the letter 200 is read by a surface shape reading section 111 comprising a step difference detection apparatus having the arrangement of the above-described 11th embodiment. The letter 200 whose three-dimensional shape is read by the surface shape reading section 111 is carried to an image reading section 112 side to sense the image of characters or the like written on the surface of the letter 200.

A position information extracting section 113 for label and address window determines whether a label or an address window is present, on the basis of the information of the three-dimensional shape read by the surface shape reading section 111. If a label or an address window is present, the position information of the label or address window is output. An image information extraction section 114 for label and address window extracts the image information of the label or address window from the image information obtained by the image reading section 112, on the basis of the position information of the label or address window obtained by the position information extracting section 113. The extracted image information is sent to an address information recognition section 115. If no label or address window is present, all image information is sent to the address information recognition section 115. The address information recognition section 115 performs image processing of, e.g., analyzing the address information by character recognition/knowledge processing on the basis of the image information of the label or address window portion. How to distribute mail items is determined, and a processing instruction for sorting mail items is sent to a letter carrying/distributing apparatus. The letter carrying/distributing apparatus distributes the letter in accordance with the instruction.

When the step difference detection apparatus of the present invention is applied to the letter carrying/distributing apparatus, the address can be efficiently and properly recognized, and the mail items can be properly and quickly sorted.

The surface shape information of the label or address window, which is obtained by the surface shape reading section 111, can be used not only to simply extract the image of the label or address window portion from the image obtained by the image reading section 112 but also for any purposes for processing the image information using the surface shape information.

For example, on the basis of the position information of the stepped region obtained by the surface shape reading section 111, the probability of an address description region is calculated for each region on the surface of the letter 200, and address recognition is sequentially performed for the regions in descending order of probabilities. With this arrangement, even when the first extraction of position information of the address label or address window fails, proper position information of the address label or address window is extracted in the second processing, so the probability of success of address recognition increases. The surface shape information obtained by the surface shape reading section 111 may be used not only to simply extract the image of the label or address window portion from the image obtained by the image reading section 112 but also for any purposes for processing the image information.

The arrangement of the step difference detection processing apparatus is not limited to that shown in FIG. 53. The image reading section 112 may be omitted, and the image obtained by the image sensing section of the surface shape reading section 111 may be used as image information instead of the image obtained by the image reading section 112. The image obtained by the image reading section 112 is almost the same as that obtained by the surface shape reading section 111 except the stepped portion. Therefore, the image reading section 112 may be omitted, and the surface shape reading section 111 may have the function of the image reading section. In this case, the apparatus is simplified, and cost can be reduced.

The arrangement and purpose of the step difference detection processing apparatus are not limited to those described above. On the basis of the surface shape of the carried letter 200, which is read by the surface shape reading section 111, the position of the flap (folded seal portion of mail) or stamp may be detected to face or sort the letter 200. As described above, even when the image reading section 112 is omitted, a step difference detection processing apparatus performing useful processing of sorting, distribution, and facing mail items on the basis of the surface shape information obtained by the surface shape reading section 111 can be constituted.

The above-described various modifications can be made. These modifications are incorporated in the present invention within the spirit and scope of the present invention which is to process the read image data using the read surface shape data and effectively use the image data.

In the 11th and 12th embodiments, the read region is illuminated with illumination light beams parallel to the carrier direction of the letter. However, as described in the sixth embodiment, the read region may be simultaneously illuminated with illumination light beams having different characteristics and perpendicular to the carrier direction using two illumination units positioned on a line perpendicular to the carrier direction of the letter.

More specifically, in the 11th and 12th embodiments, since the read region is illuminated with different types of illumination light beams, the illuminances of the illumination light beams are lowered relative to each other. However, when the read region is simultaneously illuminated with illumination light beams having different characteristics and perpendicular to the carrier direction of the letter, as described in the above sixth embodiment, the label edge of the letter can be properly detected even when the illuminances of the illumination light beams are low, and the driving frequency of the CCD line sensor is low.

The two illumination means need not always be used.

Figure 54:
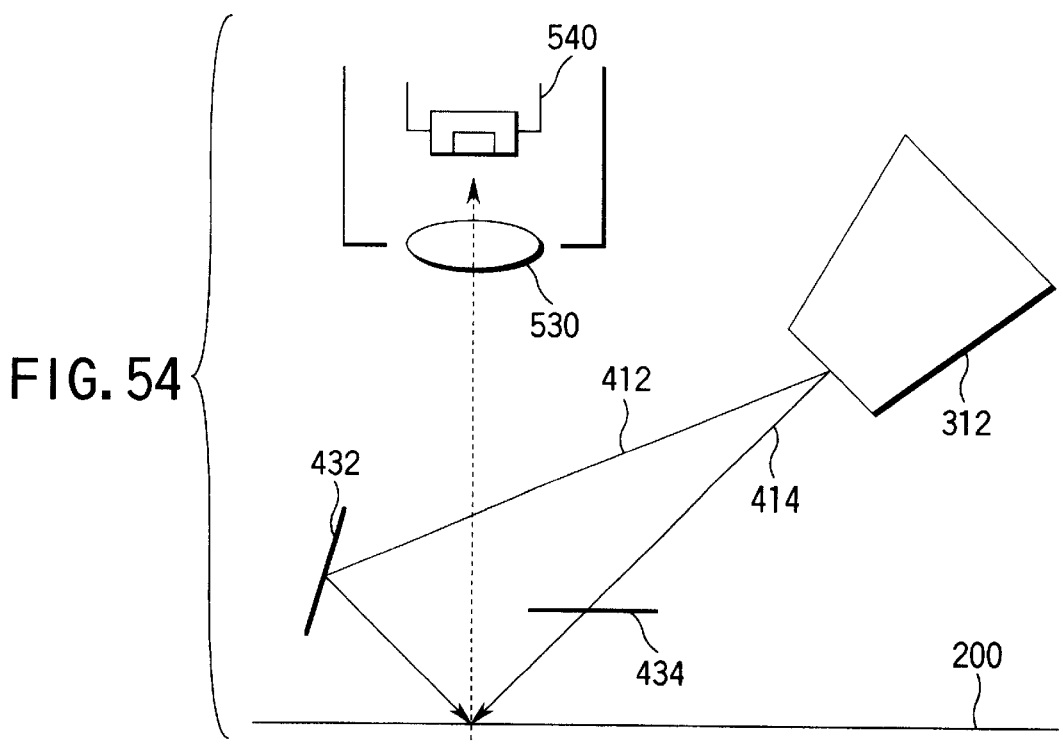
FIG. 54 is a view showing a step difference detection apparatus having one illumination section.

The illumination light beams may be made incident on the light illumination region from two directions by partially changing the optical path of illumination light beams emitted from one light source. FIG. 54 shows an example of this arrangement. Illumination light 414 emitted from an illumination section 312 is shielded by a light-shielding portion 434, so the illumination light reaches only the illumination spot to be illuminated from the left side.

Illumination light 412 emitted from the illumination section 312 is partially reflected by a light-shielding portion 432, and its optical path is changed by the light-shielding portion 432, so the illumination light reaches only the illumination spot to be illuminated from the right side.

As the light-shielding portion 434, a member having the above-described shape (e.g., an interdigital slit) can be used. The light-shielding portion 432 has a mirror surface for reflecting light only at a necessary portion, and the remaining portions are formed as anti-reflection surfaces for absorbing light.

13th Embodiment

An arrangement in which illumination light beams illuminate a read region 220 not from the left and right sides but from the front and rear sides will be described next as the 13th embodiment of the present invention.

Figure 55:
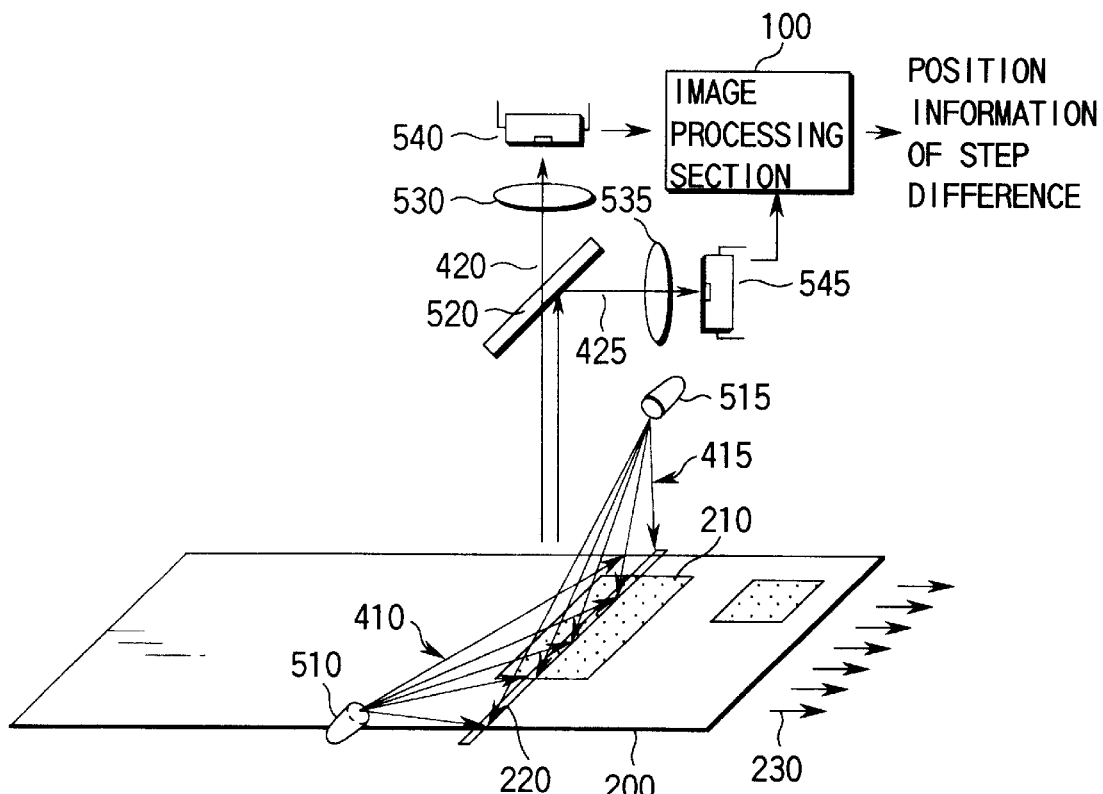
FIG. 55 is a view showing a step difference detection apparatus according to the 13th embodiment of the present invention.

FIG. 55 shows the arrangement of a step difference detection apparatus according to the 13th embodiment of the present invention. The step difference detection apparatus of this embodiment is used as, e.g., a detection apparatus for detecting the position and region of an address label or address indication cellophane window (address window) of mail, and comprises four sections: an illumination section, a beam splitting section, an image sensing section, and an image processing section.

The basic arrangement of this step difference detection apparatus is the same as that described in the 11th embodiment except that illumination light beams illuminate the read region 220 not from the left and right sides but from the front and rear sides, and the driving frequency of a CCD sensor is lowered to about 1/10.

The arrangement will be described below with reference to the accompanying drawings.

In FIG. 55, illumination units 510 and 515 emit illumination light 410 and illumination light 415 having different wavelengths, respectively. The illumination light 410 is a laser beam having a wavelength of 780 nm, and the illumination light 415 is a laser beam having a wavelength of 830 nm.

Each laser beam is transmitted through an asymmetrical lens to diverge in a planar (sectorial) shape. The illumination units 510 and 515 are set such that the two-dimensionally divergent laser beams illuminate the linear read region 220.

The two illumination units are positioned above the extended line of the linear read region 220. The read region 220 is positioned on the upper surface of a letter 200 carried by a carrying unit (not shown). The longitudinal direction of the read region 220 is perpendicular to a carrier direction 230 (subscanning direction) of the letter 200.

In the 13th embodiment, the illumination light beams illuminate the read region 220 not from the left and right sides when viewed from the direction perpendicular to the carrier direction, unlike the first embodiment. Instead, the illumination light beams illuminate the read region 220 from the front and rear sides, i.e., from the left and right sides when viewed from the carrier direction 230.

The illumination light 410 and the illumination light 415 are scattered on the upper surface of the letter 200 and partially incident on a dichroic mirror 520 above the read region 220. The light incident on the dichroic mirror 520 is split into a component 420 from the illumination light 410 and a component 425 from the illumination light 415.

The images of the read region 220 corresponding to the two light components are formed on the different CCD line image sensors 540 and 545 through imaging lenses 530 and 535, respectively. With this arrangement, the image of the letter 200, which is formed by the illumination light 410 from the front side, and that formed by the illumination light 415 from the rear side are simultaneously output from the CCD line image sensors 540 and 545, respectively. The two output images are sent to an image processing means 100, and information associated with the position of a step difference is output.

The incident direction of each illumination light will be described in more detail.

Figure 56:
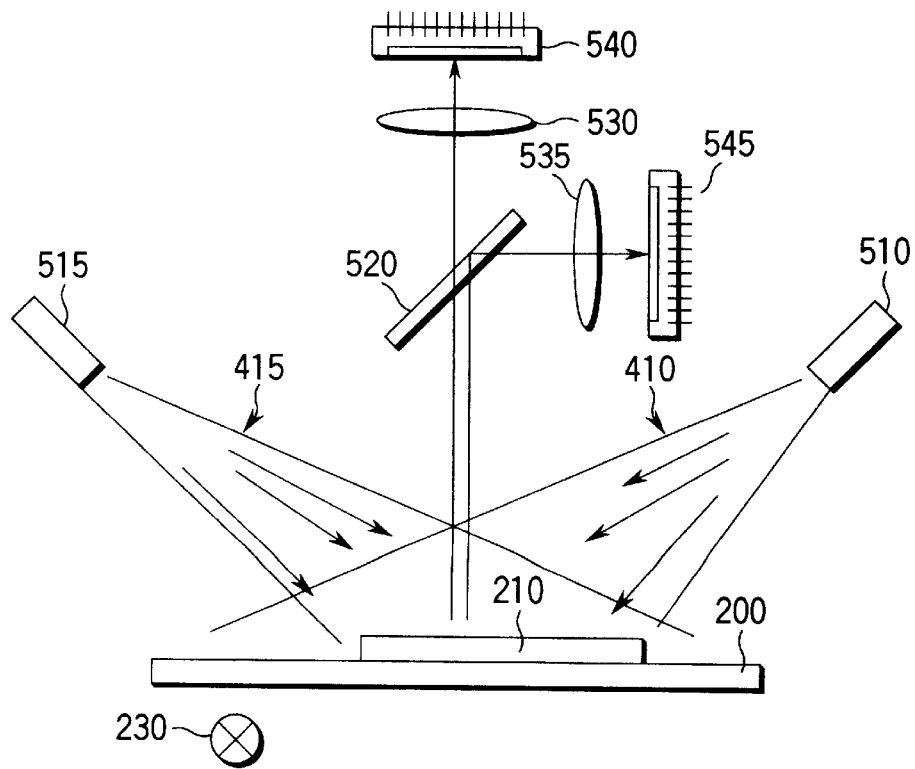
FIG. 56 is a view showing the step difference detection apparatus of the 13th embodiment taken along a section including a read region.

FIG. 56 shows a section of the arrangement shown in FIG. 55, which is taken along a plane including the linear read region 220. This section is perpendicular to the surfaces of the letter 200. The letter 200 is carried from the front side to the rear side of the drawing.

The illumination units 510 and 515 are arranged above the extended line of the linear read region 220 and therefore included in this section. The illumination light 410 from the illumination unit 510 and the illumination light 415 from the illumination unit 515 diverge in a sectorial shape and illuminate the read region 220.

The two illumination light beams have almost the same illumination capability and illuminate the sheet surface at almost the same incident angle while being spaced apart from the sheet surface by almost the same distance. The incident angle of each illumination light is about 45° to 70°. The incident angle of the illumination light changes depending on the position in the read region 220. A portion far from the light source is illuminated at a large incident angle.

The above-described incident angle is a value at the center of the read region 220. As described above, the two illumination units illuminate the read region 220 in the vertical direction. This is a large difference from the 11th embodiment in which the read region is horizontally illuminated from the left and right sides.

Two images sent to the image processing means 100 in the above arrangement will be described. When the letter 200 as an object has a step difference due to a label edge or the like, a shadow or a bright line is formed at that portion by oblique illumination (illumination using a light beam at a large incident angle).

At an edge opposing the light incident direction, the illuminance becomes higher than that at the peripheral portion, and a bright line is formed. At an edge directed to a side opposite to the light incident direction, a shadow is formed by the edge itself, so a dark line is formed. As a method of detecting a step difference, two images acquired by oblique illumination in opposite illumination directions are compared to detect a portion where one image has a bright line and the other has a dark line.

According to the arrangement shown in FIG. 55, the illumination light 410 and the illumination light 415, which have different wavelengths, are simultaneously emitted from opposite directions, so two images can be simultaneously acquired by illumination from the opposite directions.

In the arrangement shown in FIG. 55, the linear read region 220 is vertically illuminated along the longitudinal direction. Therefore, one end is close to a light source, and the other end is far from the light source.

This causes an illumination variation (shading). This shading is preferably corrected before the two acquired images are compared. More specifically, the value of each pixel of the acquired images is divided by the illuminance value obtained by illuminating a white plane at the corresponding position. By calculating the difference between the two images, a stepped portion such as a label edge can be detected. When the difference is calculated, pixel values except the stepped portion are canceled to zero while those at the stepped portion such as a label edge are not canceled.

The higher side of the stepped portion can also be detected on the basis of the resultant value, i.e., positive or negative. This value can be used as a key in determining the stepped region of a label or the like, i.e., detecting two opposite stepped portions. FIGS. 57 to 60 show examples of obtained images.

Figure 57:
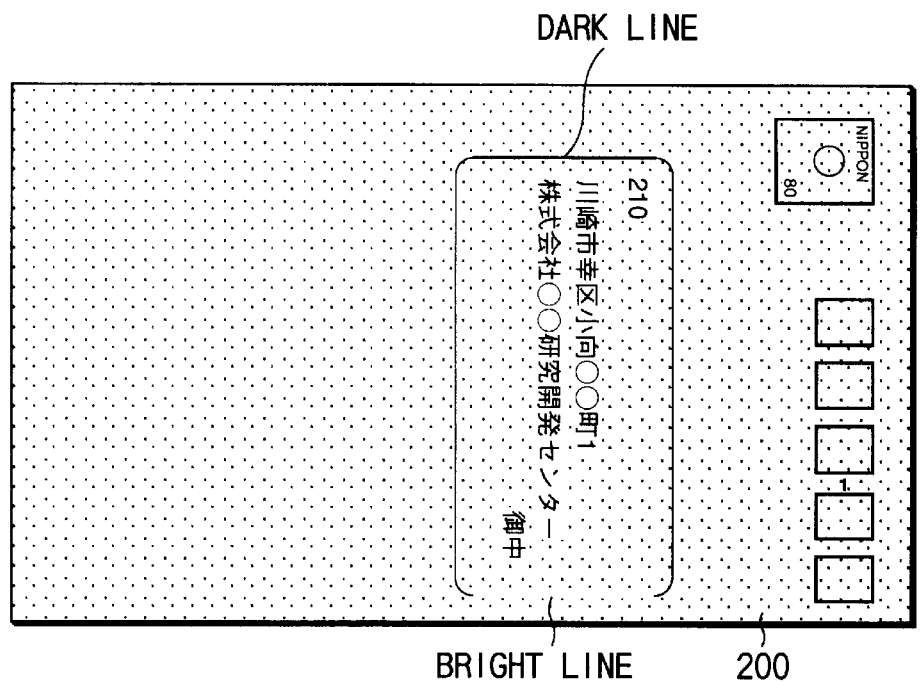
FIG. 57 is a view showing an image obtained in the step difference detection apparatus of the 13th embodiment by illumination in the vertical direction (from the front side)
Figure 58:
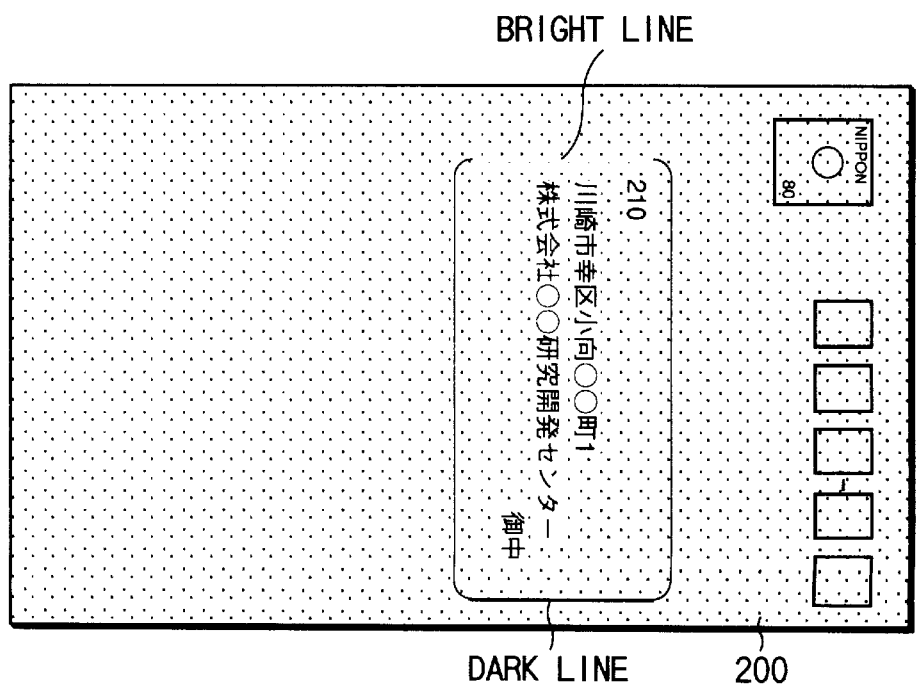
FIG. 58 is a view showing an image obtained in the step difference detection apparatus of the 13th embodiment by illumination in the vertical direction (from the rear side)
Figure 59:
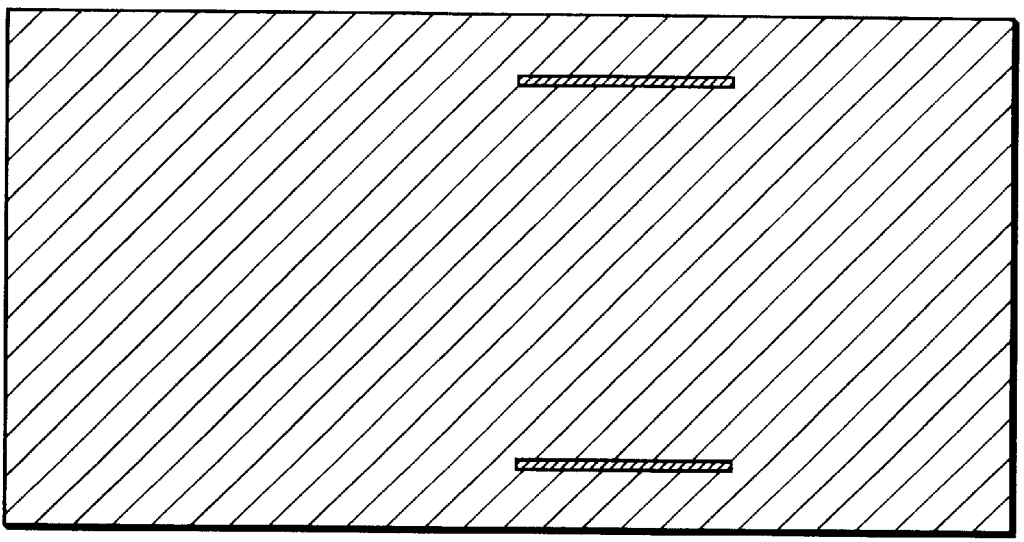
FIG. 59 is a view showing an image obtained in the step difference detection apparatus of the 13th embodiment by calculating the difference between the images obtained by illumination in the vertical direction.

FIG. 57 shows an example in which the output image from the CCD line image sensor 540 is subjected to shading correction. FIG. 58 shows an example in which the output image from the CCD line image sensor 545 is subjected to shading correction. FIG. 59 shows the difference between the two images.

Two straight lines shown in FIG. 59 indicate two sides of a label. A rectangular region sandwiched by the two lines is a stepped portion of the label. Most labels are rectangular. For this reason, the rectangular region of a label can be known by detecting the positions of the opposing upper and lower sides even when the left and right sides cannot be detected. Therefore, the object of this embodiment can be sufficiently achieved.

Figure 60:
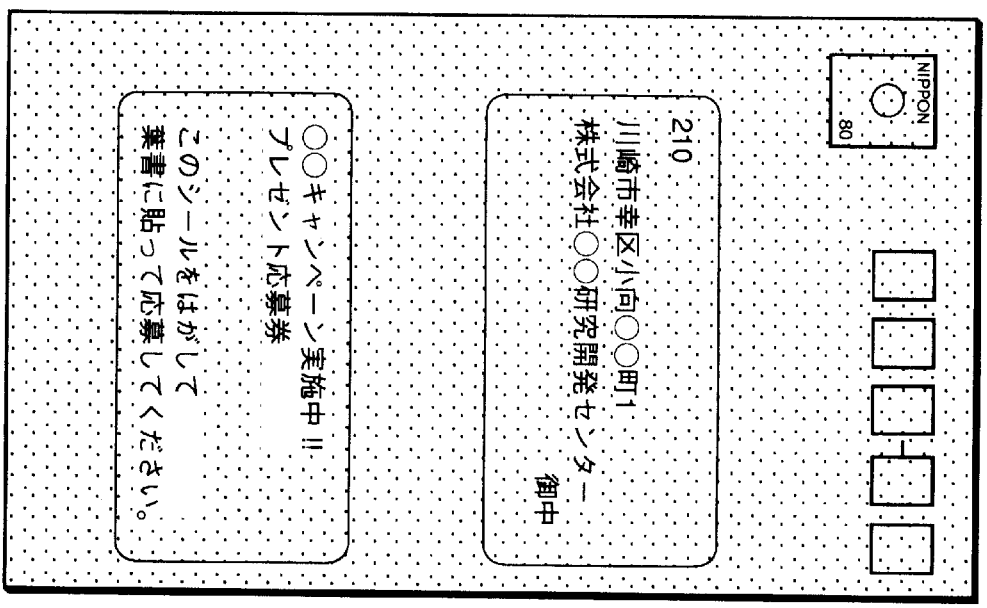
FIG. 60 is a view showing a letter having two labels.

In the arrangement shown in FIG. 55, since two sides opposing each other in the direction of short sides of the letter are detected, two opposing sides, i.e., opposing stepped portions of the label can be easily identified. For example, assume a letter having two labels, as shown in FIG. 60. If a bright line or a dark line is formed on the left or right side of each label, bright and dark lines corresponding to the left and right sides of a label must be discriminated. However, when bright and dark lines are formed on the upper and lower sides of a label, the two opposing sides can be clearly detected.

The arrangement and operation of the step difference detection apparatus of the 13th embodiment of the present invention have been described above. The effects of the step difference detection apparatus of the 13th embodiment will be described next.

Almost all effects of the above embodiments also apply to this embodiment. An effect unique to this embodiment will be mainly described below.

This embodiment is largely different from the above-described embodiments in that illumination using two light beams having different wavelengths is performed not horizontally but vertically. In illumination in the horizontal direction, the necessity of shading correction is low, though considerably powerful illumination units are required. This will be described below.

In illumination in the horizontal direction, a shadow or bright line due to a label is formed on the left or right side of the label. The width of the shadow or bright line is very narrow in the subscanning direction. To read the shadow or bright line, a high resolution is required in the subscanning direction.

More specifically, a resolution of about 100 $\mu$m is necessary. In the postal address reading and sorting machine, mail items are carried at a speed as high as several meter per second to process a large number of mail items. With the above carrying speed and subscanning-direction resolution, the photo-charge storage time of the CCD line image sensor is as short as several ten microseconds.

The output from the CCD line image sensor depends on the sensitivity the light amount, and the photo-charge storage time. To obtain a sufficient output from the CCD line image sensor in such a short storage time, a considerably powerful light source is required.

In wavelength separation, however, the wavelength band of light contained in the light source is strictly limited. It is preferable that the two light sources contain no common wavelength components. In addition, to prevent error detection of a step difference due to the difference in reflection ratio due to colors, the two light sources preferably have specific wavelength bands. It is very difficult to prepare powerful light sources containing only light in a narrow wavelength band and having a sufficient light amount.

In this embodiment, the illumination direction of the two illumination light beams having different wavelengths is not horizontal but vertical. With this arrangement, the requirement for the light sources can be largely relaxed. In illumination in the vertical direction, the shadow or bright line due to a step difference is formed not on the left or right side of the label but on the front or rear side of the label.

In this case, the shadow or bright line is long in the subscanning direction and short in the main scanning direction. For this reason, the resolution in the subscanning direction need not be so high and can be lowered to about $\frac{1}{10}$ to $\frac{1}{20}$ that of the conventional arrangement.

Instead, the resolution in the main scanning direction must be high, though a conventional CCD line image sensor for character recognition suffices. The resolution in the main scanning direction does not influence the storage time of the CCD line image sensor. When the driving clock of the CCD line image sensor is made slower (shift pulse interval is prolonged), the storage time increases as the resolution in the subscanning direction lowers. For example, when the resolution in the subscanning direction is lowered to $\frac{1}{10}$, the illumination intensity can be $\frac{1}{10}$. As described above, the requirement for the light sources is relaxed, so the system can be constructed using easily available light sources.

When the step difference detection apparatus according to the 13th embodiment is incorporated in the step difference detection processing apparatus described in the 11th embodiment, e.g., an automatic postal address reading and sorting machine, the region of an address label or address window where the address is described can be quickly and properly detected by an address recognition section to improve the address recognition ratio.

The 13th embodiment of the present invention has been described above in detail. In the 13th embodiment as well, various changes and modifications can be made, as in the above-described embodiments. The 13th embodiment is different from the 11th embodiment only in the illumination direction of the illumination light beams. For all of the remaining portions, the same arrangement as in the 11th embodiment can be applied.

As has been described above, according to the present invention, a three-dimensional shape on the upper surface of a letter can be properly detected without being influenced by the color density distribution such as printed contents on the upper surface of the letter. Especially, in this system, two images can be sensed completely simultaneously at one position. Unlike another system for sensing two images in different time points and at different positions and calculating the difference between the two images, the present invention provides an ideal system because it is not influenced by variations in speed of the carrying mechanism. Even for direct mail items with large color advertisements, which are increasing in recent years, the position of an address label or the like can be properly detected, so the address description position can be properly grasped. In addition, by specifying the address description position, an area to be subjected to address recognition processing is reduced. For this reason, the load on address recognition processing can be largely reduced by shortening the processing time or downsizing the processing circuit necessary for recognition processing. Therefore, the efficiency of postal processing can be largely improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A detection apparatus comprising:
an illumination device configured to illuminate a region of an object with a plurality of types of illumination light beams, each of said illumination light beams being incident on said region from different respective directions and having different respective characteristics;

a beam splitting device configured to split a light beam reflected from the region into a plurality of light components in units of types of the illumination light beams using the respective different characteristics of the plurality of types of illumination light beams;

image sensing devices configured to receive the plurality of light components split by said beam splitting device to input a plurality of images corresponding to the plurality of types of illumination light beams, respectively; and an image processing device configured to process the plurality of images input by said image sensing devices to detect a step change in surface elevation at the region.

2. The apparatus according to claim 1, wherein the plurality of types of illumination light beams having different characteristics are two types of light beams having different spectral characteristics.

3. The apparatus according to claim 1, wherein the plurality of types of illumination light beams having different characteristics are two types of light beams having different polarization characteristics.

4. The apparatus according to claim 2, wherein the two types of light beams having different spectral characteristics have wavelengths not less than 600 nm as major components.

5. The apparatus according to claim 2, wherein a value obtained by dividing a difference between wavelengths of the two types of light beams having different spectral characteristics by an average value of the wavelengths is not less than 1/40.

6. The apparatus according to claim 1, wherein said image processing device comprises a difference calculation device configured to determine a difference between the plurality of images input by said image sensing devices.

7. The apparatus according to claim 1, wherein said beam splitting section comprises a dichroic mirror.

8. The apparatus according to claim 1, wherein the plurality of types of illumination light beams are obtained from one light source.

9. The apparatus according to claim 1, further comprising:
means for processing for the object on the basis of the step change in surface elevation at the region detected by said image processing device.

10. A detection apparatus comprising:
an illumination device configured to illuminate a linear region of an object carried in a predetermined carrying direction with a plurality of types of illumination light beams, each of said illumination light beams being incident on said linear region from different respective directions and having different respective characteristics, wherein the linear region extends in a direction crossing a predetermined carrying direction and the plurality of types of illumination light beams incident on said linear region from different respective directions to form shadows on the object extending in a direction crossing the carrying direction;

a beam splitting device configured to split a light beam reflected from the linear region into a plurality of light components using the respective different characteristics of the plurality of types of illumination light beams;

image sensing devices configured to receive the plurality of light components split by said beam splitting device to input a plurality of images corresponding to the plurality of types of illumination light beams, respectively; and a detection device configured to detect a step change in surface elevation at the linear region on the basis of the image input by said image sensor.

11. A detection apparatus comprising:
an illumination means for emitting illumination light;

a means for receiving the illumination light from said illumination means for forming object light beams therefrom that are incident onto a plurality of small illumination regions on an object surface from different illumination directions;

a moving means for moving the object surface in a predetermined direction;

an image sensing means receiving the object light beams from said plurality of small illumination regions and to providing an output indicative thereof; and a detection means for detecting a step change in surface elevation at the plurality of small illumination regions on the basis of the output received from the image sensing means.

12. A detection apparatus comprising:
an illumination means for illuminating a region of an object with a plurality of types of illumination light beams, each of said illumination light beams being incident on said region from different respective directions and having different respective characteristics;

a beam splitting means for splitting a light beam reflected from the region into a plurality of light components in units of types of the illumination light beams using the respective different characteristics of the plurality of types of illumination light beams;

an image sensing means receiving the plurality of light components split by said beam splitting means and inputting a plurality of images corresponding to the plurality of types of illumination light beams, respectively; and an image processing means for processing the plurality of images input by said image sensing means for detecting a step change in surface elevation at the region.

13. A detection apparatus comprising:
an illumination means for illuminating a linear region of an object with a plurality of types of illumination light beams, each of said illumination light beams being incident on said linear region from different respective directions and having different respective characteristics, wherein the object is moved in a predetermined carrying direction by a moving means and the linear region extends in a direction crossing the predetermined carrying direction and the plurality of types of illumination light beams incident on said linear region from different respective directions form shadows on the object extending in a direction crossing the carrying direction;

a beam splitting means for splitting a light beam reflected from the linear region into a plurality of light components using the respective different characteristics of the plurality of types of illumination light beams;

an image sensing means receiving the plurality of light components split by said beam splitting means and inputting a plurality of images corresponding to the plurality of types of illumination light beams, respectively; and a detection means for detecting a step change in surface elevation at the linear region on the basis of the image input by said image sensing means.

14. A step difference detection apparatus comprising:

an illumination device configured to emit an illumination light;

an incident device configured to receive the illumination light from said illumination device and to form object light beams therefrom onto a plurality of small illumination regions on an object surface, wherein the object light beams illuminate the plurality of small illumination regions adjacent to each other from different directions, respectively;

an image sensing device configured to receive the object light beams from said plurality of small illumination regions and to provide an output indicative thereof; and a detection device configured to detect a step change in surface elevation at the plurality of small illumination regions based on the output received from the image sensing device.

15. The apparatus according to claim 14, wherein said incident device is configured to form the object light beams so that the object light beams illuminate a linear region including the plurality of small illumination regions.

16. The apparatus according to claim 15, wherein the different directions of the object light beams include first and second directions alternately changing in units of the adjacent small illumination regions.

17. The apparatus according to claim 14, wherein the image sensing device comprises an area sensor configured to sense a two-dimensional region at once.

18. The apparatus according to claim 14, further comprising a device configured to execute processing for the object based on the step change in surface elevation at the plurality of small illumination regions detected by the detection device.

19. The apparatus according to claim 14, wherein said illumination device comprises two illumination units configured to emit two illumination light beams from two illumination directions, respectively, as said illumination light, said incident device includes two slits inserted between each of respective ones of said two illumination units and the plurality of small illumination regions.

20. The apparatus according to claim 19, wherein each of the two slits, with d being a distance value measured along an optical path extending between each of the two slits and the plurality of small regions, comprises at least one light-emitting portion having a width dimension of a value p and configured to transmit a respective beam portion of one of the illumination light beams emitted from a respective one of said two slits to form each of said object light beams with a predetermined value of illuminance corresponding to $\sqrt{e}$ of an illuminance at a central point on a plane separated from one point of said illumination device by a unit distance, with e being a base of natural logarithm, and a radius value w, and at least one light shielding portion having a width dimension of the value p and configured to shield a respective beam portion of one of the two illumination light beams, and the width dimension value p divided by the product of the radius value w and the path length distance value d has a value greater than 4.

21. The apparatus according to claim 19, wherein each of the two slits, with d being a distance value measured along an optical path extending between each of the two slits and the plurality of small regions, comprises at least one light-emitting portion having a width dimension of a value p and configured to transmit a respective beam portion of one of the illumination light beams emitted from a respective one of said two slits to from each of said object light beams with a predetermined value of illuminance corresponding to $\sqrt{e}$ of an illuminance at a central paint on a plane separated from one point of said illumination device by a unit distance, with e being a base of natural logarithm, and a radius value w, and at least one light shielding portion having a width dimension of the value p and configured to shield a respective beam portion of one of the two illumination light beam, and the width dimension value p divided by the product of the radius Value w and the path length distance value d has a value greater than 8.

22. The apparatus according to claim 20, wherein each of said slits comprises a transparent member having a pattern configured to provide a plurality of transmitting portions and shielding portions.

23. The apparatus according to claim 21, wherein each of said slits comprises a transparent member having a pattern configured to provide a plurality of transmitting portions and shielding portions.

24. A step difference detection apparatus comprising:

an illumination device configured to form two object light beams onto a linear region on a surface of the object, wherein the linear region is alternately illuminated by the two object light beams from different directions at a predetermined timing;

an image sensing device configured to receive the two object light beams reflected from said linear region and to provide an output indicative thereof; and a detection device configured to detect a step change in surface elevation at the linear region based on the output received from the image sensing device.

* * * * *